United States Patent [19]
Washisu

[11] Patent Number: 5,835,799
[45] Date of Patent: Nov. 10, 1998

[54] IMAGE BLUR PREVENTION APPARATUS

[75] Inventor: Koichi Washisu, Tokyo, Japan

[73] Assignee: Canon Kabushiki Kaisha, Tokyo, Japan

[21] Appl. No.: 890,513

[22] Filed: Jul. 9, 1997

[30] Foreign Application Priority Data

Jul. 10, 1996 [JP] Japan ................................. 8-198569
Jul. 10, 1996 [JP] Japan ................................. 8-198570

[51] Int. Cl.⁶ ............................. G03B 17/00; G02B 27/64
[52] U.S. Cl. ............................................. 396/55; 359/554
[58] Field of Search ............................ 396/55; 359/554, 359/555, 556, 557

[56] References Cited

U.S. PATENT DOCUMENTS

| | | | |
|---|---|---|---|
| 4,869,108 | 9/1989 | Washisu | 73/517 |
| 4,965,619 | 10/1990 | Shikaumi et al. | 354/410 |
| 5,020,369 | 6/1991 | Washisu et al. | 73/517 |
| 5,266,988 | 11/1993 | Washisu | 396/55 |
| 5,608,703 | 3/1997 | Washisu | 396/55 |
| 5,689,369 | 11/1997 | Noguchi | 359/557 |

*Primary Examiner*—W. B. Perkey
*Attorney, Agent, or Firm*—Fitzpatrick, Cella, Harper & Scinto

[57] ABSTRACT

An image blur prevention apparatus includes a drive device which generates an electromagnetic force by using permanent magnets and coils, and uses the electromagnetic force to drive a movable member, e.g., a correction lens, for performing an image blur. The permanent magnets are mounted on the movable member, and the coils are mounted on the apparatus body. The permanent magnet opposes one side of the coil and forms a magnetic path on the opposite side of the coil to the side wherein the coil opposes the permanent magnet without using any magnetic member. With this structure, the necessity for wiring for the movable member is eliminated to simplify the assembly process. In addition, since no magnetic member is placed on the opposite side of the coil to the side where the coil opposes the permanent magnet, a simple structure can be realized.

28 Claims, 37 Drawing Sheets

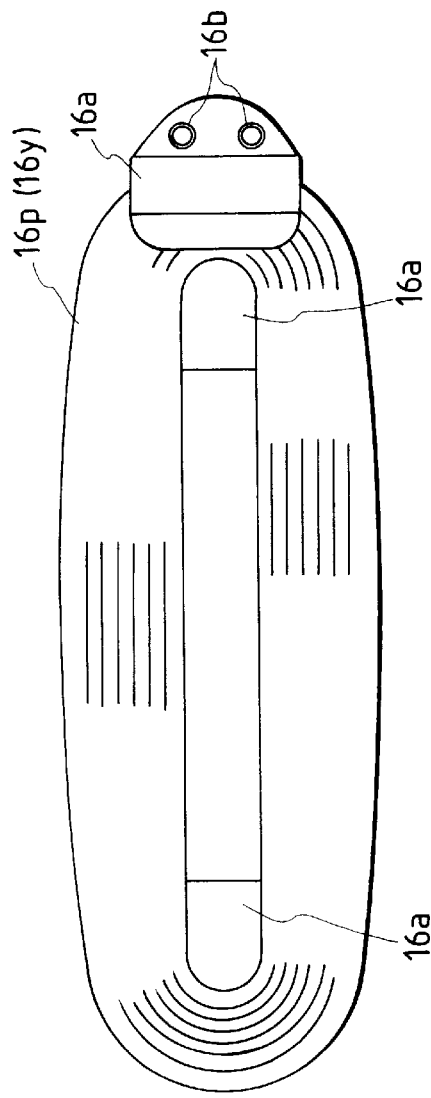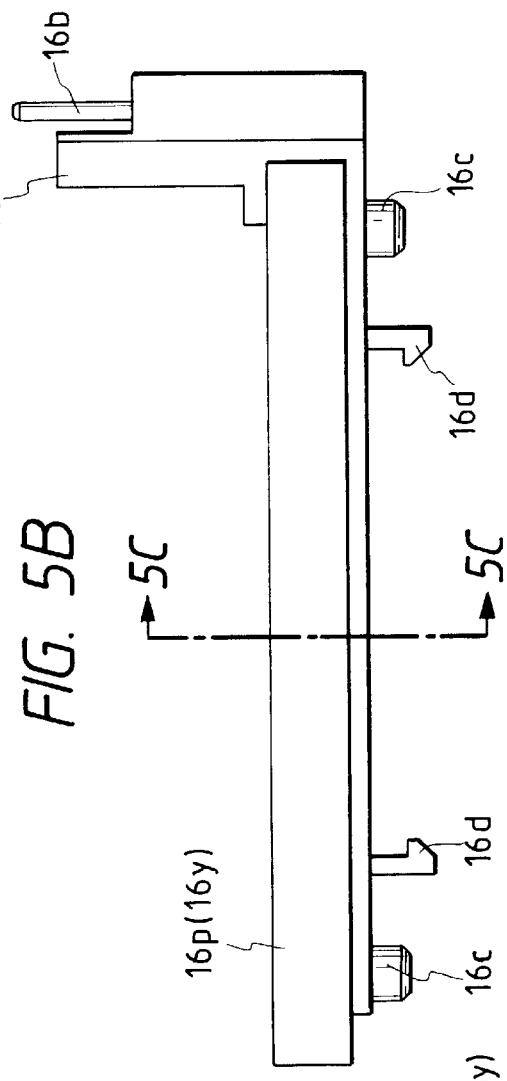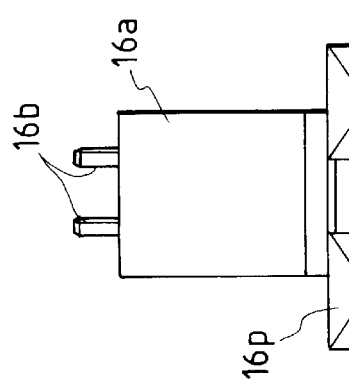

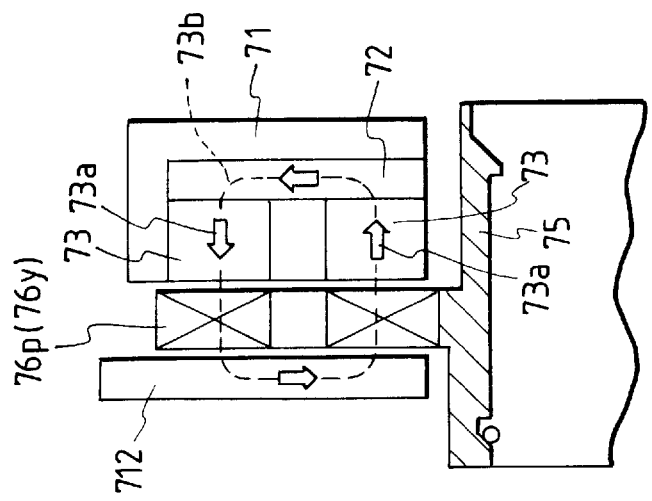
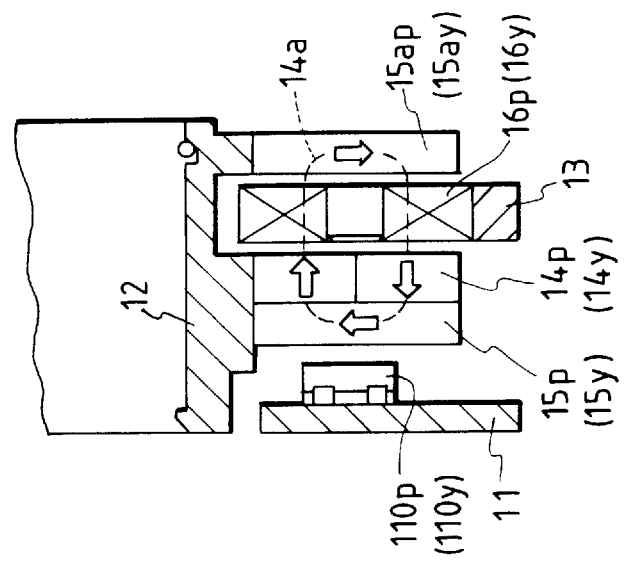
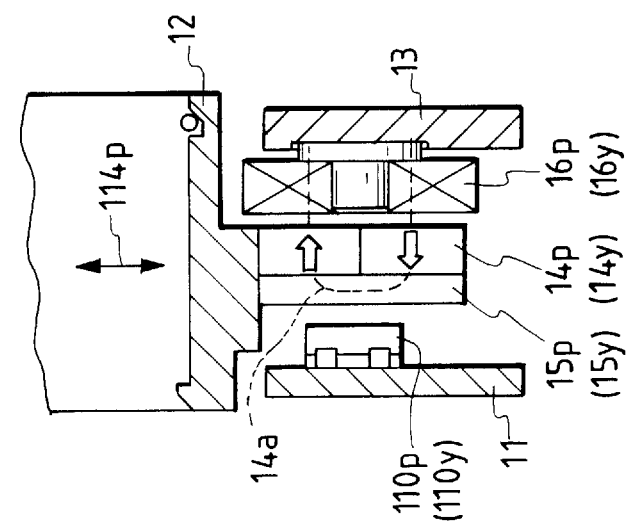

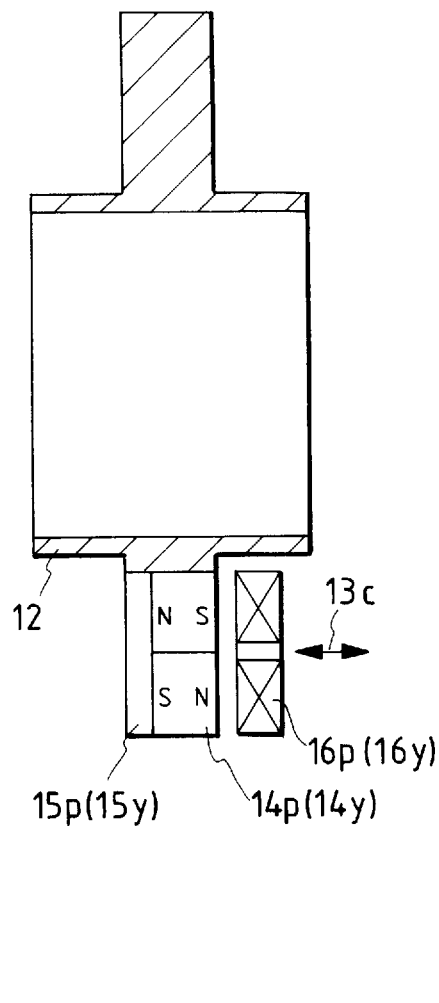 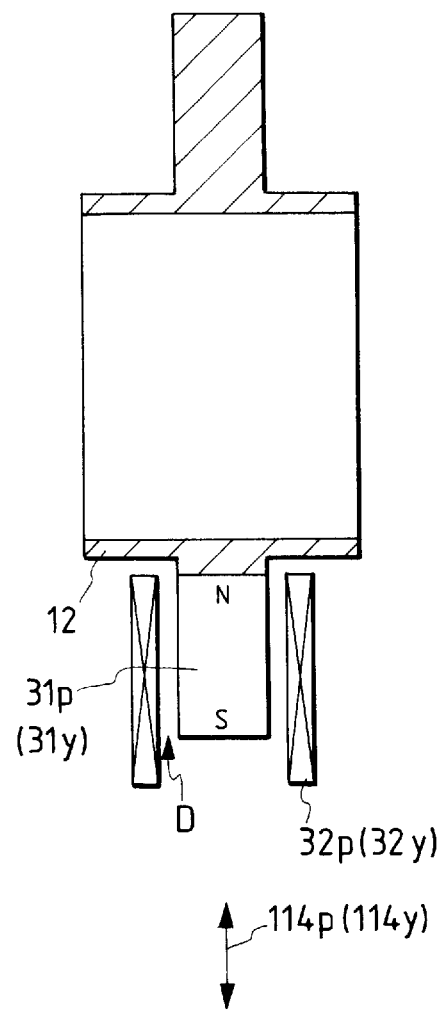

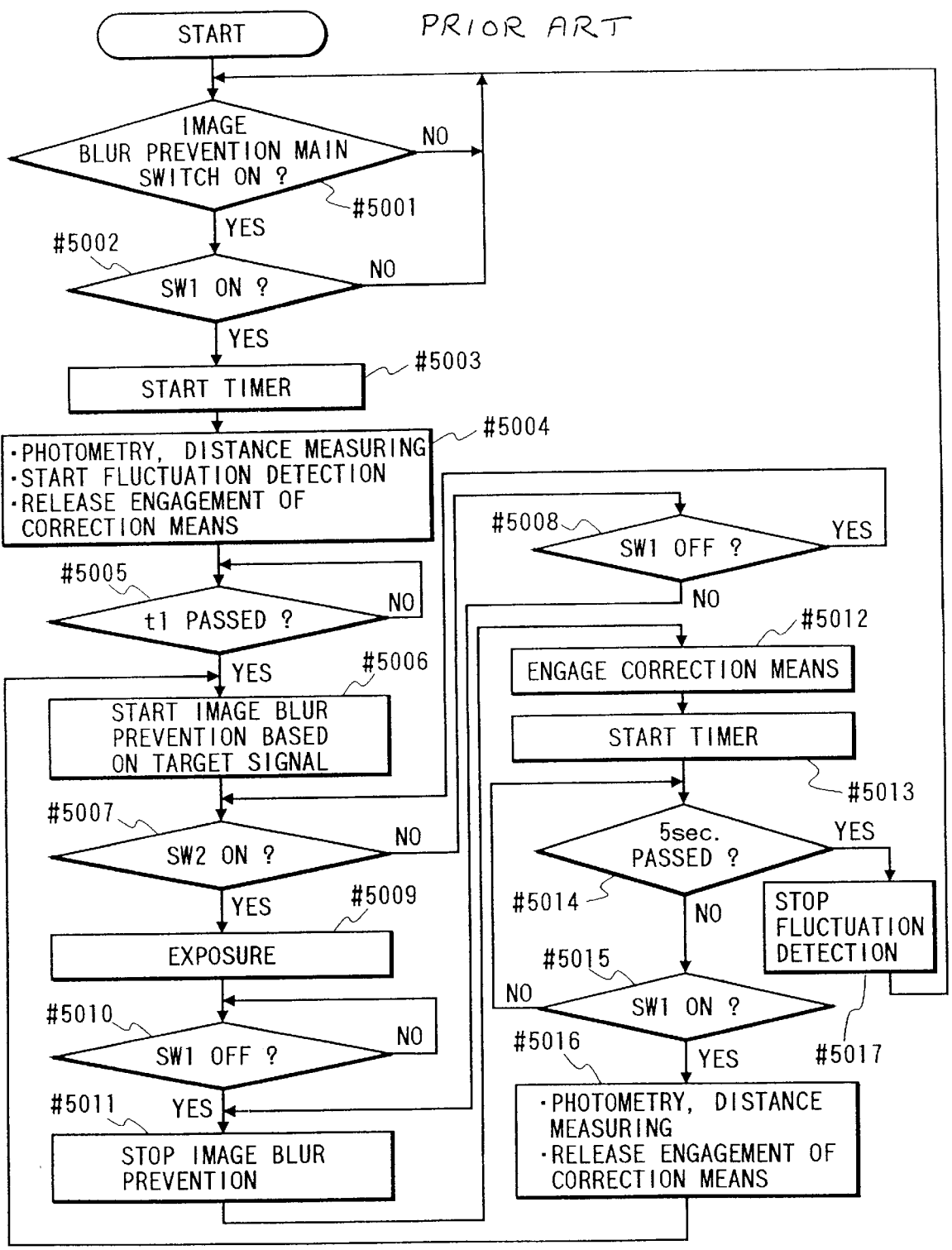

IMAGE BLUR PREVENTION APPARATUS

BACKGROUND OF THE INVENTION

1. Field of the Invention

The present invention relates to an image blur prevention apparatus for preventing an image blur caused by hand fluctuations or the like in a camera, optical equipment, or the like.

2. Related Background Art

In currently available cameras, all operations important to photography, e.g., determination of exposure and focus control, are automatically performed. Therefore, even an unskilled user of a camera rarely fails in a photographing operation.

Recently, a system for preventing hand fluctuations from acting on a camera has also been studied, and hence there has been almost no factor that causes a photographer to fail in photographing.

The system for preventing hand fluctuations from acting on the camera will be briefly described below.

In general, the hand fluctuations of the photographer using the camera in a photographing operation fall within vibrations of 1 Hz to 12 Hz. According to a basic concept of taking a picture without any image blur even with hand fluctuations at the time of a shutter release operation of the camera, camera vibrations caused by the above hand fluctuations are detected, and an image blur is corrected by displacing a correction lens in accordance with the detection value. In order to achieve the above object (i.e., to take a picture without any image blur even with camera vibrations), first, camera vibrations must be accurately detected, and second, a change in optical axis due to hand fluctuations must be corrected.

In principle, these vibrations (camera vibrations) can be detected by mounting a vibration detection means and a camera fluctuation detection means in a camera. The vibration detection means detects an angular acceleration, an angular velocity, an angular displacement, or the like. The camera fluctuation detection means electrically or mechanically integrates the output signal from the vibration detection means to output an angular displacement. Image blur suppression can be performed by driving a correction optical device for offsetting the photographic optical axis on the basis of the detection information.

An image blur prevention system using a vibration detection means will be briefly described below with reference to FIG. 27.

The system shown in FIG. 27 is designed to suppress an image blur caused by vertical camera vibrations 81$p$ and lateral camera vibrations 81$y$ in the directions indicated by arrows 81 in FIG. 27.

Referring to FIG. 27, the system includes a lens barrel 82, and vibration detection means 83$p$ and 83$y$ for respectively detecting vertical camera vibrations and lateral camera vibrations in vibration detecting directions 84$p$ and 84$y$. The system also includes a correction optical device 85 (coils 86$p$ and 86$y$ for giving a thrust to the correction optical device 85, and position detection elements 86$p$ and 86$y$ for detecting the position of the correction optical means 85). The correction optical means 85 has a position control loop to be described later. The correction optical means 85 is driven in accordance with outputs from the vibration detection means 83$p$ and 83$y$ as a target value, thereby stabilizing an image plane 88.

FIG. 28 is an exploded perspective view showing the structure of a blur correction device (constituted by a correction means, a means for supporting and engaging the correction means, and the like; to be described in detail later). This structure will be described below with reference to FIGS. 28 to 37.

Rear surface lugs 71$a$ (three lugs (one of which is hidden)) of a base plate 71 (FIG. 31 is an enlarged view) are fitted in the lens barrel (not shown), and known lens barrel rollers are fixed in holes 71$b$ with screws, thereby fixing the base plate 71 to the lens barrel.

A second yoke 72 made of a magnetic material and coated with glassy plating is fixed in holes 71$c$ of the base plate 71 with screws extending through holes 72$a$. Permanent magnets (shift magnets) 73 such as neodymium magnets are magnetically attracted to the second yoke 72. Note that the directions of magnetization of the respective permanent magnets 73 are indicated by arrows 73$a$ in FIG. 28.

Coils 76$p$ and 76$y$ (shift coils) are forcibly pushed into a support frame 75 (FIG. 32 is an enlarged view), to which a correction lens 74 is fixed with a C ring and the like, to be joined thereto (snap-fastened) (in the state shown in FIG. 32, these coils are not bonded to the support frame). Light-emitting elements 77$p$ and 77$y$ such as IREDs or the like are bonded to the rear surface of the support frame 75. Light beams emitted from the light-emitting elements 77$p$ and 77$y$ are incident on position detection elements 78$p$ and 78$y$ such as PSDs (to be described later).

Support balls 79$a$ and 79$b$ made of POM (polyacetal resin) or the like and having round distal ends and a charge spring 710 (see FIGS. 29 and 31) are inserted into each of holes 75$b$ (three holes) of the support frame 75. The support ball 79$a$ is fixed to the support frame 75 by thermal caulking (the support ball 79$b$ can slidably move in the extending direction of the hole 75$b$ against the biasing force of the charge spring 710).

FIG. 29 is a cross-sectional view of the blur correction device after assembly. The support ball 79$b$, the charged charge spring 710, and the support ball 79$a$ (the support balls 79$a$ and 79$b$ are parts having the same shape) are sequentially inserted into the hole 75$b$ of the support frame 75 in the direction indicated by an arrow 79$c$. Finally, a peripheral portion 75$c$ of the hole 75$b$ of the support frame 75 is thermally caulked to prevent the removal of the support ball 79$a$.

FIG. 30A is a sectional view of the hole 75$b$, taken along a direction perpendicular to FIG. 31. FIG. 30B is a plan view of the structure in FIG. 30A when viewed from the direction indicated by an arrow 30B. The depth ranges denoted by reference symbols A to D in FIG. 30B are denoted by reference symbols A to D in FIG. 30A.

In this case, since the rear end portion of a vane portion 79$aa$ of the support ball 79$a$ is received and restrained within the depth range A, the support ball 79$a$ is fixed to the support frame 75 by thermally caulking a peripheral portion 75$a$.

Since the distal end portion of a vane portion 79$ba$ of the support ball 79$b$ is received with the depth range B, the support ball 79$b$ is not removed from the hole 75$b$ owing to the biasing force of the charge spring 710 in the direction indicated by the arrow 79$c$.

When the blur correction device is assembled, the support ball 79$b$ is received by the second yoke 72, as shown in FIG. 29. For this reason, the support ball 79$b$ is not removed from the support frame 75, but a removal prevention range B surface is set in consideration of assembly efficiency.

According to the shape of the hole 75$b$ of the support frame 75 in FIGS. 29, 30A, and 30B, no complicated inner diameter slide mold is required to form the support frame 75 by molding, and a simple two-piece mold from which a molded product is removed in a direction opposite the direction indicated by the arrow 79c can be used to form the support frame 75. Therefore, a strict dimensional precision can be set.

As described above, since the support balls 79a and 79b are identical parts, a reduction in parts cost can be attained. In addition, no assembly error is caused, and hence there is an advantage in terms of parts management.

A bearing portion 75d of the support frame 75 is coated with, e.g., fluorine-based grease, and an L-shaped shaft 711 (nonmagnetic stainless steel member) is inserted in the bearing portion 75d (see FIG. 28). The other end of the L-shaped shaft 711 is inserted into a bearing portion 71d (coated with grease) formed in the base plate 71, and the support frame 75 is housed in the base plate 71 with the three support balls 79b being mounted on the second yoke 72.

Positioning holes 712a (three holes) of a first yoke 712 in FIG. 28 are fitted on pins 71f (three pins) of the base plate 71 in FIG. 30. Similarly, the first yoke 712 is received on reception surfaces 71e (five surfaces) in FIG. 31 to be magnetically coupled to the base plate 71 (by the magnetic forces of the permanent magnets 73).

With this structure, the rear surface of the first yoke 712 is in contact with the support balls 79a, and the support frame 75 is clamped between the first and second yokes 712 and 72. As a result, the support frame 75 is positioned in the optical axis direction.

The contact surfaces between the support balls 79a and 79b and the first and second yokes 712 and 72 are coated with fluorine-based grease, and the support frame 75 can slidably move freely with respect to the base plate 71 within a plane perpendicular to the optical axis.

The above shaft 711 supports the support frame 75 such that the support frame 75 can slidably move with respect to the base plate 71 in only the directions indicated by arrows 713p and 713y, thereby restricting the relative rotation (rolling) of the support frame 75 about the optical axis with respect to the base plate 71.

The fitting backlashes between the L-shaped shaft 711n and bearing portion 75d are set to be large in the optical axis direction to prevent restriction in the optical axis direction and redundant fitting due to clamping of the support balls 79a and 79b and the first and second yokes 712 and 72.

The surface of the first yoke 712 is covered with an insulating sheet 714, and positioning holes 715a (two holes) of a hard substrate 715 having a plurality of ICs (the position detection elements 78p and 78y, output amplifying ICs, ICs for driving the coils 76p and 76y, and the like) mounted thereon are fitted on pins 71h (two pins) of the base plate 71 in FIG. 20. The hard substrate 715 is then coupled to the base plate 71 with screws through holes 715b, holes 712b of the first yoke 712, and holes 71g of the base plate 71.

The position detection elements 78p and 78y are positioned and soldered to the hard substrate 715 with a tool, and a surface 716a of a flexible substrate 716 for signal transmission is contact-bonded to a range 715c (defined by the dotted line in FIG. 28) on the rear surface of the hard substrate 715 by heat.

A pair of arms 716bp and 716by extend from the flexible substrate 716 toward a plane perpendicular to the optical axis, and are respectively hooked on hook portions 75ep and 75ey (see FIG. 32) of the support frame 75. The terminals of the light-emitting elements 77p and 77y and the terminals of the coils 76p and 76y are soldered.

With this structure, the light-emitting elements 77p and 77y such as IREDs and the coils 76p and 76y are driven from the hard substrate 715 through the flexible substrate 716.

The arms 716bp and 716by (see FIG. 32) of the flexible substrate 716 respectively have bent portions 716cp and 716cy. The elasticity of these bent portions reduces the loads on the arms 716bp and 716by which are produced when the support frame 75 moves within the plane perpendicular to the optical axis.

The first yoke 712 has punched protruding surfaces 712c. The protruding surfaces 712c are in direct contact with the hard substrate 715 through holes 714a of the insulating sheet 714. A ground (GND) pattern is formed on the contact surface on the hard substrate 715 side. The hard substrate 715 is coupled to the base plate 71 with screws to ground the first yoke 712, thereby preventing it from serving as an antenna and giving noise to the hard substrate 715.

A mask 717 in FIG. 28 is positioned to the pins 71h of the base plate 71 and fixed on the hard substrate 715 with a double-coated adhesive tape.

A permanent magnet through hole 71i (see FIGS. 28 and 31) is formed in the base plate 71. The rear surface of the second yoke 72 is exposed through this hole. A permanent magnet 718 (lock magnet) is fitted in the through hole 71i to be magnetically coupled to the second yoke 72 (see FIG. 29)

A coil 720 (lock coil) is bonded to a lock ring 719 (see FIGS. 28, 29, and 33), and a bearing 719b (see FIG. 34) is formed on the rear surface of a lug 719a of the lock ring 719. Armature rubber 722 is fitted on an armature pin 721 (see FIG. 28). The armature pin 721 is inserted into the bearing 719b. An armature spring 723 is fitted on the armature pin 721. The armature pin 721 is then fitted in an armature 724 and fixed therein by caulking.

The armature 724 can therefore slidably move with respect to the lock ring 719 in the direction indicated by an arrow 725 against the charge force of the armature spring 723.

FIG. 34 is a plan view of the blur correction device after assembly, viewed from the rear surface direction in FIG. 28. Referring to FIG. 34, the lock ring 719 is pressed into the base plate 71 such that outer notched portions 719c (three portions) of the lock ring 719 are fitted on inner projections 71j (three portions) of the base plate 71. Thereafter, the lock ring 719 is rotated clockwise to prevent it from being removed. That is, the lock ring 719 is fixed to the base plate 71 by known bayonet coupling.

The lock ring 719 can therefore rotate about the optical axis with respect to the base plate 71. If, however, the lock ring 719 rotates, and the outer notched portions 719c and the inner projections 71j become in phase, bayonet coupling is released. To prevent this, lock rubber 726 (see FIGS. 28 and 34) is forcibly inserted in the base plate 71 to restrict the rotation of the lock ring 719 to an angle θ (see FIG. 34) of a notched portion 719d restricted by the lock rubber 726.

Permanent magnets 718 (lock magnets) are also mounted on a magnetic lock yoke 727 (see FIG. 28). Holes 727a (two holes) of the lock yoke 727 are fitted on pins 71k (see FIG. 34) of the base plate 71, and the permanent magnets 718 are coupled to the lock yoke 727 with screws through holes 727b (two holes) and holes 71n (two holes).

A known closed magnetic path is constituted by the permanent magnets 718 on the base plate 71, the permanent magnets 718 on the lock yoke 727, the second yoke 72, and the lock yoke 727.

Removal of the lock rubber 726 is prevented by coupling the lock yoke 727 to the base plate 71 with screws. Note that illustration of the lock yoke 727 is omitted from FIG. 34 for the sake of descriptive convenience.

A lock spring 728 is hooked between a hook 719e of the lock ring 719 and a hook 71m of the base plate 71 (see FIG. 34) to bias the lock ring 719 clockwise. An absorption coil 730 is inserted into an absorption yoke 729 (see FIGS. 28 and 34) and coupled thereto through a hole 729a of the base plate 71 with a screw.

The terminals of the coil 720 and the absorption coil 730 are soldered, in the form of a twisted pair of Teflon-coated four-stranded wires, to a trunk portion 716d of the flexible substrate 716.

The mechanical portion of the blur correction device is roughly constituted by the following three elements: the correction means for decentering the optical axis, the means for supporting the correction means, and the means for engaging the correction means.

The correction means is constituted by the correction lens 74, the support frame 75, the coils 76p and 76y, the IREDs 77p and 77y, the position detection elements 78p and 78y, the ICs 731p and 731y, the support balls 79a and 79y, the charge spring 710, and the shaft 711. The support means is constituted by the base plate 71, the second yoke 72, the permanent magnets 73, and the first yoke 712. The engaging means is constituted by the permanent magnets 718, the lock ring 719, the coil 720, the armature pin 721, the armature rubber 722, the armature spring 723, the armature 724, the lock rubber 726, the lock yoke 727, the lock spring 728, the absorption yoke 729, and the absorption coil 730.

Of the components of the correction means, the correction lens 74 and the support frame 75 constitute the correction optical system, the PSDs 78p and 78y, the ICs 731p and 731y, and the IREDs 77p and 77y constitute the position detection means, and the coils 76p and 76y, the second yoke 72, the permanent magnets 73, and the first yoke 712 constitute the drive means. That is, the main constituent elements of the correction means are the correction optical system, the position detection means, and the drive means for driving the correction optical system.

The image blur prevention system (image blur prevention apparatus) is constituted by the blur correction device, the vibration detection means (see FIG. 27), and the following calculation means shown in FIG. 35.

The ICs 731p and 731y on the hard substrate 715 respective serve as ICs for amplifying outputs from the position detection elements 78p and 78y. FIG. 35 shows the internal arrangement of each IC (since the ICs 731p and 731y have the same arrangement, only the IC 731p is shown in this case).

Referring to FIG. 35, current/voltage conversion amplifiers 731ap and 731bp convert photocurrents $78i_1p$ and $78i_2p$ generated by the light-emitting element 77p and the position detection element 78p (constituted by resistors R1 and R2) into voltages. A differential amplifier 731cp obtains the difference between outputs from the current/voltage conversion amplifiers 731ap and 731bp, and amplifies it.

As described above, the light beams emitted from the light-emitting elements 77p and 77y are incident on the position detection elements 78p and 78y through the slits 75ap and 75ay. When the support frame 75 moves within a plane perpendicular to the optical axis, the positions of light beams incident on the position detection elements 78p and 78y change.

The position detection element 78p is sensitive in the direction indicated by an arrow 78ap (see FIG. 28). Since the slit 75ap is shaped such that a light beam diverges in a direction (direction 78ay) perpendicular to the direction indicated by the arrow 78ap, and converges in the direction indicated by the arrow 78ap, the balance between the photocurrents $78i_1p$ and $78i_2p$ in the position detection element 78p changes only when the support frame 75 moves in the direction indicated by the arrow 713p. As a result, the differential amplifier 731cp outputs a signal corresponding to the direction indicated by the arrow 713p of the support frame 75.

The position detection element 78y is sensitive in the direction indicated by the arrow 78ay (see FIG. 28), and the slit 75ay is shaped to extend in a direction (direction 78ap) perpendicular to the direction indicated by the arrow 78ay. For this reason, the position detection element 78y changes its output only when the support frame 75 moves in the direction indicated by the arrow 713y.

An addition amplifier 731dp obtains the sum of outputs from the current/voltage conversion amplifiers 731ap and 731bp (the total amount of light received by the position detection element 78p). Upon reception of this signal, a drive amplifier 731ep drives the light-emitting element 77p in accordance with the signal.

Since the amount of light emitted from the light-emitting element 77p changes very unstably with changes in temperatures and the like, the absolute amount ($78i_1p+78i_2p$) of the photocurrents $78i_1p$ and $78i_2p$ in the position detection element 78p changes accordingly. For this reason, the output ($78i_1p - 78i_2p$) from the differential amplifier 731cp which indicates the position of the support frame 75 also changes.

If, however, the light-emitting element 77p is controlled by the above drive circuit such that the sum total of light received becomes constant, the output from the differential amplifier 731cp is made constant.

The coils 76p and 76y in FIG. 34 are located in the closed magnetic path constituted by the permanent magnets 73, the first yoke 712, and the second yoke 72. When a current flows in the coil 76p, the support frame 75 is driven in the direction indicated by the arrow 713p (according to the known Fleming's left-hand rule). When a current flows in the coil 76y, the support frame 75 is driven in the direction indicated by the arrow 713y.

In general, if outputs from the position detection elements 78p and 78y are amplified by the ICs 731p and 731y, and the coils 76p and 76y are driven by the outputs from the ICs 731p and 731y, the support frame 75 is driven, and the outputs from the position detection elements 78p and 78y change.

Assume that the drive directions (polarities) of the coils 76p and 76y are set such that the outputs from the position detection elements 78p and 78y decrease (negative feedback). In this case, the support frame 75 is stabilized at the position where the outputs from the position detection elements 78p and 78y become almost zero owing to the drive forces of the coils 76p and 76y.

Such a technique of driving the coils by negatively feeding back position detection outputs is called a position control technique. If, for example, a target value (e.g., hand fluctuation angle signal) is externally input to the ICs 731p and 731y, the support frame 75 is driven very faithfully in accordance with the target value.

In practice, the outputs from the differential amplifiers 731cp and 731cy are sent to a main substrate (not shown) through the flexible substrate 716, in which the outputs undergo analog/digital conversion (A/D conversion). The resultant data is loaded into a microcomputer.

In the microcomputer, the data is properly compared with the target value (hand fluctuation angle signal) and amplified, and is subjected to phase lead compensation (to further stabilize position control) based on a known digital filter technique. The resultant data is input to an IC 732 (for driving the coils 76p and 76y) through the flexible substrate 716. The IC 732 preforms a known PWM (Pulse Width Modulation) drive operation with respect to the coils 76p and 76y on the basis of the input signal, thereby driving the support frame 75.

As described above, the support frame 75 can slidably move in the directions indicated by the arrows 713p and 731y, and the position of the support frame 75 is stabilized by the above position control technique. In consumer optical equipment such as cameras, the support frame 75 cannot always be controlled in consideration of power consumption.

In the non-controlled state, the support frame 75 can freely move within a plane perpendicular to the optical axis. In this case, some measures must be taken against the generation of sounds and damage that are caused by collision at stroke ends.

As shown in FIGS. 34, 36A, and 36B, three projections 75f radially extend from the rear surface of the support frame 75. As shown in FIGS. 36A and 36B, the distal ends of the projections 75f are fitted in an inner surface 719g of the lock ring 719. The support frame 75 is therefore restrained in all directions with respect to the base plate 71.

FIGS. 36A and 36B are plan views showing the relationship between the operation of the lock ring 719 and that of the support frame 75; they are plan views of only the main part extracted from FIG. 34. Note that the layout of this structure slightly differs from that of the actually assembled structure for the sake of descriptive convenience. As shown in FIGS. 29 and 33, since the cam portions 719f (three portions) are not formed on the entire cylindrical portion of the lock ring 719 in the generating line direction, they cannot be actually seen from the direction of FIG. 34. However, the cam portions 719f are shown for the sake of descriptive convenience.

As shown in FIG. 29, the coil 720 (leads 720a made of four-stranded wires are formed on a flexible substrate (not shown), extend along the outer surface of the lock ring 719, and are connected to terminals 719h and terminals 716e on the trunk portion 716d of the flexible substrate 716) is placed in the closed magnetic path surrounded by the permanent magnets 718. A current is supplied to the coil 720 to generate a torque that rotates the lock ring 719 about the optical axis.

This drive operation for the coil 720 is controlled by an instruction signal input from the microcomputer (not shown) to a drive IC 733 on the hard substrate 715 through the flexible substrate 716. The IC 733 performs a PWM drive operation for the coil 720.

Referring to FIG. 36A, the turn direction of the coil 720 is set such that when the coil 720 is energized, a counter-clockwise torque is generated in the lock ring 719. With this setting, the lock ring 719 rotates counterclockwise against the biasing force of the lock spring 728.

Note that the lock ring 719 is stable in contact with the lock rubber 726 owing to the force of the lock spring 728 before the coil 720 is energized.

When the lock ring 719 rotates, the armature 724 comes into contact with the absorption yoke 729 to make the armature spring 723 contract and to equalize the positional relationship between the absorption yoke 729 and the armature 724. As a result, the lock ring 719 stops rotation, as shown in FIG. 36B.

FIG. 37 is a timing chart showing a drive operation for the lock ring 719.

At the time point indicated by an arrow 719i, the coil 720 is energized (the PWM drive operation indicated by an arrow 720b), and at the same time, the absorption coil 730 is energized (730a). As a result, the armature 724 comes into contact with the absorption yoke 729 to equalize their position relationship. At this time, the armature 724 is attracted to the absorption yoke 729.

When the energization of the coil 720 is stopped at a time point 720c in FIG. 37, the force of the lock spring 728 acts on the lock ring 719 to rotate it clockwise. As described above, however, since the armature 724 is attracted to the absorption yoke 729, the rotation of the lock ring 719 is restrained. At this time, since the projections 75f of the support frame 75 are at the positions where they oppose the cam portions 719f (the cam portions 719f move to the positions upon rotation), the support frame 75 can move only by the clearance between each of the projections 75f and a corresponding one of the cam portions 719f.

For this reason, the support frame 75 falls in the direction of gravity G (see FIG. 36B). However, since the support frame 75 is also set in the controlled state at the time point indicated by the arrow 719i in FIG. 27, the support frame 75 does not fall.

The support frame 75 in the non-controlled state is restrained by the inner surface of the lock ring 719, but actually has a backlash corresponding to the fitting backlash between each of the projections 75f and the inner surface 719g. That is, the support frame 75 falls in the gravity G direction by this backlash, and hence the center of the support frame 75 is offset from the center of the base plate 71. For this reason, control is performed to slowly move the center (the center of the optical axis) of the base plate 71 from the time point indicated by the arrow 719i, spending, for example, one second.

Such a slow centering operation is performed for the following reason. If the center of the base plate 71 is quickly moved, the photographer feels image fluctuations through the correction lens 74, and hence feels uncomfortable. Even if exposure is performed during this period, no deterioration in image quality occurs upon movement of the support frame 75 (for example, the support frame 75 is moved by 5 $\mu$m in ⅛ seconds).

More specifically, outputs from the position detection elements 78p and 78y are stored at the time point indicated by the arrow 719i in FIG. 37, and control on the support frame 75 is started with the outputs being set as a target value. Thereafter, about one second passes to move the support frame 75 in accordance with the target value set in advance at the time corresponding to the center of the optical axis (see "75g" in FIG. 37).

After the lock ring 719 is rotated (in the unlock state), the support frame 75 is driven in accordance with the target value from the vibration detection means (concurrently with the above operation of moving the support frame 75 to the central position), thereby starting image blur prevention.

When the image blur prevention operation is set in the OFF state to end image blur prevention at the time point indicated by an arrow 719j, no target value is input from the vibration detection means to the correction drive means for driving the correction means. As a result, the support frame 75 is controlled and stopped at the central position. At this time, the energization of the absorption coil 730 is stopped (730b). The attracting force of the absorption yoke 729 with respect to the armature 724 is then lost, and the lock ring 719 is rotated clockwise by the lock spring 728 to return to the state shown in FIG. 36A. At this time, since the lock ring 719 comes into contact with the lock rubber 726 to be restrained from rotation, the collision sound of the lock ring 719 is suppressed.

After this operation (e.g., 20 msec after), control on the correction drive means is stopped, and the operation indicated by the timing chart in FIG. 37 is ended.

FIGS. 38 and 39 are block diagrams showing the schematic arrangement of the blur prevention system.

Referring to FIGS. 38 and 39, a vibration detection means 91 corresponds to the vibration detection means 83p and 83y, and is constituted by a fluctuation sensor such as a vibration gyroscope for detecting an angular velocity, and a sensor output calculation means for obtaining an angular displacement by cutting the DC components of the fluctuation sensor output and integrating the resultant data.

An angular displacement signal from the vibration detection means 91 is input to a target value set means 92. As shown in FIGS. 38A and 38B, the target value set means 92 includes a variable differential amplifier 92a and a sample/hold circuit 92b. Since the sample/hold circuit 92b is always performing a sampling operation, two signals input to the variable differential amplifier 92a are always the same, and the output from the variable differential amplifier 92a is zero. When, however, the sample/hold circuit 92b is set in the hold state in response to an output from a delay means 93, the variable differential amplifier 92a starts to continuously output data, with the output at the start time being zero.

The amplification factor of the variable differential amplifier 92a can be changed in accordance with an output from an image blur prevention sensitivity setting means 94 for the following reason. A target value signal from the target value set means 92 is a target value (instruction signal) that a correction means 910 must follow. However, the image plane correction amount (image blur prevention sensitivity) with respect to the drive amount of the correction means 910 changes depending on optical characteristics such as zoom and focus characteristics based on changes in focus, and hence a change in image blur prevention sensitivity must be compensated.

As shown in FIGS. 38A and 38B, therefore, focus/focal distance information based on focal distance information by zoom from a zoom information output means 95 and distance measuring information from an exposure preparation means 96 is input to the image blur prevention sensitivity setting means 94 in advance, and the image blur prevention sensitivity setting means 94 calculates an image blur prevention sensitivity on the basis of the input information, or extracts a preset image blur prevention sensitivity in accordance with the input information, thereby changing the amplification factor of the variable differential amplifier 92a in the target value set means 92.

A correction drive means 97 corresponds to the ICs 731p, 731y, and 732 mounted on the hard substrate 715 in FIG. 28. A target value from the target value set means 92 is input as an instruction signal to the correction drive means 97.

A correction start means 98 is a switch for controlling connection between the IC 732 on the hard substrate 715 in FIG. 28 and the coils 76p and 76y of the correction means 910. As shown in FIG. 37, in a normal operation, a switch 98a is connected to a terminal 98c to short-circuit the two ends of each of the coils 76p and 76y. Upon reception of a signal from a logical product means 99, the correction start means 98 connects the switch 98a to a terminal 98b to set the correction means 910 in the controlled state (although blur correction is not performed yet, power is supplied to the coils 76p and 76y to stabilize the correction means 910 at the position where signals from the position detection elements 78p and 78y become almost zero). At the same time, the output signal from the logical product means 99 is also input to an engagement device 914. With this operation, the engagement device 914 release the engagement of the correction means 910.

Note that the correction means 910 supplies the position signals from the position detection elements 78p and 78y to the correction drive means 97 to perform position control in the manner described above.

When the logical product means 99 receives both a signal SW1, which is output when a release means 911 is half-depressed, and an output signal from an image blur prevention switch means 912, an AND gate 99a (see FIGS. 38A and 38B) as a constituent element of the logical product means 99 outputs a signal. More specifically, as shown in FIGS. 38A and 38B, when the photographer operates the image blur prevention switch of the image blur prevention switch means 912, and half-depresses the release means 911, the engagement of the correction means 910 is released. As a result, the correction means 910 is set in the controlled state.

The signal SW1 generated when the release means 911 is half-depressed is input to the exposure preparation means 96, as shown in FIGS. 38A and 38B. With this operation, photometry, distance measuring, and a lens drive operation for in-focus are performed, and the resultant focus information is input to the image blur prevention sensitivity setting means 94.

The delay means 93 receives an output signal from the logical product means 99, and outputs a signal, for example, one second after the reception of the signal, thereby causing the target value set means 92 to output a target value signal, as described above.

Although not shown, the vibration detection means 91 also starts operation in synchronism with the signal SW1 generated when the release means 911 is half-depressed. As described above, a certain period of time is required until the output from the sensor output calculation means including a large-time-constant circuit such as an integrator is stabilized after the start of operation.

The delay means 93 waits until the output from the vibration detection means 91 is stabilized, and then causes the vibration detection means 91 to output a target value signal to the correction means 910. That is, image blur prevention is started after the output from the vibration detection means 91 is stabilized.

An exposure means 913 performs a mirror up operation upon reception of a signal SW2 generated when the release means 911 is full-depressed, and performs exposure by opening/closing the shutter at the shutter speed obtained on the basis of a photometric value from the exposure preparation means 96. Thereafter, the vibration detection means 91 performs a mirror down operation to end the photographing operation.

When the photographer releases his/her hand from the release means 911 to disable the signal SW1, the logical product means 99 stops outputting data. As a result, the sample/hold circuit 92b of the target value set means 92 is set in a sampling state, and the output from the variable differential amplifier 92a becomes zero. The correction means 910 therefore returns to the controlled state in which the correction drive operation is stopped.

When the output from the logical product means 99 is disabled, the engagement device 914 engages the correction means 910. Thereafter, the switch 98a of the correction start means 98 is connected to the terminal 98c, and the correction means 910 is set in the non-controlled state.

The vibration detection means 91 keeps operating for a predetermined period of time (e.g., five seconds) even after the operation of the release means 911 is stopped in accordance with a timer (not shown). After the predetermined period of time, the vibration detection means 91 stops. This operation is performed for the following reason. After a release operation is complete, the photographer often performs a release operation again. With the above operation, the vibration detection means 91 need not be started every time a release operation is performed, and the wait time required to stabilize the output from the vibration detection means 91 can be shortened. If the vibration detection means 91 has already been started, the vibration detection means 91 sends an already started signal to the delay means 93 to shorten the delay time.

FIG. 40 is a flow chart showing a procedure by which the microcomputer performs the above operation.

When the power switch of the camera is turned on, the microcomputer checks the state of the image blur prevention switch first. If it is determined that the switch is ON, the microcomputer checks whether the signal SW1 is generated upon half-depression of the release means 911 (steps #5001 and #5002). If it is determined that the signal SW1 is generated, the microcomputer starts the internal timer (step #5003). The microcomputer then starts photometry, distance measuring, and fluctuation detection, and releases the engagement of the correction means 910 to allow it to perform image blur prevention control (step #5004).

The microcomputer checks whether the count value of the timer has reached a predetermined time t1, and repeats this step until the count value reaches the predetermined time t1 (step #5005). This processing is performed to wait until the sensor output is stabilized, as described above. When the predetermined time t1 has passed, the microcomputer drives the correction means 910 on the basis of the target value signal, and starts image blur prevention control (step #5006).

The microcomputer checks whether the signal SW2 is generated upon full-depression of the release means 911 (step #5007). If it is determined that the signal SW2 is not generated, the microcomputer checks again whether the signal SW1 is generated. If it is determined that the signal SW1 is not generated (NO in step #5008), the microcomputer stops image blur prevention control, and engages the correction means 910 at a predetermined position (steps #5011 and #5012).

If it is determined that the signal SW2 is not generated, but the signal SW1 is generated, the microcomputer repeats steps #5007, #5008, #5007,. . ... If the release means 911 is full-depressed, and the signal SW2 is generated in this state (YES in step #5007), the microcomputer performs exposure to a film (step #5009). The microcomputer then checks the state of the signal SW1 (step #5010). If it is determined that the signal SW1 is OFF, the microcomputer stops image blur prevention control, and engages the correction means 910 at the predetermined position (steps #5011 and #5012).

When the above operation is complete, the microcomputer resets the timer and starts it again (step #5013), and checks again whether the signal SW1 is generated within a predetermined period of time (five seconds in this case) (steps #5014, #5015, #5014,. . .). If it is determined that the signal SW1 is generated again within five seconds after image blur prevention is stopped (YES in step #5015), the microcomputer performs photometry and distance measuring, and releases the engagement of the correction means 910 (step #5016). Since fluctuation detection is continued, the microcomputer immediately performs drive control on the correction means 910 on the basis of the target value signal (step #5006). Subsequently, the same operation as that described above is repeated.

With this processing, as described above, when the photographer performs a release operation following a preceding release operation, the microcomputer need not start the vibration detection means 91 or wait until the output is stabilized.

If it is determined that the signal SW1 is not generated within five seconds after image blur prevention is stopped (YES in step #5014), the microcomputer stops fluctuation detection (stops driving the vibration detection means 91) (step #5017). Thereafter, the flow returns to step #5001 to wait until the image blur prevention switch is turned on.

As shown in FIG. 28, the above blur correction device incorporated in the image blur prevention system is constituted by many parts, and hence is not suitable for reductions in size and weight. In addition, since the coils 76p and 76y and the infrared-emitting diodes (IREDS) 77p and 77y are mounted on the movable support frame 75, the flexible substrate 716 needs to have the arms 716bp and 716by for supplying power. Wiring for these parts and soldering of them to the coils 76p and 76y and the IREDs 77p and 77y are complicated operations, resulting in operation failures. Furthermore, the leads of the coils 720 and the absorption coil 730 must be soldered to the trunk portion 716d of the flexible substrate 716 in a step different from the step of soldering other parts because soldering of the leads of the coils is performed in a direction different from that of the other soldering step.

In the above blur correction device, the position of the correction means is detected by the PSDs 78p and 78y and the IREDs 77p and 77y, as shown in FIG. 28. These parts must be mounted on the hard substrate 715 and the support frame 75. In addition, the arms 716bp and 716by must be formed on the flexible substrate 716 to supply power to the IREDs 77p and 77y, and these parts must be mounted on the support frame 75.

However, these operations are complicated, and must be performed at many portions, and hence many errors occur in assembly, resulting in a deterioration in reliability.

In the above blur correction device of the image blur prevention system, the terminals of the coils 76p and 76y fixed to the support frame 75 are soldered to the arms 716bp and 716by. In this case, since the coils 76p and 76y are bonded/fixed to the support frame 75, the adhesive amount must be strictly controlled. More specifically, if the adhesive amount is large, the adhesive interferes with other members. As a result, the support frame 75 cannot be smoothly driven. In contrast to this, if the adhesive amount is small, the coils 76p and 76y may come off the support frame 75, resulting in a deterioration in reliability.

Since the coil terminals are flexible, when the terminals are to be soldered, they must be kept in contact with solder lands with tweezers or the like, resulting in poor operability. In addition, failures in soldering occur as in the above case, resulting in poor reliability.

The coil 720 of the lock ring 719 is also soldered to the rear surface (right side in FIG. 28) of the trunk portion 716d of the flexible substrate 716. Since the direction of soldering of the coil 720 differs from the direction of soldering of the coils 76p and 76y to the flexible substrate 716 (the arms 716bp and 716by), i.e., the coils 76p and 76y and the coil 720 are soldered to the flexible substrate 716 in different directions, the assembly efficiency is low, and the reliability of soldering is also low.

Furthermore, since the coils 76p and 76y and the coil 720 are arranged to sandwich the base plate 71, the overall device becomes thick.

SUMMARY OF THE INVENTION

According to one embodiment of the invention, there is provided an image blur prevention apparatus comprising a movable member for preventing an image blur, a support portion for movably supporting the movable member, and a drive device for driving the movable member with respect to the support portion, the drive device including a coil mounted on the support portion, and a permanent magnet mounted on the movable member, the permanent magnet opposing one side of the coil and forming a magnetic path on an opposite side of the coil to the side where the coil opposes the permanent magnet without using any magnetic member. With this arrangement, the necessity for wiring for the movable member is eliminated to simplify the assembly process. In addition, since no magnetic member is placed on the opposite side of the coil to the side where the coil opposes the permanent magnet, a simple structure can be realized.

According to another embodiment of the invention, there is provided an image blur prevention apparatus comprising a movable member for preventing an image blur, a support portion for movably supporting the movable member, and a drive device which includes a conductive member conducting a current and a magnetic force generating member for always generating a magnetic force and drives the movable member with respect to the support portion, the conductive member being mounted on the support portion, the magnetic force generating member being mounted on the movable member, and the magnetic force generating member opposing one side of the conductive member and forming a magnetic path on an opposite side of the conductive member to the side where the conductive member opposes the magnetic force generating member without using any magnetic member. With this arrangement, the necessity for wiring for the movable member is eliminated to simplify the assembly process. In addition, since no magnetic member is placed on the opposite side of the conductive member to the side where the conductive member opposes the magnetic force generating member, a simple structure can be realized.

Another embodiment of the invention, there is provided an image blur prevention apparatus comprising a movable member which is displaced at least linearly to prevent an image blur, a support portion for supporting the movable member such that the movable member can be linearly displaced, and a drive device for driving the movable member with respect to the support portion, the drive device including a coil mounted on the support portion, and a permanent magnet mounted on the movable member. With this arrangement, in linearly displacing the movable member, there is no need to perform wiring for the movable member, thereby simplifying the assembly process.

BRIEF DESCRIPTION OF THE DRAWINGS

FIG. 5A is a plan view showing the structure of a coil unit according to the first embodiment of the present invention;

FIG. 5B is a side view showing the structure of the coil unit according to the first embodiment of the present invention;

FIG. 5C is a sectional view taken along a line 5C—5C in FIG. 5B;

FIG. 6A is a schematic sectional view showing a blur correction drive means according to the first embodiment of the present invention;

FIG. 6B is a schematic sectional view showing a blur correction drive means according to an undesirable example of the present invention;

FIG. 6C is a schematic sectional view showing a conventional blur correction drive means;

FIG. 11A is a schematic sectional view showing the structure of a blur correction drive means in the first embodiment of the present invention;

FIG. 11B is a schematic sectional view showing the structure of a blur correction drive means in the second embodiment of the present invention;

FIG. 40 is a flow chart schematically showing the operation of the camera having the circuit arrangement shown in FIG. 28.

DETAILED DESCRIPTION OF THE PREFERRED EMBODIMENTS

The embodiments of the present invention will be described in detail below with reference to the accompanying drawings.

Figure 1:
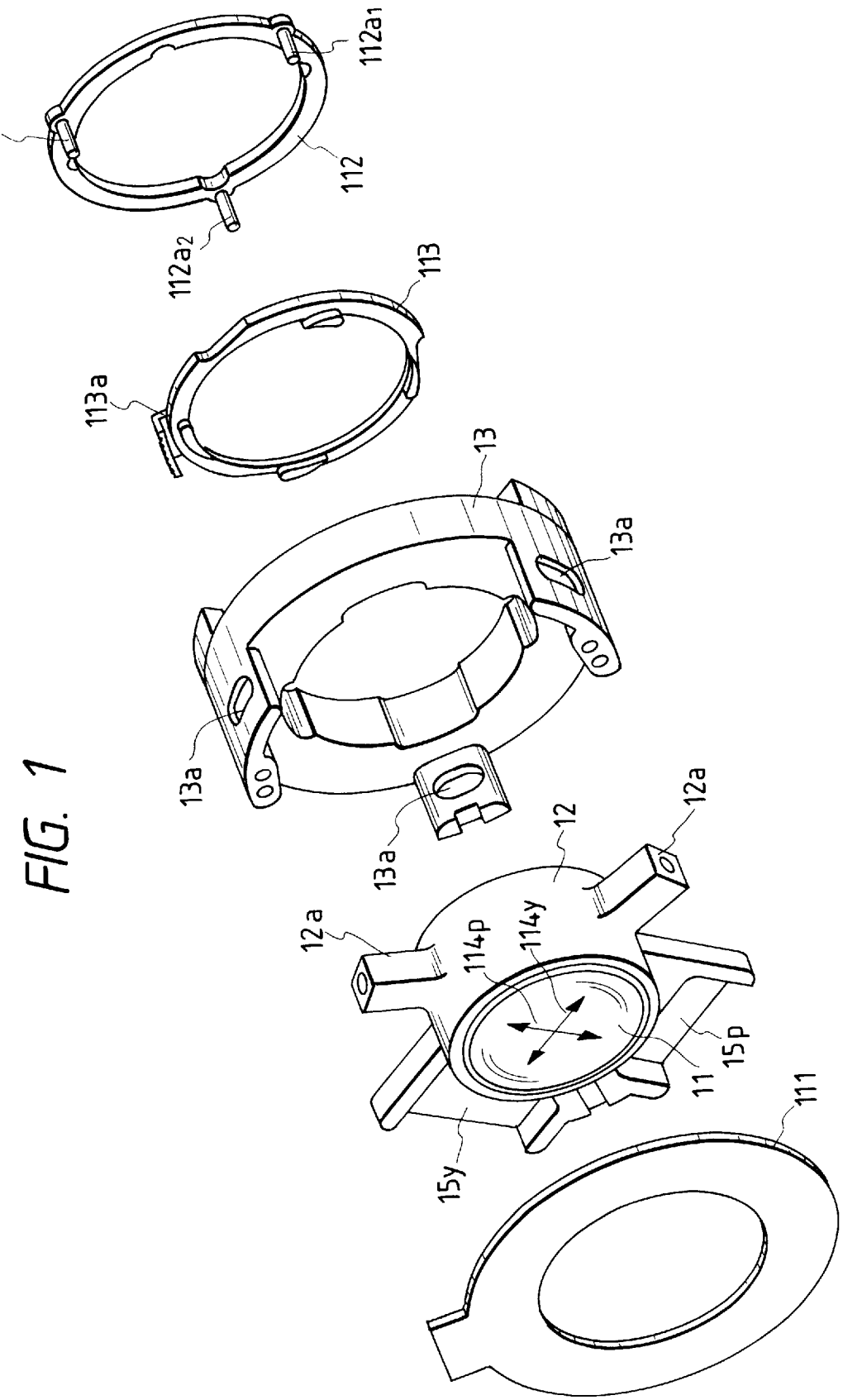
FIG. 1 is an exploded perspective view showing the main components of a blur correction device according to the first embodiment of the present invention.
Figure 2:
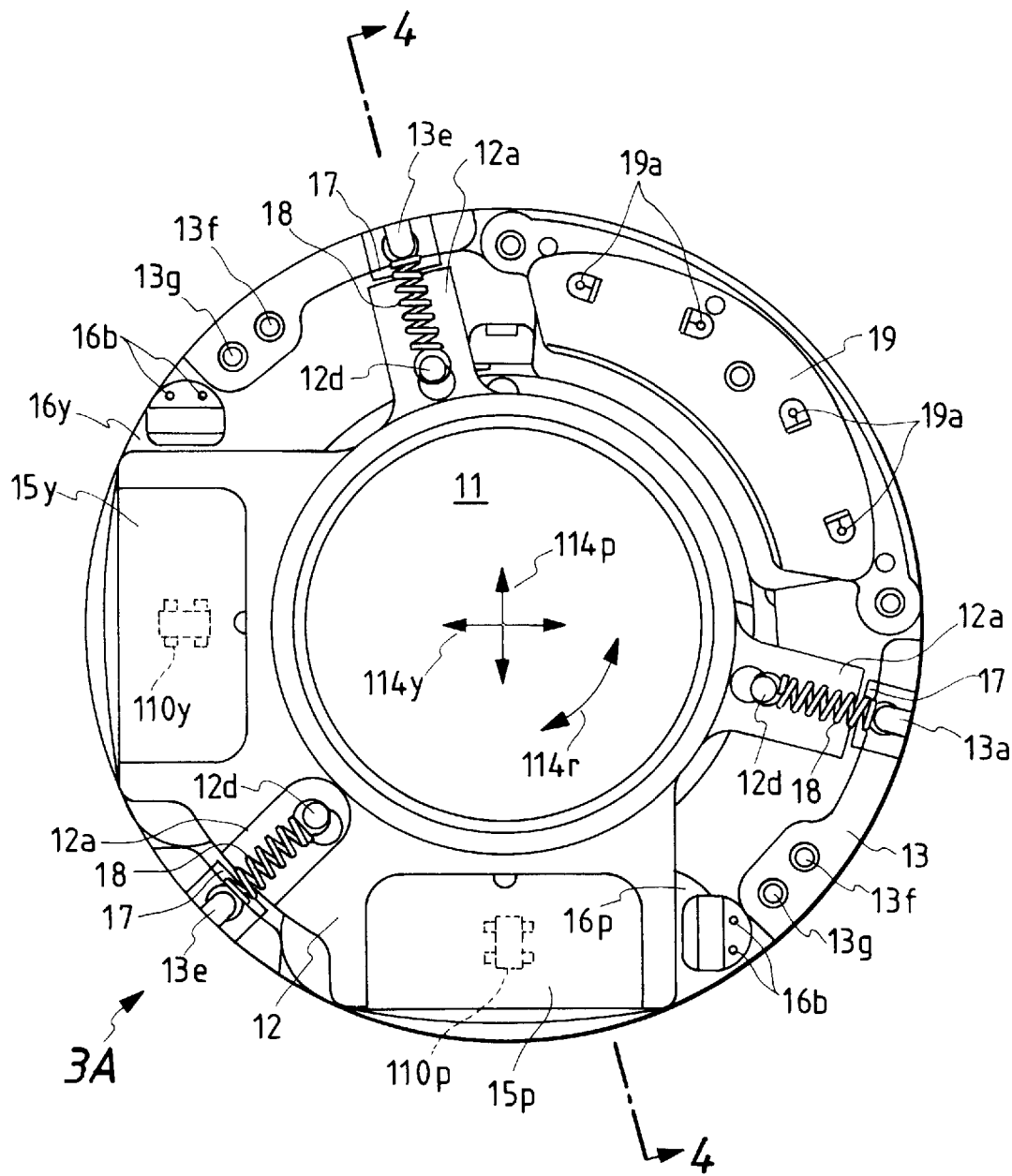
FIG. 2 is a front view showing the blur correction device in a state in which a hard substrate is removed.
Figure 3A:
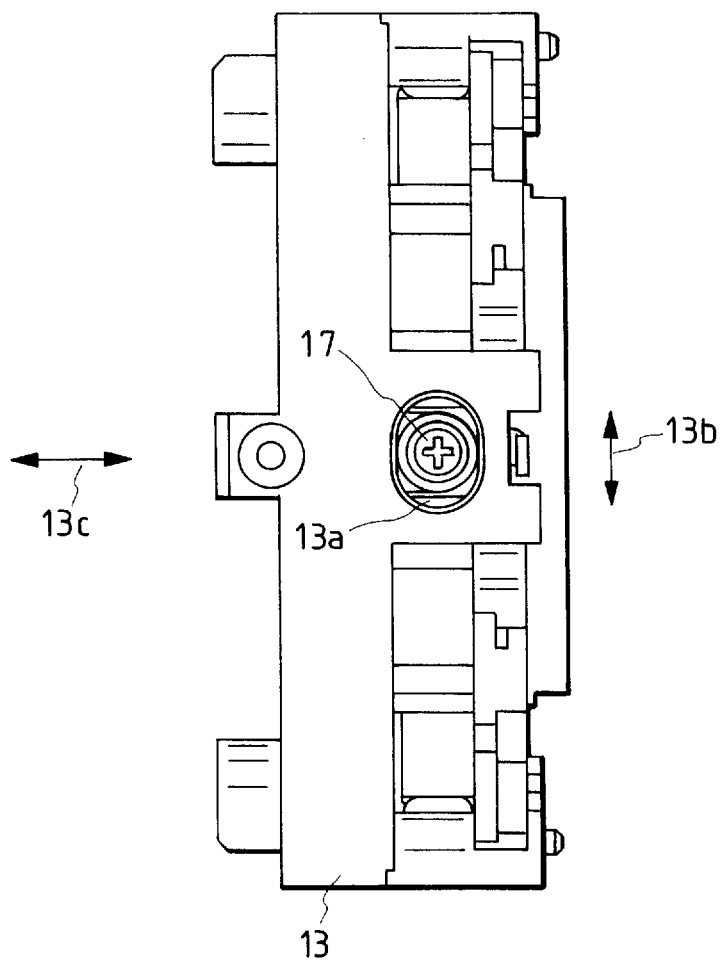
FIG. 3A is a side view taken in the direction indicated by an arrow 3A in FIG. 2.
Figure 3B:
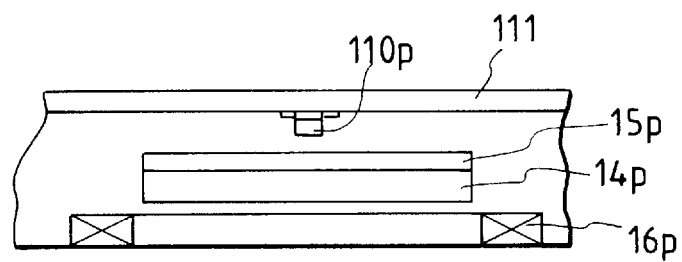
FIG. 3B is a sectional view showing the internal structure of a main portion in FIG. 2.
Figure 4A:
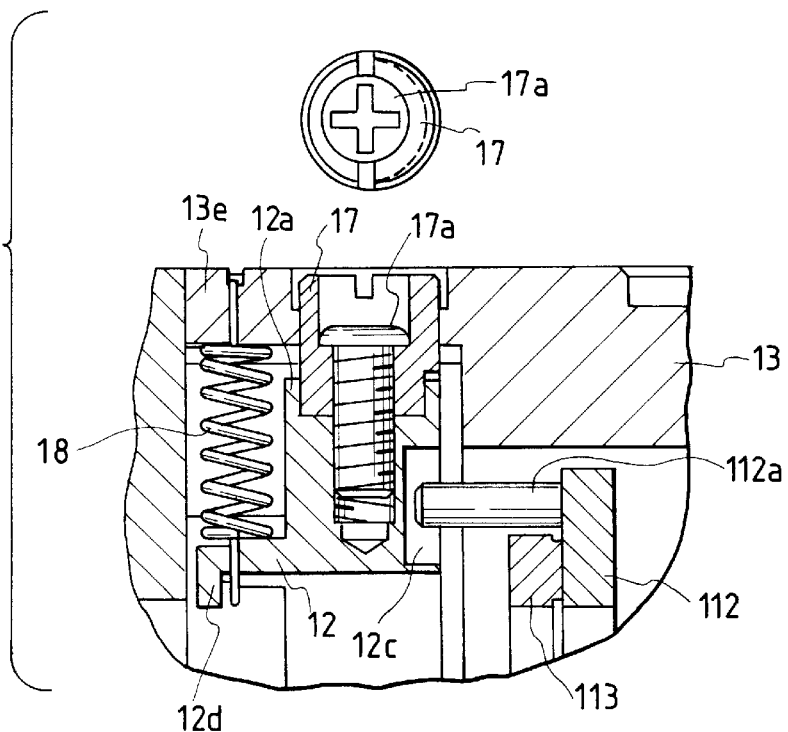
FIG. 4A is an enlarged sectional view taken along a line 4—4 in FIG. 2.
Figure 4B:
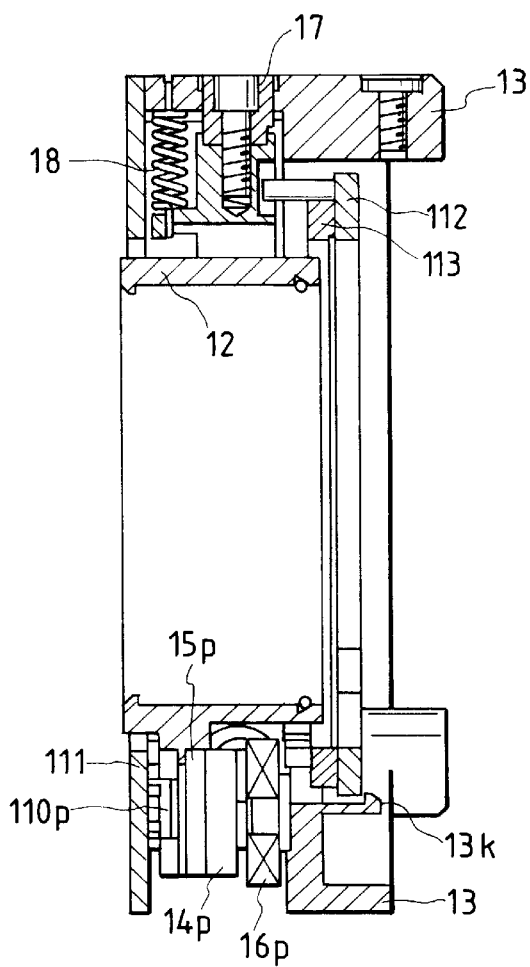
FIG. 4B is a sectional view taken along a line B-B' in FIG. 2.
Figure 7:
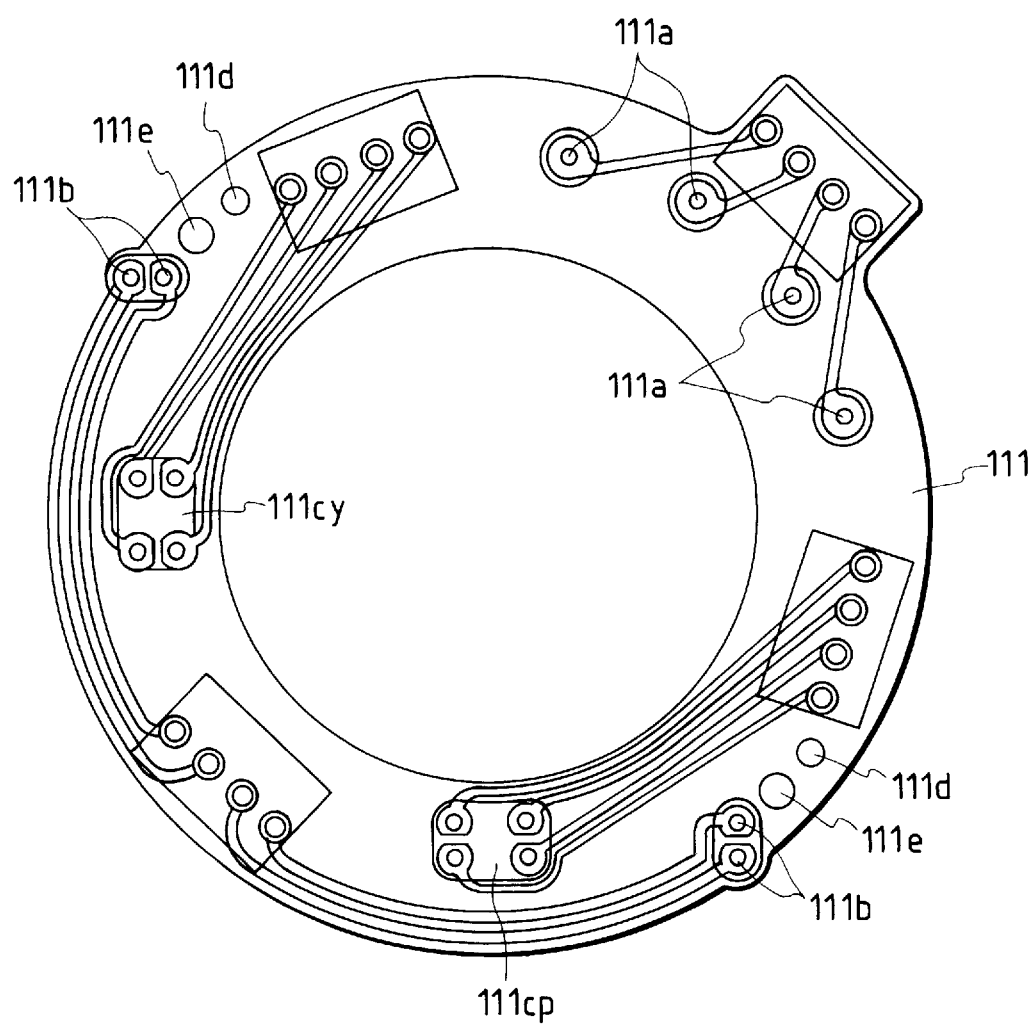
FIG. 7 is a front view showing the hard substrate in the first embodiment of the present invention.
Figure 8A:
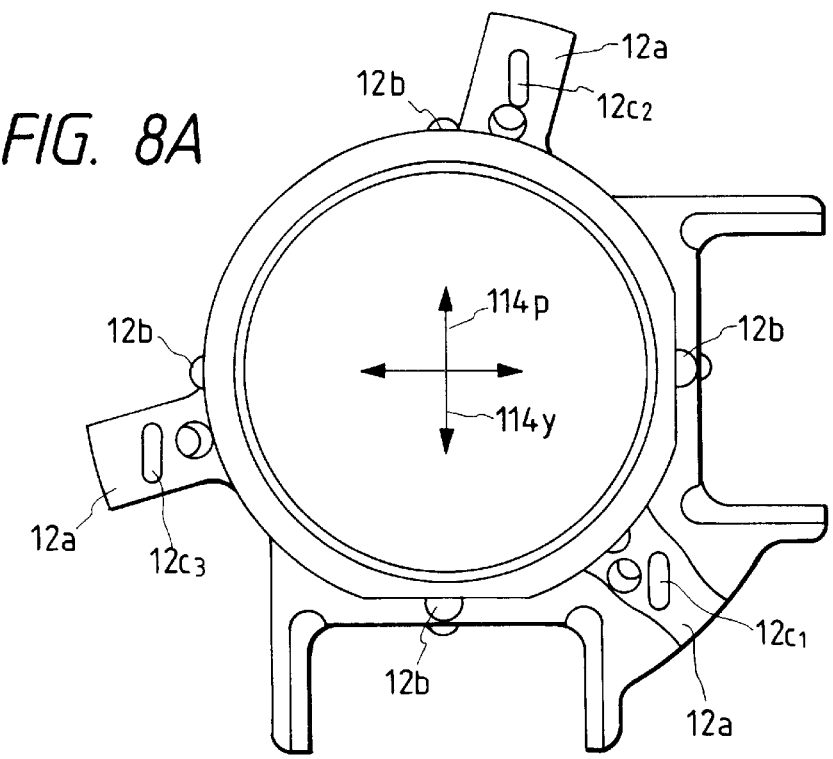
FIG. 8A is a view showing a support frame in the first embodiment of the present invention when viewed from the lower surface side of FIG. 2.
Figure 8B:
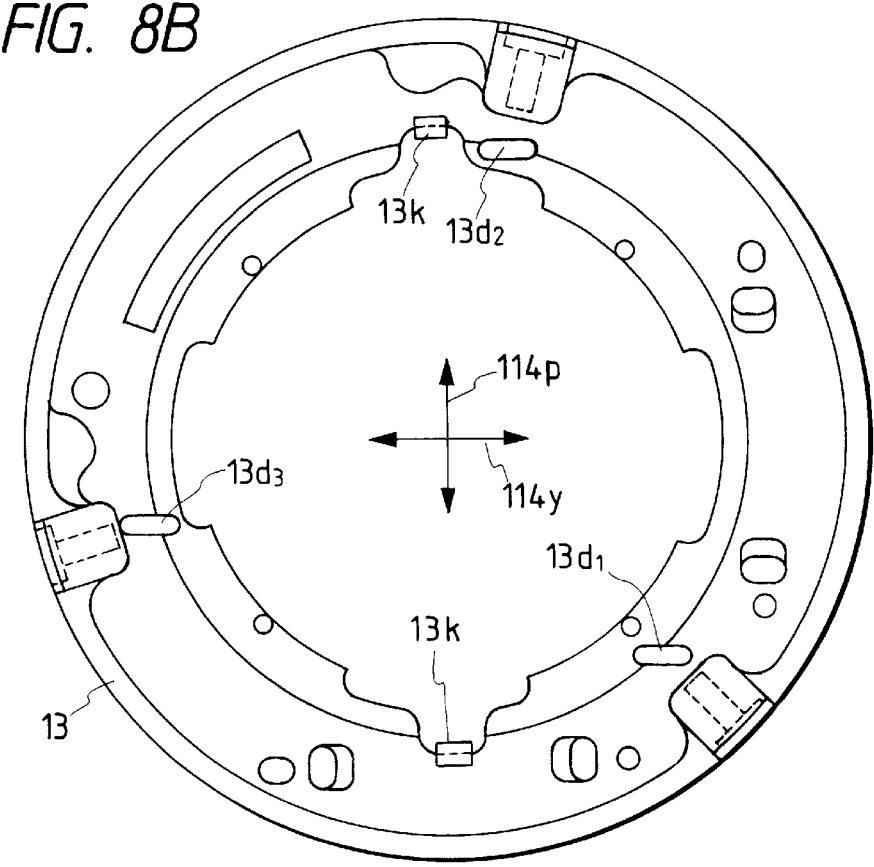
FIG. 8B is a view showing a base plate in the first embodiment of the present invention when viewed from the lower surface side of FIG. 2.

FIGS. 1 to 10A, 10B, 10C and 10D show the details of the respective members constituting a blur correction device according to the first embodiment of the present invention. FIG. 1 is an exploded perspective view showing the components of the main part of the blur correction device according to the first embodiment of the present invention. FIG. 2 a view taken in the direction from left to right in FIG. 1 (for the sake of descriptive convenience, a hard substrate 111 corresponding to the hard substrate 715 is removed to show the interior). FIG. 3A is a view taken in the direction indicated by an arrow 3A in FIG. 2. FIG. 3B is a view showing the structure of a portion associated with detection of the position of a correction lens 11. FIGS. 4A and 4B are sectional views taken along a line 4—4 in FIG. 2. FIGS. 5A to 5C are plan, side, and sectional views of a coil unit. FIGS. 6A to 6C are views for explaining the structure of a portion associated with a means for driving the correction lens 11 by comparing the structure with that of the corresponding portion in the prior art. FIG. 7 shows the hard substrate 111 in FIG. 1. FIGS. 8A and 8B show a support frame 12 and a base plate 13 in FIG. 1 from the rear surface side of FIG. 2. FIGS. 9A to 9D show a lock ring 113 and a rolling control ring 112 in FIG. 1. FIGS. 10A to 10D are views for explaining the lock mechanism of the support frame 12.

The structure of the blur correction device will be briefly described first with reference to FIG. 1.

The correction lens 11 is supported on the support frame 12. The support frame 12 is coupled to the base plate 13. A correction means constituted by the correction lens 11 and the support frame 12 is driven in a pitch direction 114$p$ and a yaw direction 114$y$ by a drive means constituted by permanent magnets, coils, and the like (to be described later), thereby performing image blur correction. When an output from a stepping motor (to be described later) is transmitted to a rack 113$a$ of the lock ring 113, the lock ring 113 locks (engages) the support frame 12, i.e., the correction means, at a predetermined position. The rolling control ring 112 has the shaft portions 112$a_1$ to 112$a_3$ which are fitted in the support frame 12 through the base plate 13 to restrain rolling of the support frame 12 about the optical axis. On the hard substrate (printed circuit board) 111, various terminals, e.g., the above stepping motor, the coils, and Hall elements (to be described later) constituting a position detection means, are wired in a concentrated manner.

The detailed structures of these components will be described below with reference to FIGS. 2 to 10D.

Figure 28:
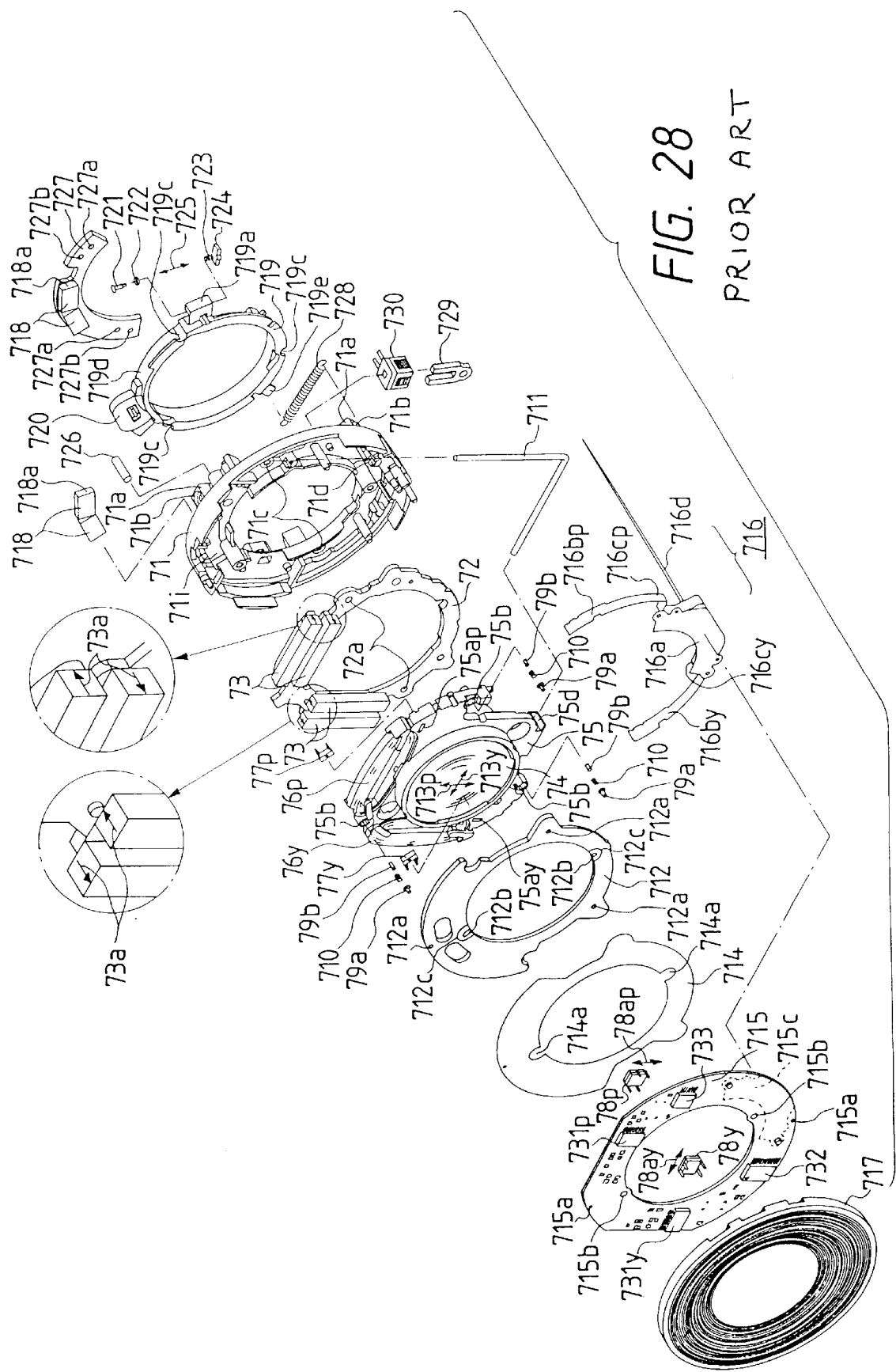
FIG. 28 is an exploded perspective view showing the structure of a blur correction device in FIG. 27.

The support frame 12 (see FIGS. 2, 8A, and 8B) corresponding to the support frame 75 in FIG. 28 supports the correction lens 11. Yokes 15$p$ and 15$y$ to which permanent magnets 14$p$ and 14$y$ (hidden by the yokes 15$p$ and 15$y$ in FIG. 2) are attracted are fixed to the support frame 12 by caulking or with screws.

In general, it is difficult to form permanent magnets into complicated shapes. For this reason, a bonding operation is required to mount the permanent magnets on the support frame 12. However, the bonding operation is difficult to control, and low in reliability.

Under the circumstances, in this embodiment, caulking or screw holes (formed in the rear surface and hence hidden in FIG. 2) are provided for the yokes 15$p$ and 15$y$ which can be formed into arbitrary shapes. The yokes 15$p$ and 15$y$ are then fixed to the support frame 12, and the permanent magnets 14$p$ and 14$y$ are attracted to the yokes 15$p$ and 15$y$ (see FIG. 3B) and fixed thereto (see FIG. 4B). With this fixing scheme, the bonding step is omitted to improve the reliability.

The base plate 13 corresponds to the base plate 71 in FIG. 28. Coils 16$p$ and 16$y$ are mounted on the opposite surface of the base plate 13 to the permanent magnets 14$p$ and 14$y$ (see FIG. 4B). As shown in FIGS. 5A to 5C, the coil 16$p$ (16$y$) is integrally formed with a coil frame 16$a$ from a resin material (ABS), and the two terminals of the coil 16$p$ are connected to terminal pins (stud pins) 16$b$ as conductive members forcibly inserted into the coil frame 16$a$, thus forming a coil unit. FIG. 5A is a plan view of a coil unit 16. FIG. 5B is a side view of the coil unit 16. FIG. 5C is a sectional view taken along a line 5C—5C in FIG. 5B.

In general, a coil is attached to a member in the following manner. First of all, the coil is bonded to the member. The two terminals of the coil are then soldered to the connecting portions. Thereafter, the leads of the two terminals must be bundled. If the step of bonding and drying the coil is performed in, e.g., the main step of mounting the coil on the base plate 13, the time required for the main step is undesirably prolonged. In addition, it is troublesome to replace a defective coil. In soldering the coil terminals, since the leads are soft, soldering must be performed while the leads are held with tweezers or the like. It is not preferable either that the step of bundling the leads is performed in the main step.

In this embodiment, the coil 16$p$ (16$y$) is formed as a unit and snap-fastened to the base plate 13 with positioning pins 16$c$ and pawls 16$d$ formed on the coil frame 16$a$. With this structure, the time required for this step is greatly shortened.

The leads have already been connected to the firm terminal pins 16$b$. These leads extend through the hard substrate 111 and are soldered. With this structure, electrical connection of the coil terminals can be performed with good operability and reliability.

The relationship between the yokes 15$p$ and 15$y$, the permanent magnets 14$p$ and 14$y$, and the coils 16$p$ and 16$y$ constituting the drive means for the correction means will be described. FIG. 6A shows the first embodiment. FIG. 6B shows an undesirable example. FIG. 6C shows the conventional example.

In the conventional example shown in FIG. 6C, the coils 76$p$ and 76$y$ are mounted on the support frame 75. The permanent magnets 73 forms the closed magnetic path indicated by a dotted line 73$b$, together with the first yoke 712 and the second yoke 72, as shown in FIG. 6C. The closed magnetic path is formed in this manner to adjust the flow of a magnetic flux so as to improve the driving efficiency.

In this embodiment, when the permanent magnet 14$p$ (14$y$) is to be mounted on the support frame 12 to form an open magnetic path, an opposing yoke 15$ap$ (15$ay$) may be mounted on the support frame 12 at a position to oppose the permanent magnet 14$p$ (14$y$), as shown in FIG. 6B. With this structure, a magnetic flux 14$a$ flows as shown in FIG. 6B.

In the first embodiment, however, an open magnetic path is formed without any opposing yokes, as shown in FIG. 6A, in consideration of the balance between an improvement in driving efficiency owing to the opposing yokes 15$ap$ and 15$ay$ and a deterioration in follow-up characteristics due to an increase in weight owing to the opposing yokes 15$ap$ and 15$ay$. That is, the structure of the first embodiment is designed to reduce the absolute value of power consumption by suppressing an increase in weight rather than improve the driving efficiency.

As described above, the use of the yoke 15$p$ (15$y$) facilitates the step of mounting the permanent magnet 14$p$ (4$y$) on the support frame 12. As shown in FIG. 6A, since a magnetic flux 14$a$ flows in the yoke 15$p$ (15$y$), the yoke serves to prevent a decrease in magnetic flux density. As the permanent magnet 14$p$ (14$y$) becomes thicker, the magnetic flux density to the opposing coil 16$p$ (16$y$) increases. Even if the permanent magnet 14$p$ (14$y$) is not thick, the same effect can be obtained when the total thickness of the structure including the yoke 15p (15y) is not large.

In this embodiment, therefore, the yoke 15p (15y) is effectively used for the open magnetic path to facilitate the step of mounting the permanent magnet 14p (14y). In addition, a large magnetic flux density can be obtained even with the thin permanent magnet 14p (14y), thereby attaining a reduction in the cost of the permanent magnet 14p (14y).

As shown in FIGS. 2, 8A, and 8B, arm portions 12a radially extend from the support frame 12 in three directions, and rollers 17 are fixed to the arm portions 12a with screws. The rollers 17 are fitted in guide grooves 13a (see FIGS. 1 and 3A) in the following manner. Since the guide grooves 13a are elongated holes extending in the direction indicated by an arrow 13b, as shown in FIG. 3A, the three rollers 17 can move in this direction. That is, the support frame 12 can slidably move in all directions within a plane including the base plate 13, but is restrained in only an optical axis direction 13c in FIG. 3A.

In assembly, one or two of the rollers 17 are fastened to one or two of the three arm portions 12a of the support frame 12 with screws, and the fastened roller (or rollers) 17 is fitted in the guide groove 13a of the base plate 13 to mount the support frame 12 on the base plate 13. Finally, the remaining rollers 17 are fastened to the arm portions 12a of the support frame 12 with screws through the remaining guide grooves 13a. With this simple process, mounting of the support frame 12 on the base plate 13 is complete.

For example, by regarding a backlash of 20 μm corresponding to a temperature variation and a backlash of 20 μm corresponding to a dimensional tolerance variation, a fitting backlash of 40 μm in the optical axis direction 13c must be ensured between each roller 17 and a corresponding guide groove 13a. In this case, the inclination of the correction lens 11 corresponds to the backlash. Since the three guide grooves 13a are formed in the peripheral portion of the base plate 13, the span of each groove is long. For this reason, the inclination backlash of the support frame 12 with respect to the base plate 13 due to the fitting backlash falls within the optical tolerance.

Figure 29:
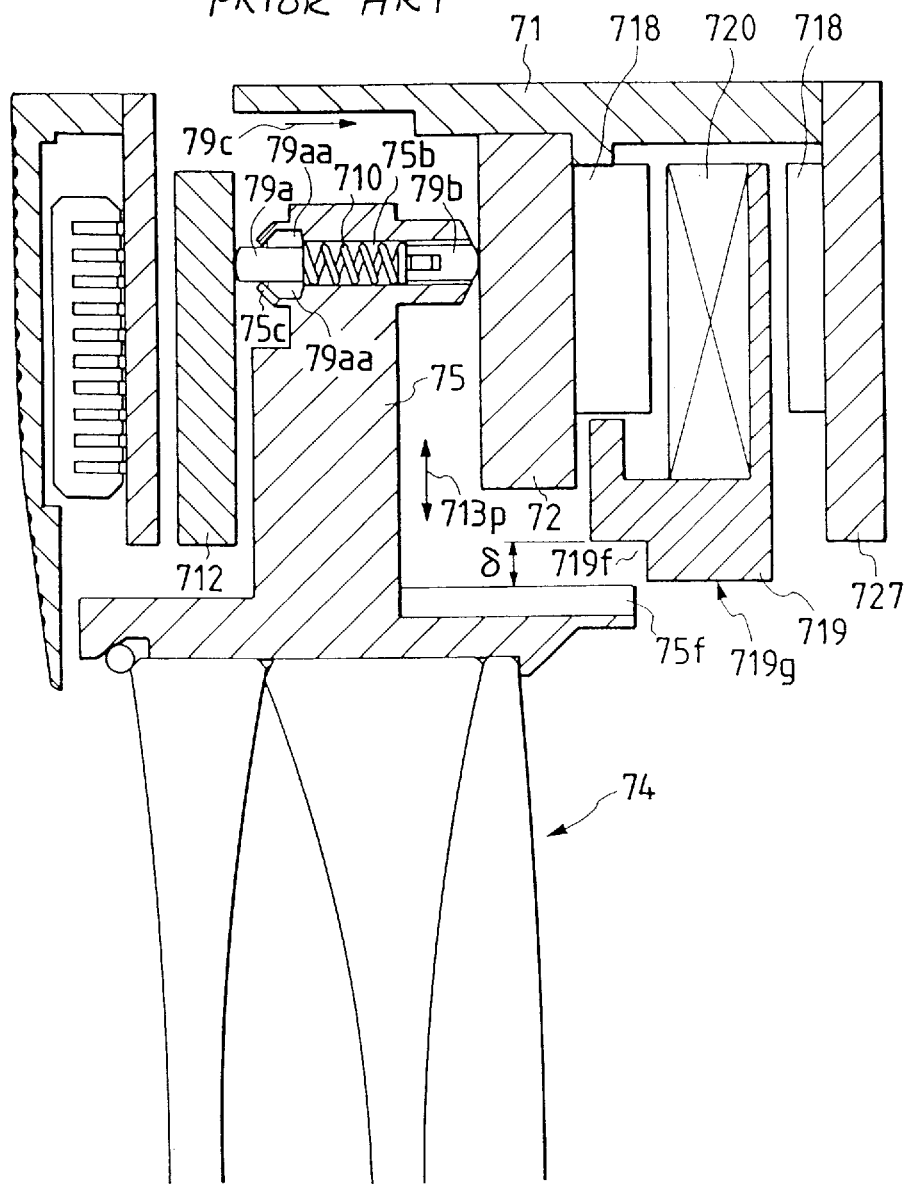
FIG. 29 is a sectional view for explaining the shape of a hole in a support frame into which a clamping means in FIG. 28 is inserted.
Figure 30A:
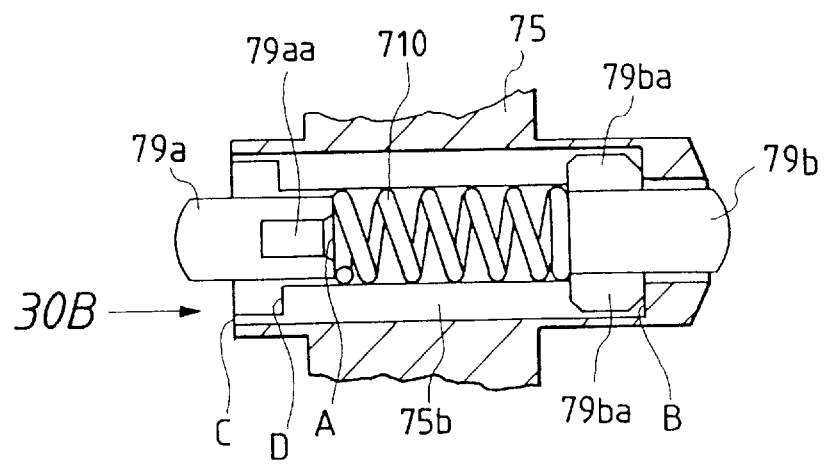
FIG. 30A is a sectional view showing a state in which the support frame is mounted on a base plate in FIG. 28.
Figure 30B:
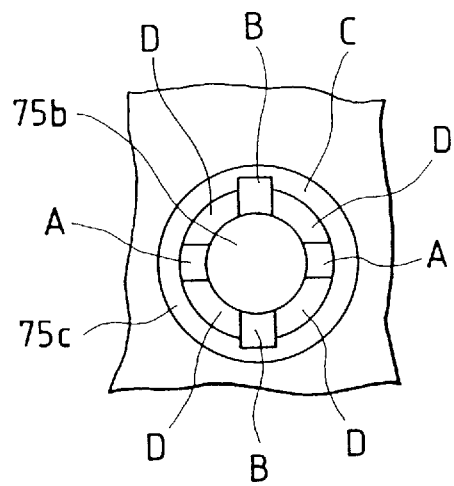
FIG. 30B is a view taken in the direction indicated by an arrow 30B in FIG. 30A.
Figure 31:
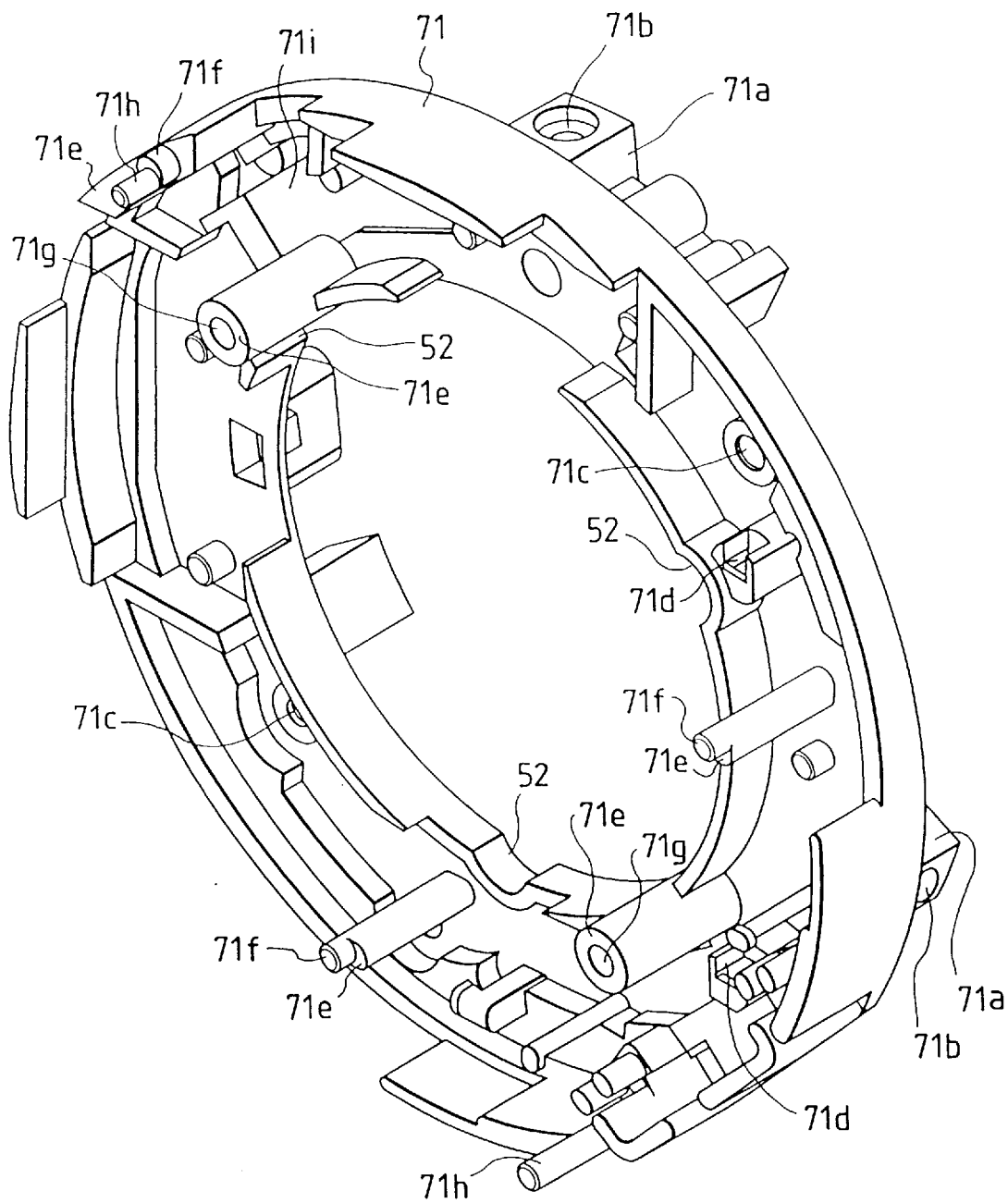
FIG. 31 is a perspective view showing the base plate in FIG. 28.
Figure 32:
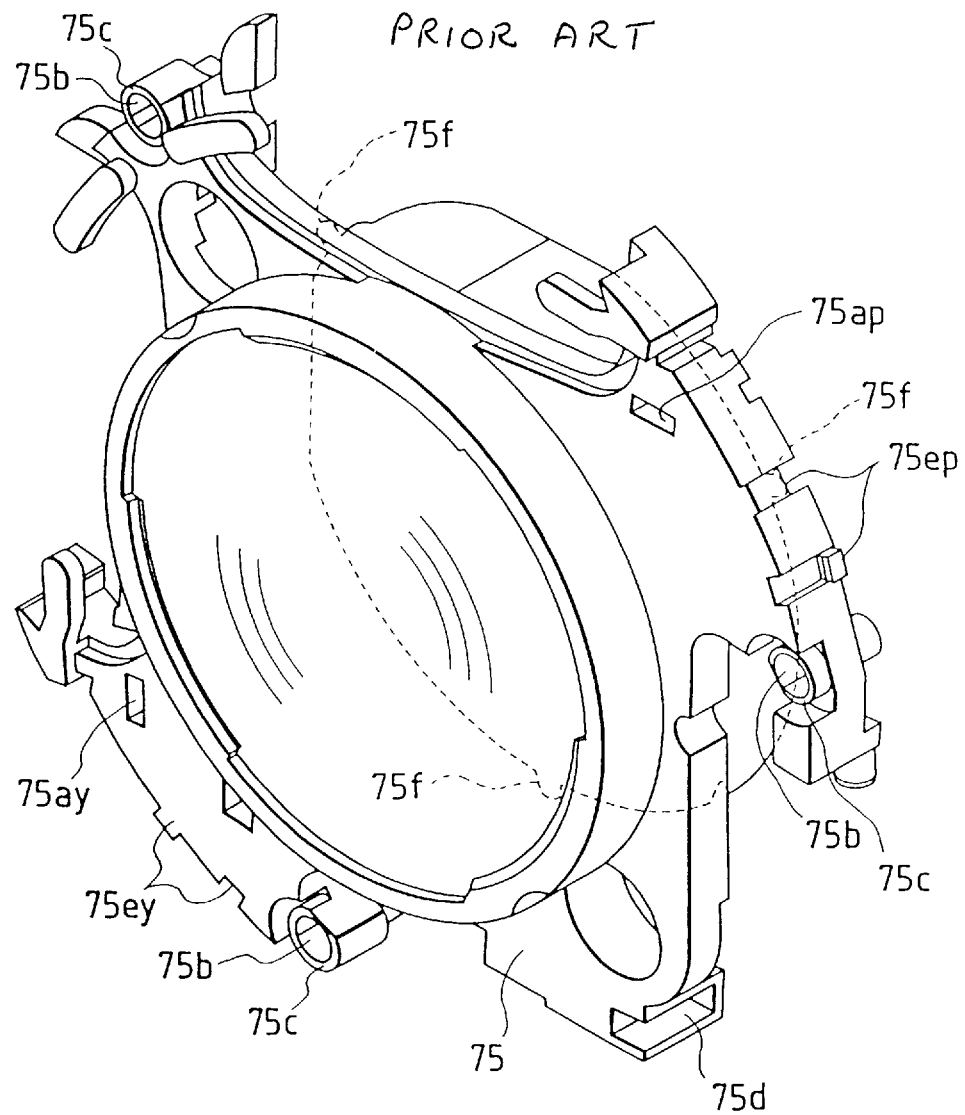
FIG. 32 is a perspective view showing the support frame in FIG. 28.
Figure 33:
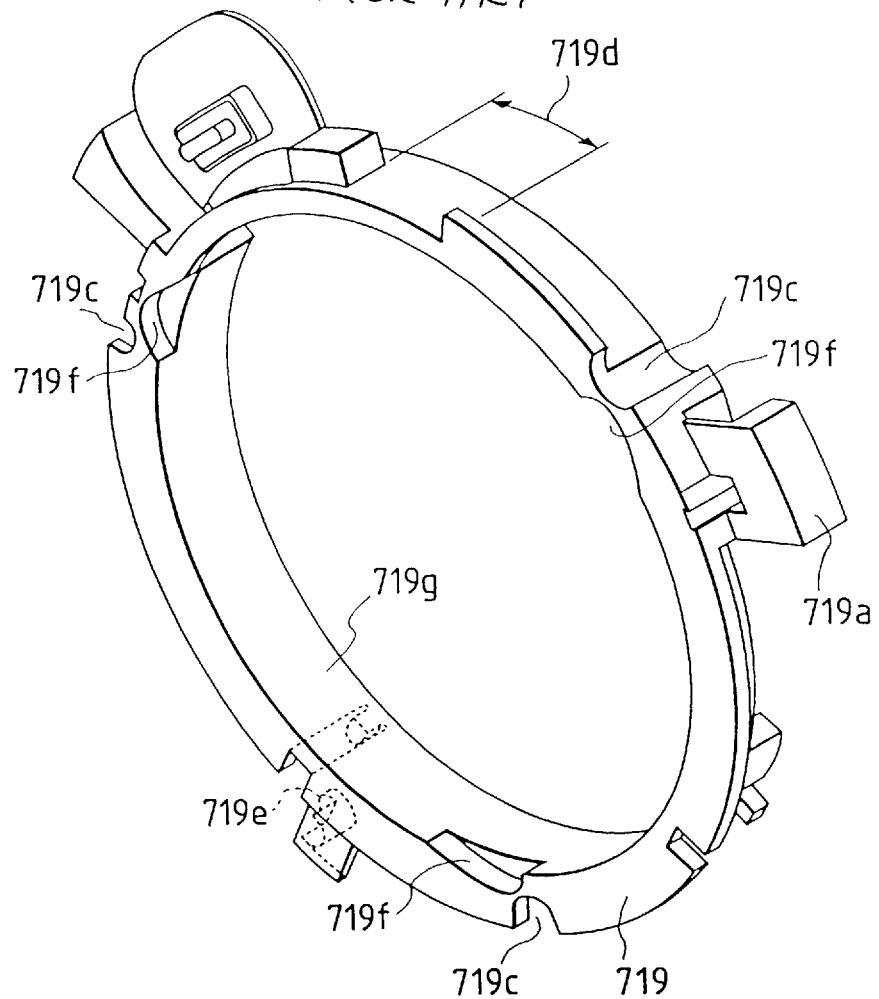
FIG. 33 is a perspective view showing a lock ring in FIG. 28.
Figure 34:
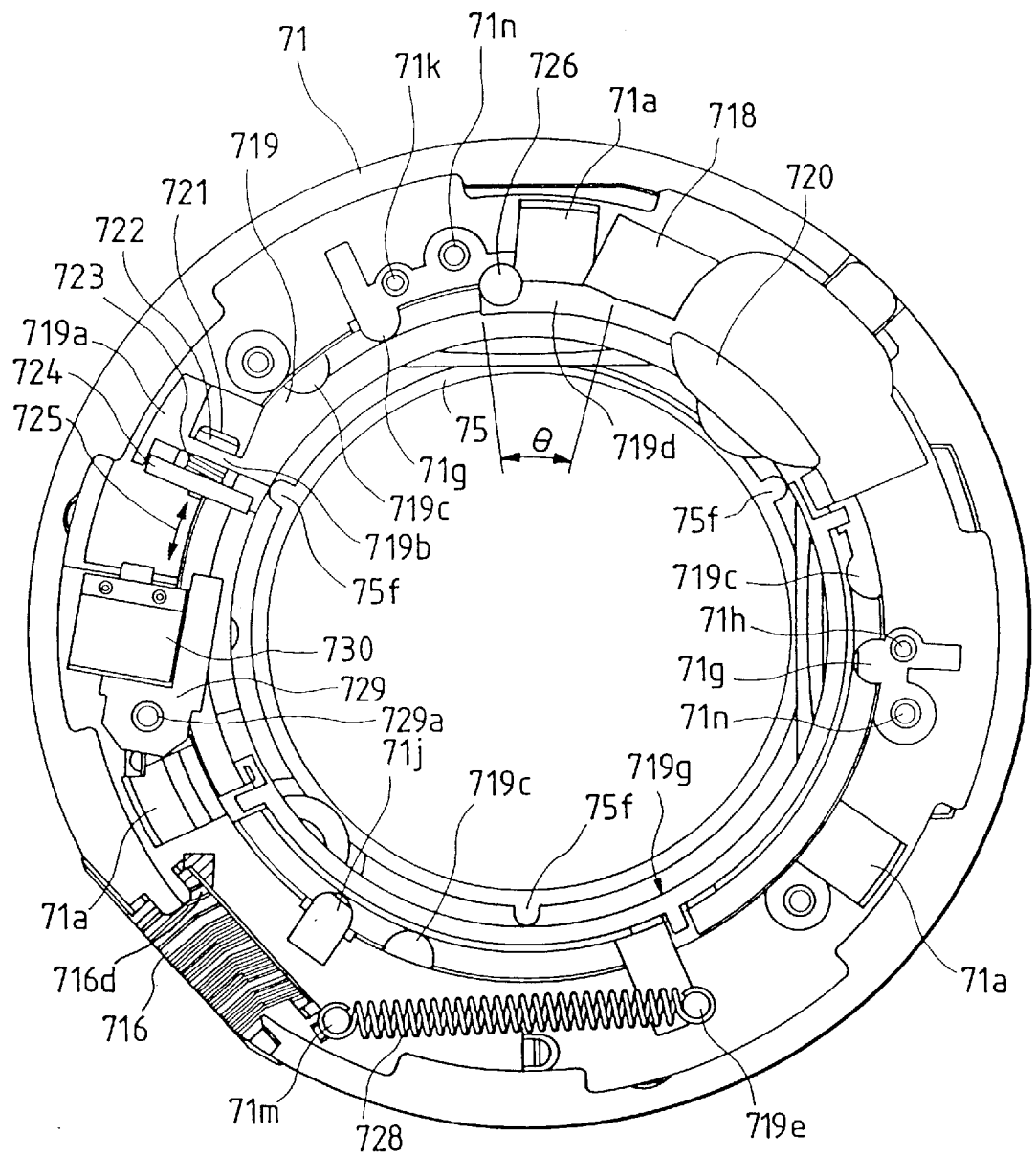
FIG. 34 is a front view showing the support frame and the like in FIG. 28.
Figure 35:
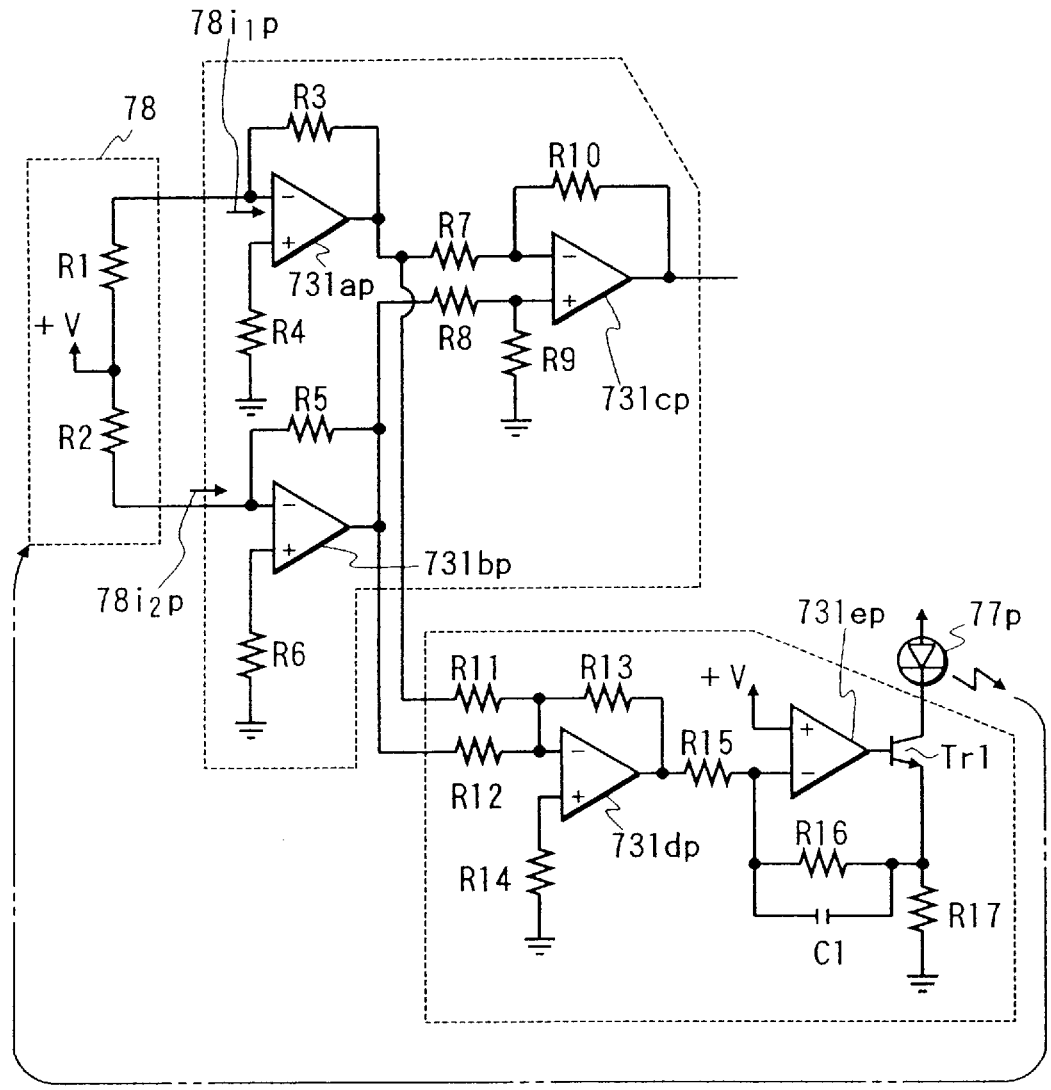
FIG. 35 is a circuit diagram showing the arrangement of an IC for amplifying an output from a position detection element.

As described above, the method of supporting the support frame 12 by using the rollers 17 and the guide grooves 13a greatly improves the assembly efficiency as compared with the method of supporting the support frame by clamping, which is used for the structure shown in FIG. 28. According to this supporting method described with reference to FIG. 29, the friction between the support balls 79a and 79b and the first and second yokes 712 and 72, which is produced by the charge force of the charge spring 710, degrades the driving precision. In this embodiment, however, since no charge force is used, the driving friction can be suppressed.

By using the eccentric roller shown in FIG. 4A as the roller 17, the inclination of the correction lens 11 can be adjusted (FIG. 4A is an enlarged view of a portion in FIG. 4B). More specifically, when the rollers 17 rotate, the arm portions 12a move back and forth in the optical direction. The inclination of the correction lens 11 can therefore be adjusted by adjusting the positions of the three arm portions 12a using the rollers 17. After adjustment, the rollers 17 can be fixed to the arm portions 12a so as not to rotate by tightening screws 17a.

As described above, when such eccentric rollers are used as the rollers 17, no special inclination adjustment means need be used, and the overall device can be made compact.

Figure 9A:
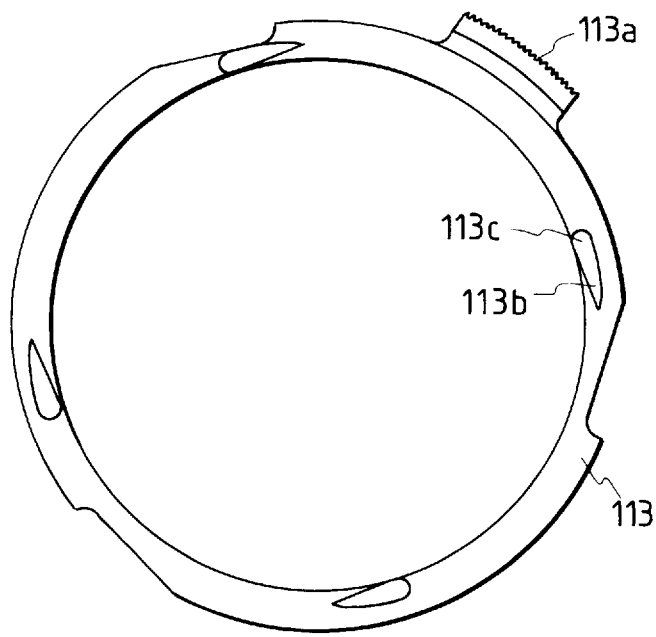
FIG. 9A is a view showing a lock ring in the first embodiment of the present invention when viewed from the upper surface side of FIG. 2.
Figure 9B:
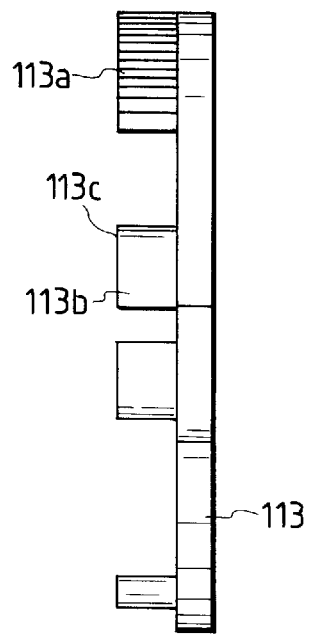
FIG. 9B is a side view of the lock ring in FIG. 9A.
Figure 9C:
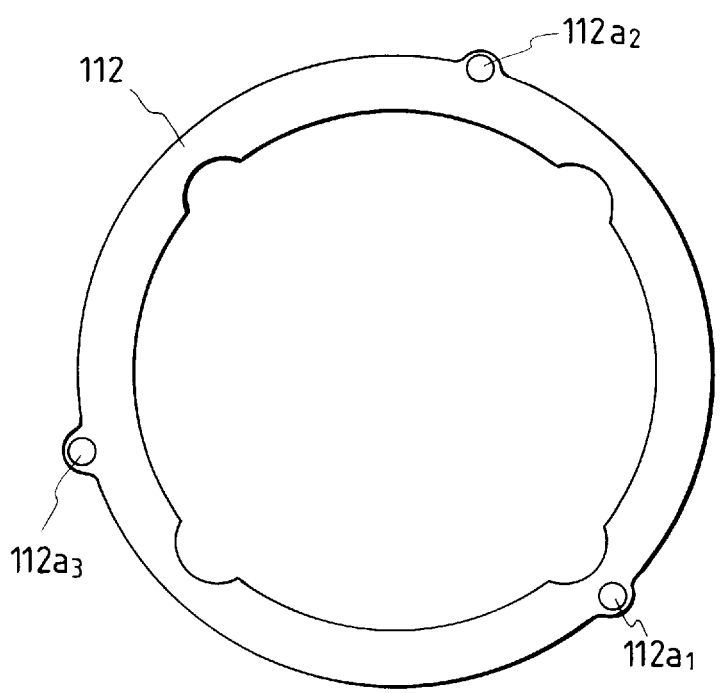
FIG. 9C is a view showing a rolling control ring in the first embodiment of the present invention when viewed from the upper surface side of FIG. 2.
Figure 9D:
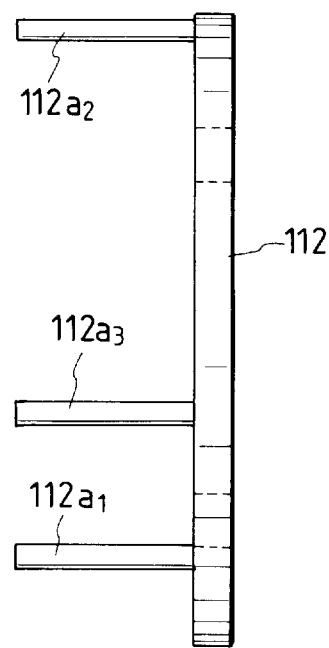
FIG. 9D is a side view of the rolling control ring in FIG. 9C.

The lock ring 113 shown in FIGS. 9A and 9B is rotatably supported on the base plate 13 from the rear surface side in FIG. 2. The pinion (not shown) which is the output shaft of the stepping motor 19 mounted on the base plate 13 is meshed with the rack 113a to drive the lock ring 113 in the rotating direction. Four cams 113b formed on the lock ring 113 serve to lock/unlock the support frame 12 in cooperation with four projections 12b shown in FIG. 8A.

More specifically, when the lock ring 113 in FIG. 9A rotates counterclockwise, the cams 113b of the lock ring 113 separate from the projections 12b of the support frame 12. As a result, the support frame 12 becomes free from the lock ring 113. When the lock ring 113 rotates clockwise, flat portions 113c of the cams 113b come into contact with the projections 12b. As a result, the support frame 12 is engaged with the lock ring 113. That is, the support frame 12 is locked to the base plate 13.

When, therefore, blur correction is to be performed, the lock ring 113 is driven counterclockwise by the stepping motor 19 to set the support frame 12 free from the lock ring 113. When blur correction is complete, the lock ring 113 is driven clockwise to lock the support frame 12 to the base plate 13.

Figure 36A:
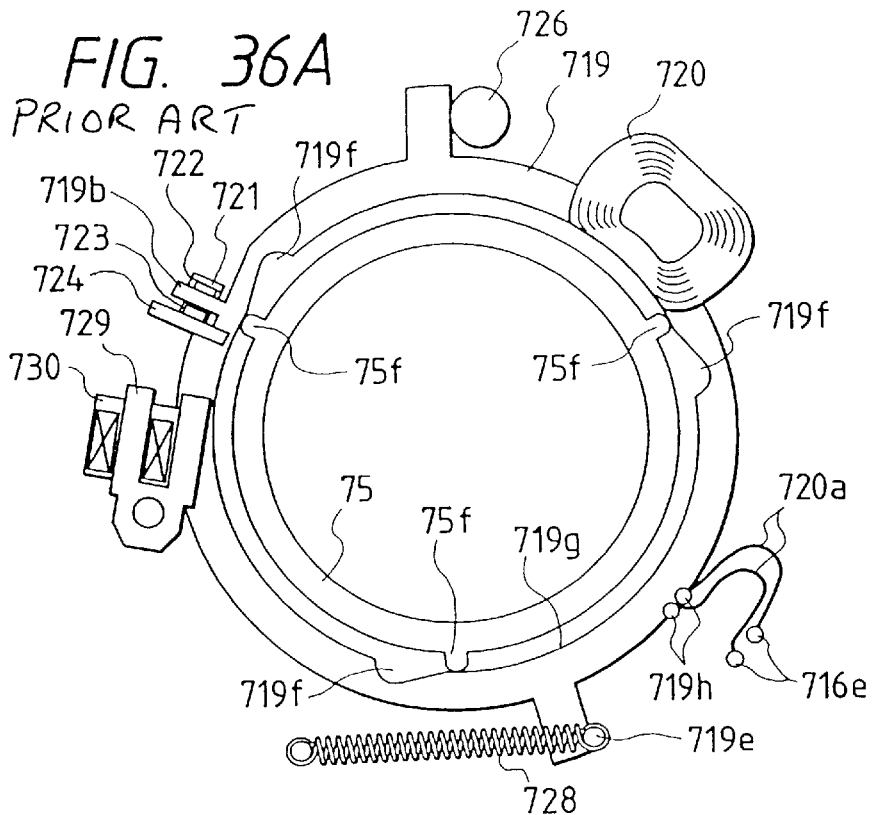
FIG. 36A is a view showing how the lock ring in FIG. 28 is driven.
Figure 36B:
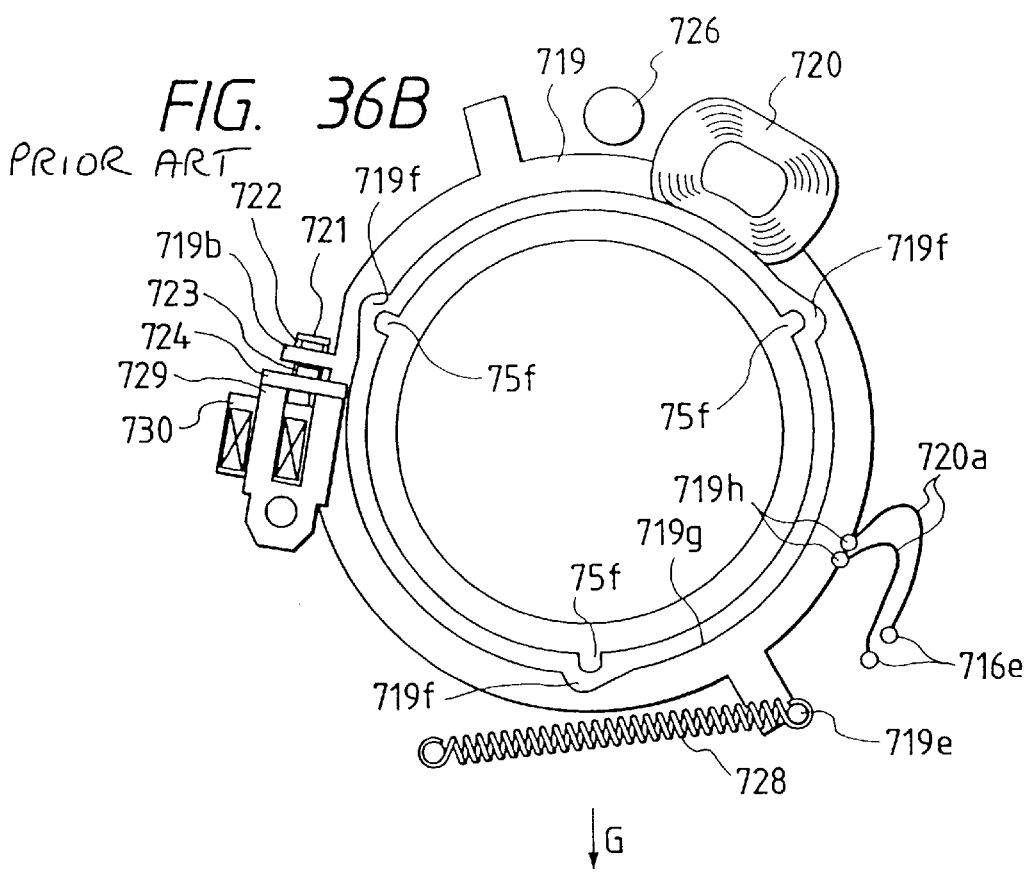
FIG. 36B is a view showing how the lock ring in FIG. 28 is stopped.
Figure 37:
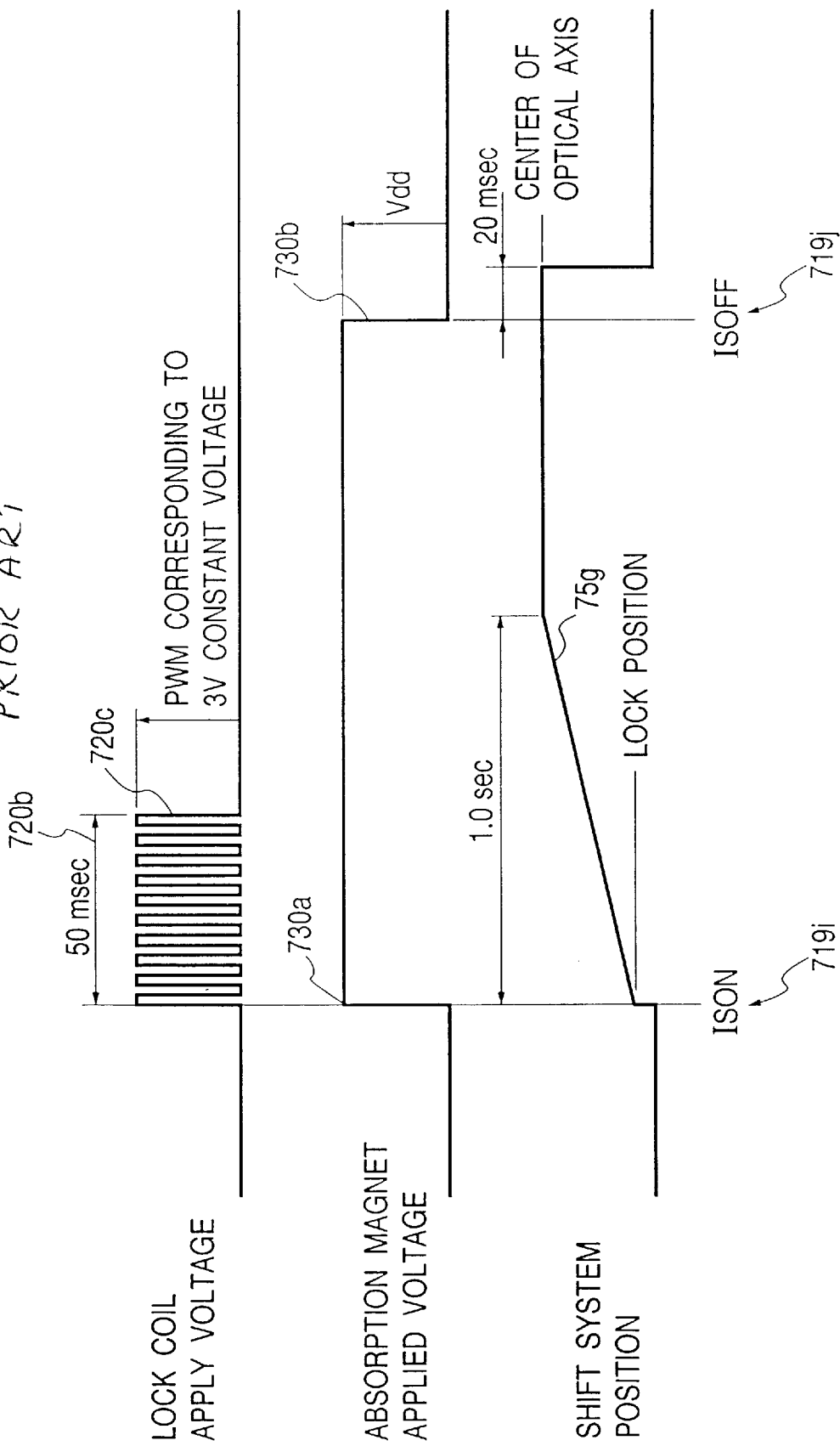
FIG. 37 is a timing chart showing the waveforms of signals used to drive the lock ring.
Figure 38A:
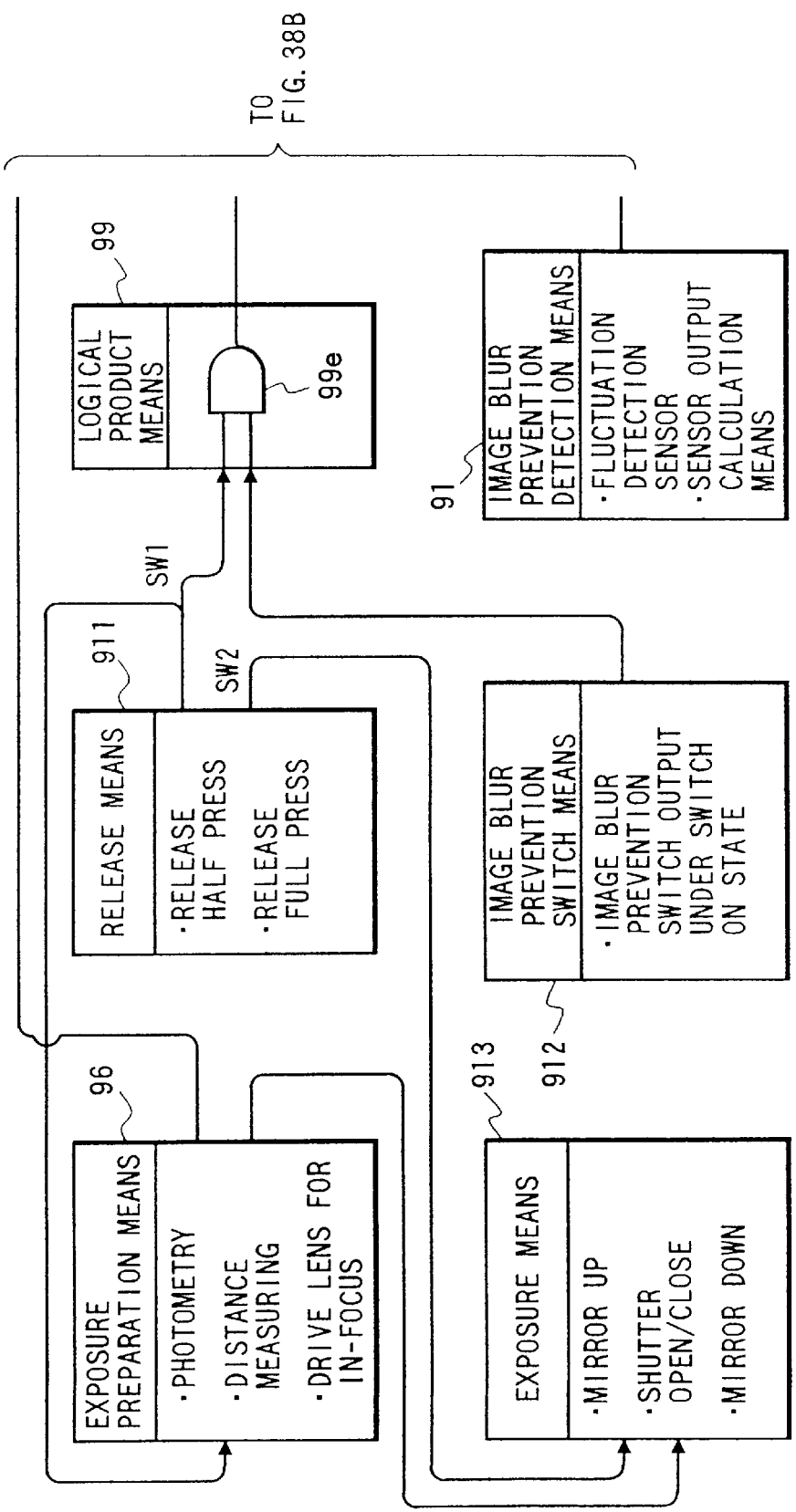
FIG. 38, which is composed of FIGS. 38A and 38B, is a block diagram showing part of the circuit arrangement of the image blur prevention mechanism of a camera incorporating an image blur prevention system.
Figure 38B:
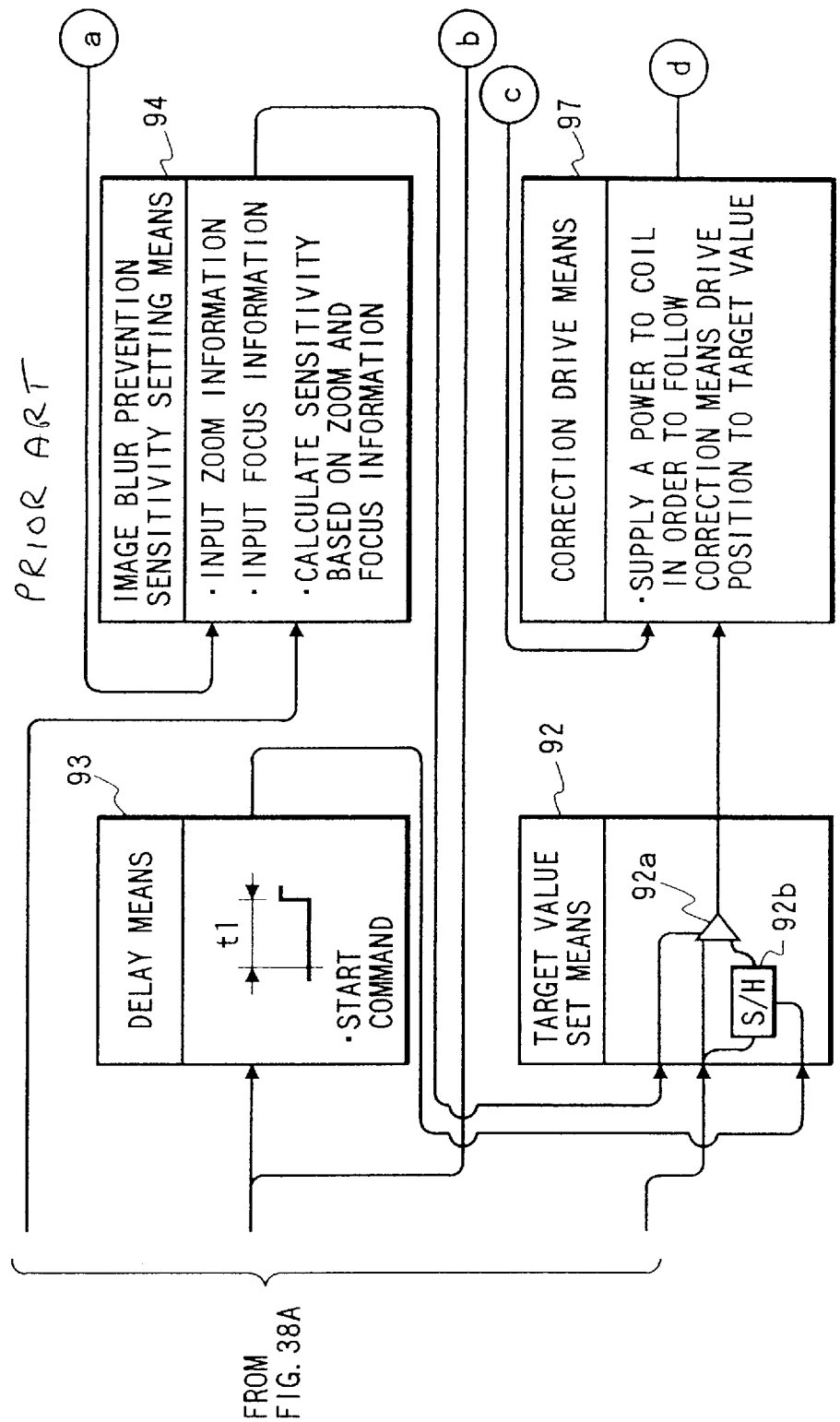
Figure 39:
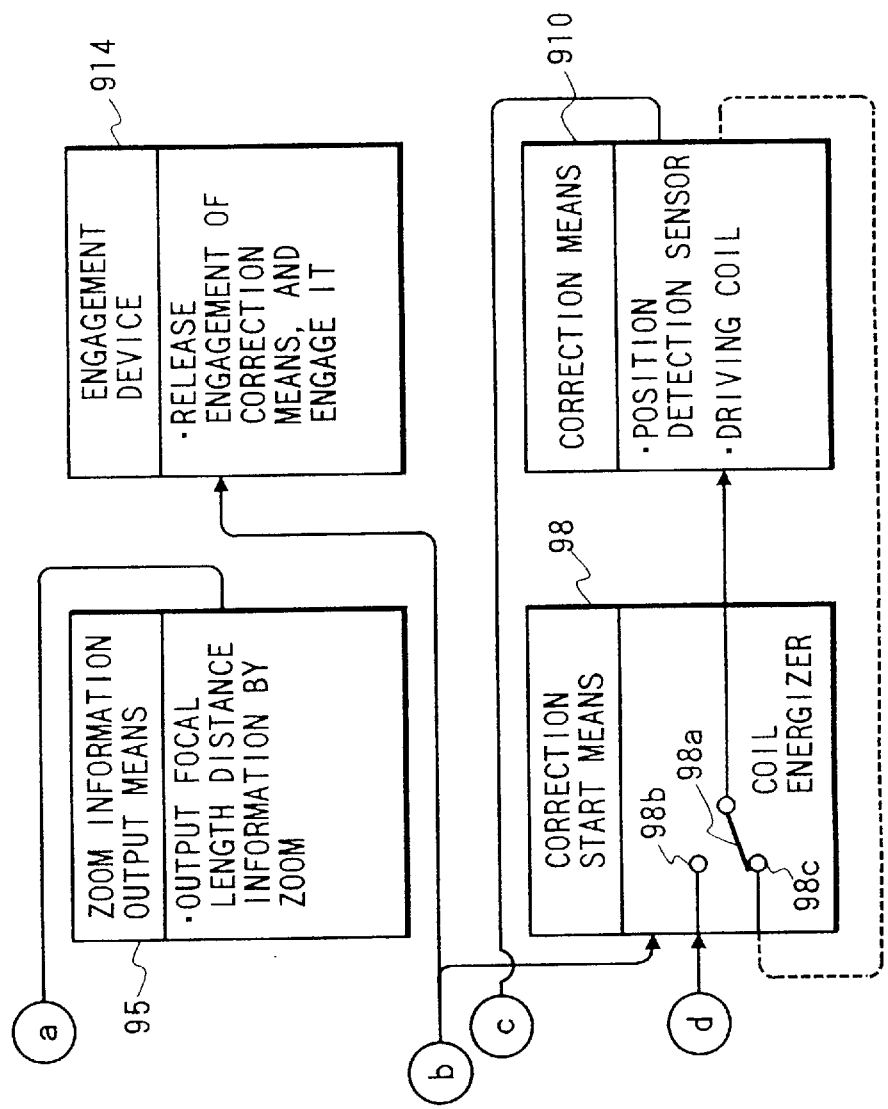
FIG. 39 is a block diagram showing the remaining part of the circuit arrangement of the image blur prevention mechanism of the camera incorporating the image blur prevention system.

In the prior art, the three projections are used, as shown in FIGS. 36A and 36B. In contrast to this, in this embodiment, the four projections are used, as shown in FIGS. 8A and 8B. Such a structure is used to reduce the amount of fitting backlash between the lock ring 113 and the support frame 12 in the gravitational direction during a photographing operation. The function of this structure will be described below with reference to FIGS. 10A to 10D.

Figure 10A:
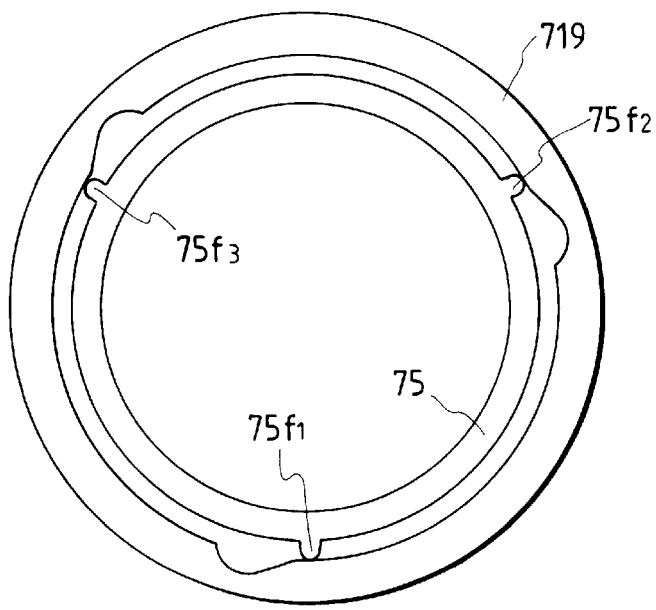
FIG. 10A is a front view showing the structure of a means for engaging a conventional correction means.

FIG. 10A is a schematic view showing the support frame 75 having the three projections and the lock ring 719 in the prior art. FIG. 10C is a schematic view showing the support frame 12 having the four projections and the lock ring 113 in this embodiment.

Figure 10B:
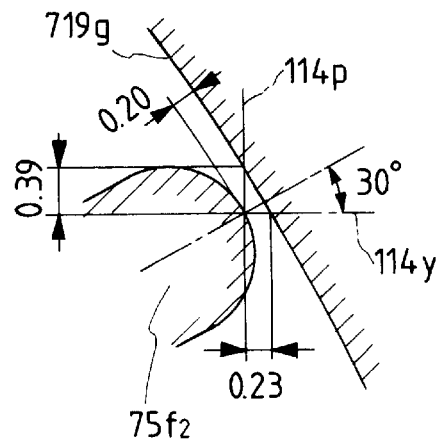
FIG. 10B is an enlarged view of a main portion in FIG. 10A.
Figure 10C:
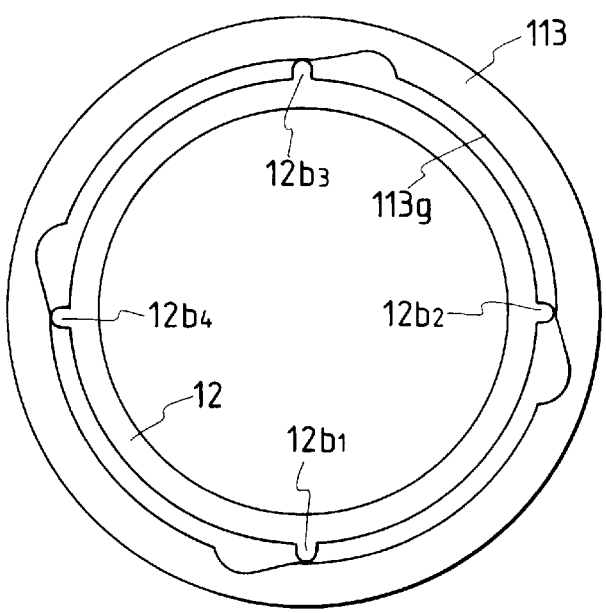
FIG. 10C is a front view showing the structure of a means for engaging a correction means in the first embodiment of the present invention.
Figure 10D:
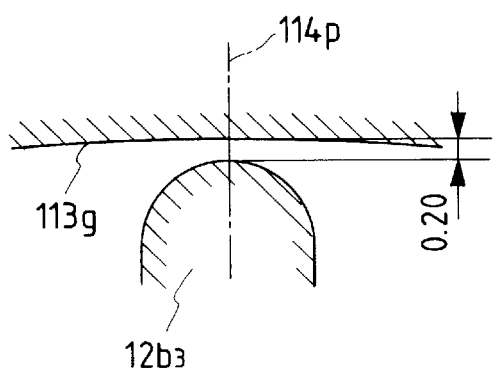
FIG. 10D is an enlarged view of a main portion in FIG. 10C.

Assume that both the gaps (fitting backlashes) between projections 75f and 12b and inner walls 719g and 113g in the radial direction are 0.2 mm (see the enlarged views of FIGS. 10B and 10D). Also, assume that the directions in which gravitational forces act on the support frames 72 and 12 during photographing operations coincide with the pitch direction 114p (to be also referred to as a direction 114 hereinafter).

In the case shown in FIG. 10B, the backlash in the gravitational direction (the direction 114p) is 0.39 mm. Since a projection 75$f_1$ extends along the gravitational direction, the backlash is 0.2 mm. The backlash in the direction 114p is therefore 0.59 mm (the sum of the above backlashes). Referring to FIG. 10B, the backlash in the horizontal direction (direction 114y) is ±0.23 mm. In a photographing operation, the camera is generally held with the direction 114p or 114y coinciding with the gravitational direction. At this time, if the backlash is 0.59 mm, the support frame 75 is offset from the center of the optical axis (owing the influence of gravity). If, for example, a photographing operation is performed with the direction 114p coinciding with the gravitational direction, the projection 75$f_1$ is in contact with the inner wall 719g, and a gap of 0.59 mm is produced upward.

Assume that optical adjustment of the camera has been performed at the time of shipment such that optimal optical performance is obtained in such a state. In this case, when the camera is re-held with the direction 114y coinciding with the gravitational direction, since no gravitational force acts in the horizontal direction (direction 114p), the support frame 75 can move in the horizontal direction within a backlash of 0.59 mm. For this reason, the optical balance may greatly deteriorates.

In this embodiment, as is apparent from FIG. 10D, both the backlashes in the gravitational direction 114p and the horizontal direction 114y fall within the range of ±0.2 mm. That is, the four-projection structure can reduce the maximum backlash amount to ⅔ that in the three-projection structure. As is apparent, even in the case of the four-projection structure, when the camera is held with a 45° direction coinciding with the gravitational direction, the backlash amount increases by √2 times. However, such a photographing operation is rarely performed, and hence no practical problems are posed.

The advantages of the four-projection structure over the three-projection structure will be summarized. Since all the projections (projections $12b_1$ and $12b_3$ arranged along the direction 114p, and projections $12b_2$ and $12b_4$ arranged along the direction 114y) can be arranged in the direction (114p or 114y) in which a gravitational force acts on the photographer, the same backlash is set for each projection in the locked state. In the case of the three-projection structure, however, the backlash in the gravitational direction which is set for a projection offset from the gravitational direction in a photographing operation becomes larger than the minimum fitting backlash (0.2 mm in the radial direction in FIG. 10B).

If there is no gap between the lock ring 113 and the support frame 12, the lock ring 113 may not properly rotate owing to the friction with the support frame 12. For this reason, a slight gap is ensured between the two members. In the case of the three-projection structure, the backlashes in the gravitational direction and the horizontal direction in a photographing operation are larger than the above set value. In contrast to this, in the case of the four-projection structure, since the projections are arranged in the gravitational direction and the direction perpendicular thereto (horizontal direction), the backlashes in the gravitational direction and the horizontal direction in a photographing operation can be set to be equal to the above set backlash.

As described above, the rollers 17 of the support frame 12 are fitted in the guide grooves 13a of the base plate 13 such that the position of the support frame 12 is restrained in the optical axis direction with respect to the base plate 13. This supporting method is superior in assembly efficiency. In addition, the guide grooves 13a are integrally formed in the base plate 13, and fitting between the rollers 17 and the guide grooves 13a can be easily controlled (for easy understanding of these functions, consider the relationship between the rollers and the cams which are generally used in a lens barrel). Furthermore, since the known eccentric roller is used as each roller 17, the inclination of the support frame 12 with respect to the base plate 13 can be adjusted by rotating the rollers 17.

In the above supporting method, however, the support frame 12 can freely move in the pitch direction 114p and the yaw direction 114y (blur correction direction) in FIG. 2, and can also rotate in a rolling direction 114r. This rotation degrades the blur correction precision.

This embodiment uses the following three methods to reduce the influences of the above rolling movement.

1) The rolling movement gradually increases as the center axis of the thrust generated by the coil shifts from the center axis of the position detecting direction of the support frame. In the prior art shown in FIG. 28, the center of the thrust generated by the coil 76p is on an axis 713p coinciding with the center of gravity of the correction lens 74, but the center axis of the position detecting direction is on an axis 78ap. Although the two axes are in the same direction, their axis positions are offset from each other. If, therefore, rolling occurs while the support frame 75 moves along the axis 713p, the movement of the support frame 75 on the axis 78ap and the movement of the support frame 12 on an axis 713 become out of phase, resulting in poor control. (In the prior art, the shaft 711 is used as a countermeasure against such a phase shift, but there is no countermeasure against slight rolling caused by the fitting backlash between the shaft 711 and the support frame 75.)

In this embodiment, the sensitivity axes of position detection means (to be described later), e.g., Hall elements 110p and 110y, are made to coincide with the thrust center axes of the coils 16p and 16y (the directions 114p and 114y), thus taking countermeasures against the above problem.

2) FIG. 8B is a rear view of only the base plate 13 in FIG. 2. The base plate 13 has elongated holes $13d_1$, $13d_2$, and $13d_3$ extending in the direction 114y. The shaft portions $112a_1$, $112a_2$, and $112a_3$ extending from the rolling control ring 112 in FIG. 9D toward the lower surface of the drawing extend through the elongated holes $13d_1$, $13d_2$, and $13d_3$, respectively. The shaft portions $112a_1$, and $112a_3$ are respectively fitted in the elongated holes $13d_1$ and $13d_3$, and the rolling control ring 112 can move from these two points in only the direction 114y with respect to the base plate 13.

The elongated hole $13d_2$ is larger than the elongated holes $13d_1$ and $13d_3$ (although they are drawn in almost the same size on the drawing) to set a larger backlash with respect to the shaft portion $112a_2$. Such a structure is used for the following reason. If all the three shaft portions $112a_1$ to $112a_3$ are fitted in the elongated holes, the movement of the rolling control ring 112 with respect to the base plate 13 is made less smooth because of this redundant fitting. For this reason, one of the three elongated holes is preferably larger than the remaining holes.

Consider the elongated hole $13d_1$ as a reference. The span of the elongated hole $13d_2$ in the direction 114y is longer than that of the elongated hole $13d_3$. When, therefore, the elongated holes $13d_1$ and $13d_3$ are used as fitting holes, the rolling backlash between the rolling control ring 112 and the base plate 13 can be suppressed even if fitting backlashes are produced between the elongated holes $13d_1$ and $13d_3$ and the shaft portions $112a_1$ and $112a_3$. (If the elongated holes $13d_1$ and $13d_2$ are used as fitting holes, since the spans of the holes in the direction 114y are short, the rolling backlash increases.)

The rolling control ring 112 is snap-fastened to the base plate 13 with pawls 139k (see FIGS. 4B and 8B) formed thereon to be restrained in the optical axis direction. The shaft portions $112a_1$ to $112a_3$ of the rolling control ring 112 extend through the base plate 13 and are fitted in elongated holes $12c_1$, $12c_2$, and $12c_3$ (see FIG. 8A, which shows the rear surface of the support frame, and FIG. 4B) which are formed in the rear surface of the support frame 12 to extend in the direction 114p. The shaft portions $112a_1$ and $112a_2$ are respectively fitted in the elongated holes $12c_1$ and $12c_2$, while the elongated hole $12c_3$ is set to be larger than the remaining holes, thereby avoiding redundant fitting. The reason why the elongated hole $12c_3$ is formed to be larger is the same as in the case of the elongated holes 13d. With this structure, the support frame 12 can move in only the direction 114p with respect to the rolling control ring 112.

With the above structure, the support frame 12 can move in only the directions 114p and 114y with respect to the base plate 13, and is restrained in the rolling direction 114r.

The method of controlling the rolling of the above correction means (constituted by the support frame 12 and the correction lens 11) has the following advantages over the conventional method.

The rolling control support shaft 711 in the prior art shown in FIG. 28 is placed in the same plane as that of the support frame 75. As is apparent from FIG. 4B, the rolling control ring 112 in this embodiment is placed on the opposite surface of the support frame 12 (correction means) through the base plate 13 (support means). For this reason, the stepping motor 19 can be placed in the space (see FIG. 2) where the shaft 711 is placed in the prior art. Since the rolling control ring 112 is thin, even if it is mounted on the rear surface of the base plate 13, the overall size does not increase much. (Since the stepping motor 19 is thick, if it is mounted on the rear surface of the base plate 13, the overall correction device increases in size accordingly.)

In addition, since the rolling control ring 112 is flush with the coils 16p and 16y, all the terminals of the stepping motor 19 and the coils 16p and 16y can be set in the same direction. Therefore, an improvement in assembly efficiency (to be described later) can be attained.

3) As described above, the rolling of the support frame 12 is controlled by the function of the rolling control ring 112. In practice, however, there is still slight rolling movement caused by the fitting backlashes between the shaft portions 112a and the elongated holes 13d and 12b.

Referring to FIG. 2, springs 18 are provided between hooks 12d formed on the arm portions 12a on the support frame 12 and hooks 13e formed around the base plate 13 (see FIGS. 2 to 4B).

As shown in FIG. 2, the springs 18 radially extend from the center of the support frame 12 in three directions to pull the support frame 12 in all directions. Since the hooks 12d are formed at considerable distances from the center of the support frame 12 in the radial direction, a force acting on the support frame 12 in the rolling direction can be suppressed by the elastic forces of the springs arranged to pull the support frame 12 in all directions. That is, since rolling control is elastically performed, no rolling backlash is produced.

With effects 1) to 3) described above, the blur correction device in this embodiment can greatly reduce the influences of rolling.

As described above, the terminal pins 16b of the coil unit extend upward from the drawing surface of FIG. 2. Terminal pins 19a of the driving coil of the stepping motor 19 also extend in the same direction.

FIG. 7 shows the hard substrate 111 mounted in the blur correction device of this embodiment. The Hall elements 110p and 110y are coupled to the opposite surface of the hard substrate 111 to patterns 111cp and 111cy by reflow (FIG. 2 shows only the positional relationship therebetween). Although the Hall elements are used as position detection means in this embodiment, magnetic detection means such as MR elements may be used. Alternatively, optical detection means such as photoreflectors may be used.

This hard substrate 111 is mounted on the base plate 13 by using positioning pins 13f and holes 111d of the hard substrate 111 as guides, and screws are tightened into screw holes 13g through holes 111e. At this time, both the terminal pins 16b and 19a naturally extend through holes 111b and 111a. The holes 111a and 111b are through holes, in which the terminal pins 16p and 19a are soldered to be electrically connected.

As described above, positioning for soldering (e.g., soldering a lead to a terminal while holding the lead with tweezers) need not be performed. In addition, since all soldering directions are flush with each other, the operability and the reliability are high.

As described above, as the position detection means to be mounted on the hard substrate 111, the Hall elements 110p and 110y are used (see FIGS. 3B and 6A).

The operation of th e position detection means will be described below with reference to FIG. 6A.

The Hall element 110p (110y) changes its output in accordance with a change in ambient magnetic field. Referring to FIG. 6A, the Hall element 110p (110y) opposes the bipolarized permanent magnet 14p (14y). As the support frame 12 is driven (e.g., in the direction 114p), the relationship between the Hall element 110p (110y) and the permanent magnet 14p (14y) changes. For this reason, the strength of the magnetic field applied to the Hall element 110p (110y) changes, and the Hall element 110p (110y) outputs a corresponding signal, thereby detecting the position of the support frame 12.

As described above, the position of the support frame 12 can be detected by only placing the Hall element 110p (110y) to oppose the permanent magnet 14p (14y). In contrast to this, in the prior art, the IREDs 77p and 77y and the PSDs 78p and 78y are used, and the operation for electrical connection (soldering the IREDs 77p and 77y to the arms 716bp and 716by of the flexible substrate 716) is performed for the IREDs 77p and 77y. The operation in this embodiment is easier than the operation in the prior art. However, this structure has the following demerits.

First, the magnetic field strength of the permanent magnet 14p (14y) greatly changes with a change in temperature, and the sensitivity of the Hall element 110p (110y) is highly temperature-dependent. Second, the magnetic field generated by the coil 16p (16y) also influences the Hall element 110p (110y), and hence the Hall element 110p (110y) detects not only a change in magnetic field upon movement of the permanent magnet 14p (14y) but also a change in magnetic field due to the coil 16p (16y), resulting in a large detection error.

In this embodiment, the problems unique to the Hall elements are solved by the following two structures.

1) The yoke 15p (15y) is placed between the Hall element 110p (110y) and the permanent magnet 14p (14y). With this structure, most of the magnetic flux generated by the permanent magnet 14p (14y) flows in the yoke 15p (15y), as indicated by reference numeral 14a. However, the leakage magnetic flux still acts on the Hall element 110p (110y).

If the adjacent portions of the permanent magnet 14p (14y) are magnetized to the opposite poles, the magnetic field abruptly changes at the boundary portion within a narrow range. If the Hall element 110p (110y) is placed near the permanent magnet 14p (14y), a large detection stroke cannot be set. (If the Hall element 110p (110y) is spaced apart from the permanent magnet 14p (14y), the stroke increases, but the size of the device increases.)

Using the yoke 15p (15y) is equivalent to spacing the Hall element 110p (110y) apart from the permanent magnet 14p (14y), so the detection stroke can be increased without increasing the size of the device.

If the yoke 15p (15y) is made of a known magnetic shunt alloy or soft ferrite whose magnetic resistance changes with changes in temperature, changes in leakage magnetic flux with temperatures can be reduced, and changes in the sensitivity of the Hall element 110p (110y) with temperatures can be reduced. The Hall element 110p (110y) exhibits linear changes in sensitivity with temperatures, and these changes in sensitivity do not so vary among Hall elements. If, therefore, electrical correction is performed for an output from the Hall element by using a heat-sensitive element in addition to the above countermeasures, the influences of temperatures can be reduced.

2) As shown in FIG. 6A, in this structure, the permanent magnet 14p (14y) and a yoke 15 are arranged between the coil 16p (16y) and the Hall element 110p (110y).

In general, since a Hall element is placed on the same side as that of a coil, the Hall element also detects a magnetic field variation caused by the coil. In this structure, since a magnetic field variation caused by the coil 16p (16y) is blocked by the permanent magnet 14p (14y), which has a stronger magnetic field than the coil 16p (16y), and the yoke 15, this variation has no effect on the Hall element 110p (110y). With this structure, therefore, changes in magnetic field due to a drive current in the coil 16p (16y) exert no influence on an output from the Hall element 110p (110y), allowing accurate position detection.

The method of assembling the above blur correction device will be summarized below.

(a) The pair of coils 16p and 16y as coil units are snap-fastened to the base plate 13.

(b) The support frame 12 in which the correction lens 11 is fitted and to which the yoke 15p (15y) having the permanent magnet 14p (14y) attracted thereto is fastened with screws is mounted on the base plate 13. The rollers 17 are fastened to the support frame 12 with screws through the guide grooves 13a to couple the support frame 12 to the base plate 13.

(c) The stepping motor 19 is fastened to the base plate 13 with screws.

(d) The springs 18 are hung between the hooks 12d and 13e.

(e) The hard substrate 111 (on which the Hall elements 110p and 110y have already been mounted) is fastened to the base plate 13 with screws.

(f) The terminal pins 16p and 19a are soldered to the hard substrate 111.

(g) The lock ring 113 is mounted on the rear surface of the base plate 13, and the rolling control ring 112 is snap-fastened to pawls 13h (the lock ring 113 is restrained in the optical axis direction by the pawls 13h, together with the rolling control ring 112).

The blur correction device can be assembled with only the above simple assembly process. Highly reliable devices can therefore be manufactured with high productivity.

The characteristic features of this embodiment will be summarized below.

(1) Since the permanent magnets 14p and 14y are mounted on the support frame (movable side) 12, no wiring is required on the movable side. The reliability in assembly can therefore be improved.

(2) The use of the permanent magnets 14p and 14y in the open magnetic paths maintains fast-response characteristics for blur correction.

(3) Since the permanent magnets 14p and 14y are mounted on the yokes 15p and 15y, strong magnetic fields can be generated by the thin permanent magnets 14p and 14y, resulting in a reduction in the cost of the permanent magnets.

(4) The permanent magnets 14p and 14y are attracted to the yokes 15p and 15y, and the yokes 15p and 15y are mounted on the support frame 12. With this structure, troublesome bonding of the permanent magnets 14p and 14y can be omitted.

(5) Since the coils 16p and 16y are formed into units (the coil frames and the terminal pins are integrated by insert molding), they can be easily and reliably mounted on the base plate 13.

(6) Since the base plate 13 and the support frame 12 are supported by using the rollers 17 and the guide grooves 13a, assembly is facilitated, and the mounting precision can be improved.

(7) With the use of the offset rollers as the rollers 17, the inclination of the correction lens 11 can be adjusted without using any special inclination adjustment means.

(8) Since the lock ring 113 and the support frame 12 are fixed to each other at the four fitting portions along the gravitational direction in a photographing operation, the fitting backlash can be reduced.

(9) Since the sensitivity axes of the Hall elements 110p and 110y as the position detection means are made to coincide with the thrust center axes of the coils 16p and 16y, position detection errors due to rolling can be reduced.

(10) Rolling control can be performed with the simple structure using the rolling control ring 112.

(11) The tension springs 18 are radially arranged and fastened on the hooks spaced apart from the center to pull the support frame 12, thereby elastically absorbing the rolling backlash.

(12) By using the Hall elements 110p and 110y as the position detection means, complicated steps such as the steps of mounting IREDs and wiring can be omitted.

(13) Since the Hall elements 110p and 110y are arranged to oppose the permanent magnets 14p and 14y through the yokes 15p and 15y, the detection strokes can be increased even with small gaps, thereby realizing a compact structure.

(14) By using a magnetic shunt alloy for the yoke 15p (15y), changes in the sensitivity of the yoke 15p (15y) can be reduced.

(15) Since the Hall elements 110p and 110y are mounted on the opposite surface to the coils 16p and 16y through the permanent magnets 14p and 14y, the influences of changes in magnetic field due to the coils can be eliminated to improve the position detection precision.

(16) Since the rolling control ring 112 is placed on the rear surface of the base plate 13, the lock ring driving stepping motor 19 can be mounted on the support frame 12 side of the base plate 13. The overall device can therefore be made compact.

(17) Since the coils 16p and 16y and the stepping motor 19 are flush with each other, and the respective terminals pins are arranged in the same direction, the soldering operation in mounting these components on the substrate is facilitated.

(Second Embodiment)

FIGS. 11A to 18E show blur correction devices according to the first and second embodiments. FIGS. 11A, 12A, 13A, 14A, 15A, 16A, 17A, and 18A are schematic views showing the first embodiment to clearly explain the second embodiment. FIGS. 11B, 12B, 12C, 13B, 13C, 14B, 15B, 15C, 16B, 17B, 18B, 18C, 18D, and 18E schematically show only the modified elements of the first embodiment as elements constituting the second embodiment.

As described above, a blur correction device including the modified elements shown in FIGS. 11B to 18B, 18D, and 18E is described as a device according to the second embodiment for the sake of descriptive convenience. However, a device including at least one modified element is considered as a blur correction device according to the second embodiment. (In the following description, for example, a device including a modified permanent magnet structure as a modified element is referred to as the second embodiment. However, in the description of other modified elements included in the second embodiment, the permanent magnets are described with reference to the structure before modification, i.e., the structure having the permanent magnets in the first embodiment.)

FIG. 11A shows a portion associated with the structure of the drive means for driving the support frame 12 (correction means) in the first embodiment, i.e., the relationship between the permanent magnet 14p (14y) and the coil 16p (16y). FIG. 11B shows the relationship between a permanent magnet 31p (31y) and a coil 16p (16y) in the second embodiment.

In the second embodiment, as shown in FIG. 11B, the direction of magnetization of the permanent magnet 31p (31y) mounted on a support frame 12 and a direction 114p (114y) of the winding center of a coil 32p (32y) are perpendicular to the direction 13c in the first embodiment (see FIG. 11A). In this structure, by controlling the energization direction and amount of the coil 32p (32y), the permanent magnet 31p (31y) is attracted/repelled to/from the core, thereby driving the support frame 12.

According to this scheme, since a space can be ensured at the portion indicated by an arrow D, a spring 18 like the one described above or a roller 17 to be fitted in a guide groove can be placed in the space. No special space for a spring or a roller is therefore required, and hence a compact structure can be realized.

Figure 12A:
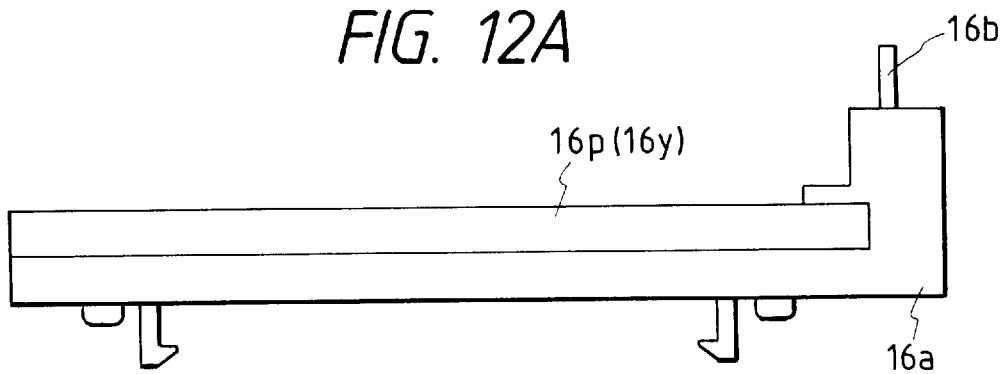
FIG. 12A is a schematic side view showing the structure of a coil unit in the first embodiment of the present invention.
Figure 12B:
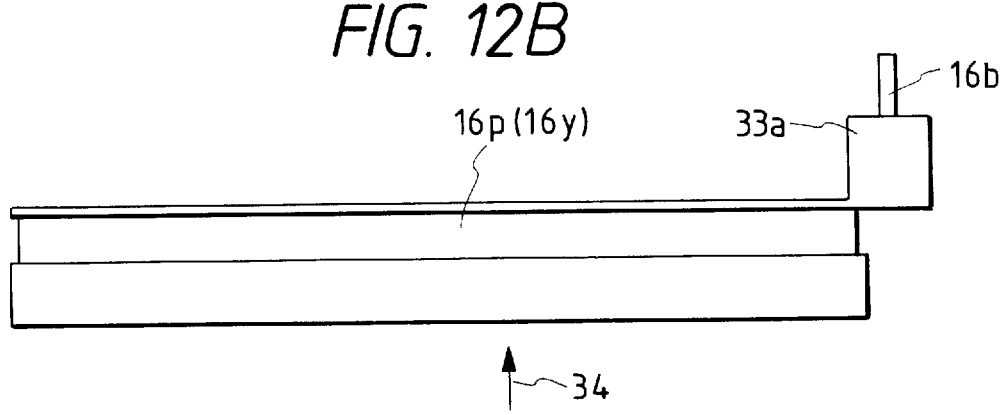
FIG. 12B is a schematic side view showing the structure of a coil unit in the second embodiment of the present invention.
Figure 12C:
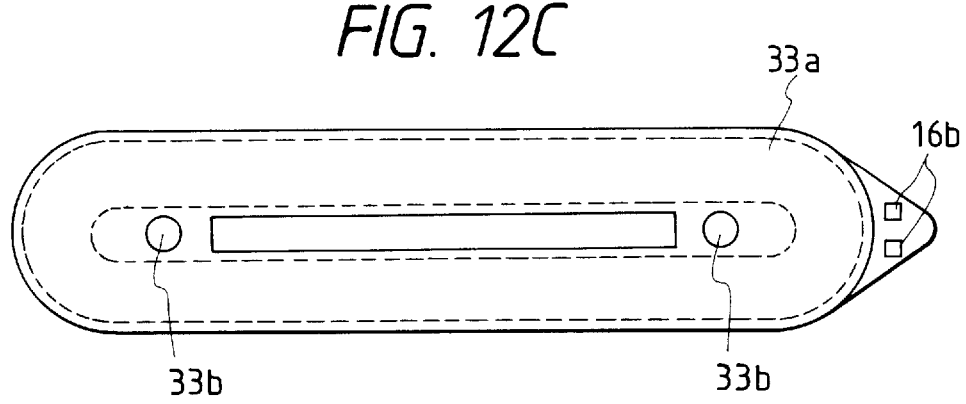
FIG. 12C is a schematic rear view of the coil unit in FIG. 12B.

FIG. 12A is a side view showing the coil unit in the first embodiment. FIGS. 12B and 12C are side and rear views showing a coil unit in the second embodiment of the present invention.

In the second embodiment, the coil unit is formed by winding the coil 16p (16y) wound on a bobbin 33a made of, e.g., an ABS resin, as shown in FIGS. 12B and 12C, unlike in the first embodiment in which the coil 16p (16y) is integrally formed with the coil frame 16a, as shown in FIG. 12A. According to this method, the coil is formed by only winding a wire member on the bobbin 33a. This method can prevent warpage of the coil unit due to a deterioration over time and allows strict dimensional control as compared with the method of winding, baking, and bonding a coil with tools, and integrating the coil with the coil frame 16a, as shown in FIG. 12A.

As in the structure shown in FIG. 12A, a pair of terminal pins 16b are formed on the bobbin 33a. One end of a wire member is fastened to one of the terminal pins 16b, and the wire member is wound on the bobbin 33a. The other end of the wire member is then fastened to the other terminal pin 16b.

As is apparent from the above description, the terminal pins 16b serve to secure the start portion of the coil and prevent the coil from loosening, and also serve to make connection to a hard substrate 111.

When viewed from the direction indicated by an arrow 34 in FIG. 12B, the bobbin 33a has screw holes 33b, as shown in FIG. 12C, and is coupled to a base plate 13 with screws. This coupling method using screws allows firm coupling as compared with the snap-fastening method in the first embodiment. Therefore, the coil 16p (16y) is free from a backlash, and high controllability can be maintained.

Note that the screws are magnetic members, and hence the forces of attraction may act between the support frame 12 mounted near the coils and the permanent magnets to degrade the driving precision. If, however, these members are separated from each other by a certain distance (e.g., 3 mm), the forces of attraction have no influence on the members. The above problem can therefore be solved in mounting alignment setting. Alternatively, the above problem can be solved by using nonmagnetic screws (e.g., stainless steel screws).

Figure 13A:
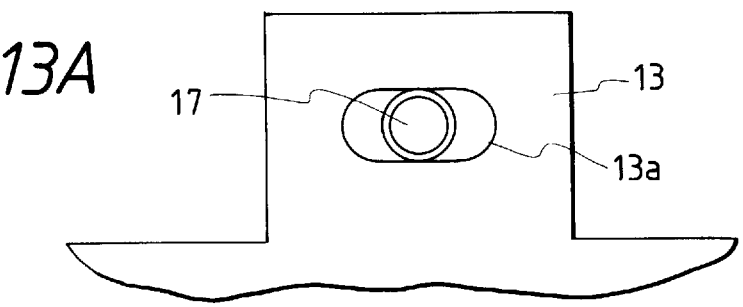
FIG. 13A is an enlarged view of a main portion, showing the positional relationship between the support frame and the base plate in the first embodiment of the present invention.
Figure 13B:
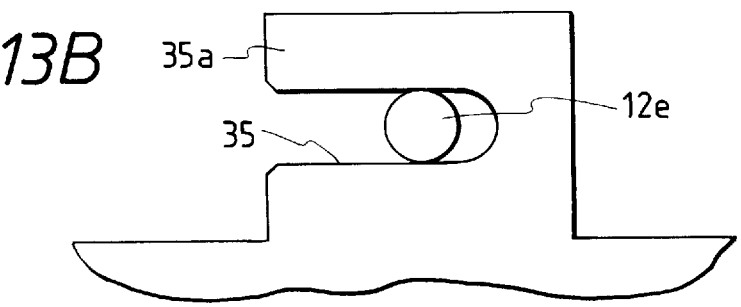
FIG. 13B is an enlarged view of a main portion, showing the positional relationship between a support frame and a base plate in the second embodiment of the present invention.
Figure 13C:
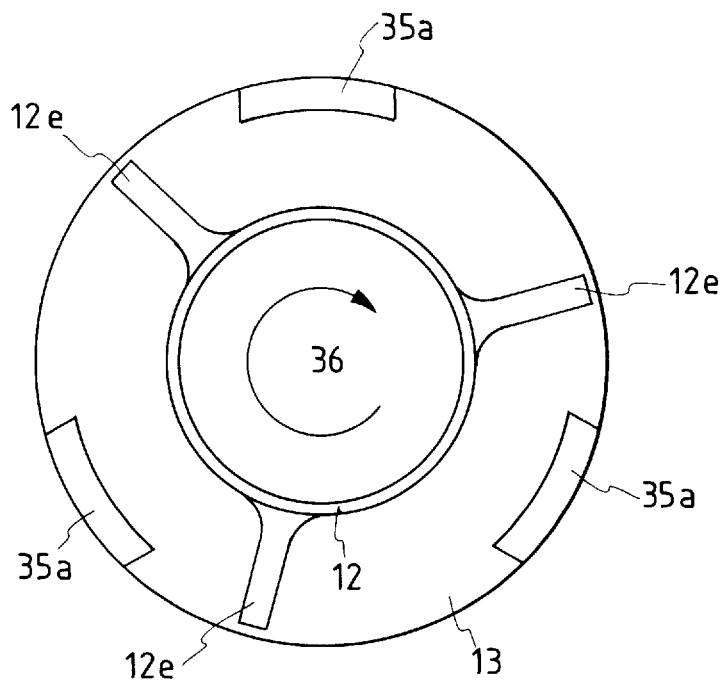
FIG. 13C is a view showing a procedure for mounting the base plate on the support frame in FIG. 13B.

FIG. 13A is an enlarged view of a portion near the guide groove 13a in the first embodiment. FIG. 13B is an enlarged view of a portion near a guide groove 35 in the second embodiment of the present invention. FIG. 13C is a front view showing a base plate having the guide groove and a support frame.

The second embodiment differs from the first embodiment in that guide grooves 35 are formed in the base plate, and roller portions 12e are integrally formed on the support frame 12.

The support frame 12 is mounted on the base plate 13 in the following manner. As shown in FIG. 13C, the roller portions 12e are placed on the base plate 13 to be out of phase with rims 35a of the guide grooves 35. The support frame 12 is then rotated in the direction indicated by an arrow 36 to insert the roller portions 12e into the guide grooves 35 through their notched portions.

According to this scheme, the operation of fastening the rollers 17 to the support frame 12 with screws can be omitted, and no error occurs in mounting the rollers 17 on the support frame 12 (because of integral molding). Therefore, a correction lens 11 can be supported with high precision. After assembly, the support frame 12 is restrained from rotating in the direction indicated by the arrow 36 and in the opposite direction by a rolling control ring 112 and the springs 18. For this reason, the support frame 12 does not come off from the base plate 13.

Figure 14A:
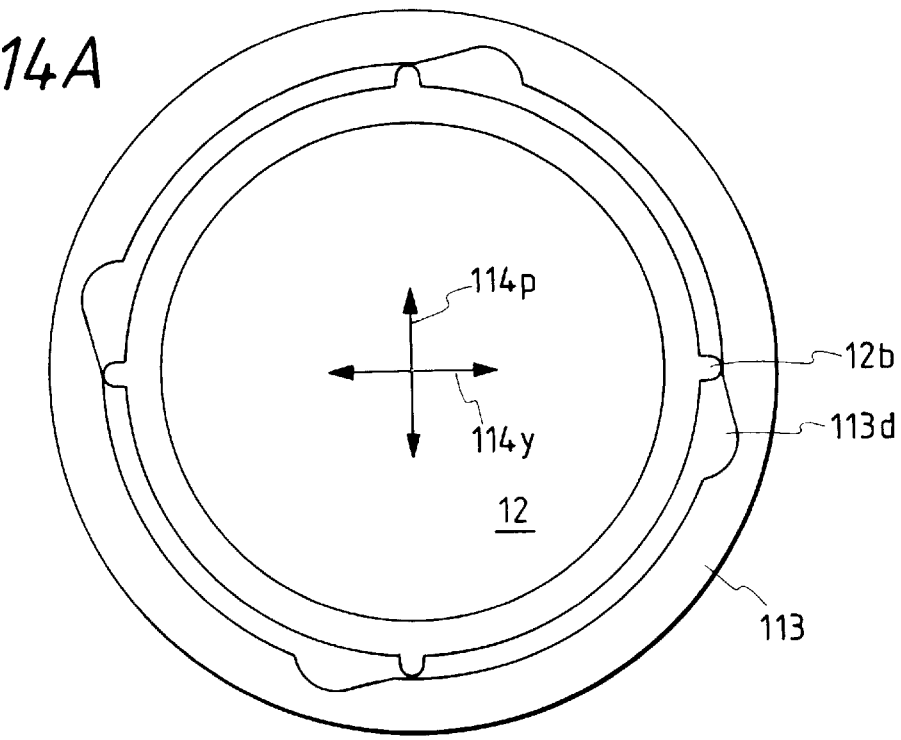
FIG. 14A is a front view showing the structure of the means for engaging the correction means in the first embodiment of the present invention.
Figure 14B:
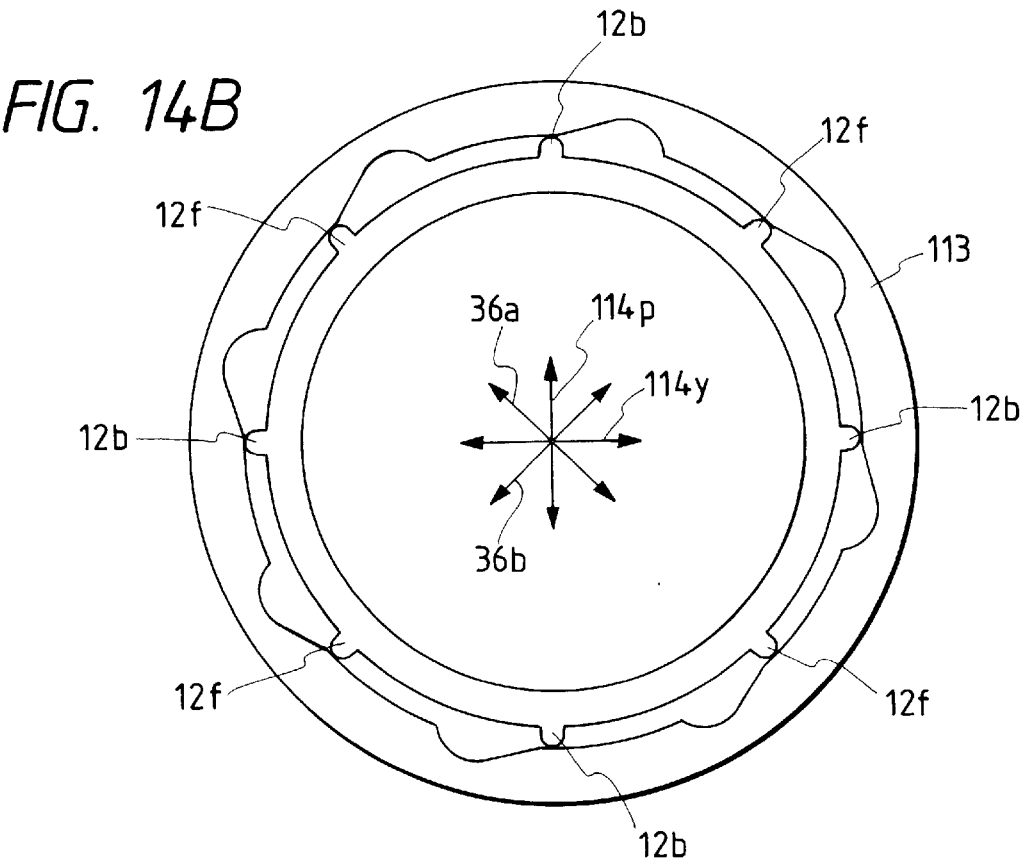
FIG. 14B is a front view showing the structure of a means for engaging a correction means in the second embodiment of the present invention.

FIG. 14A is a front view showing the lock ring 113 and part of the support frame 12 in the first embodiment. FIG. 14B is a front view showing a lock ring 113 and a support frame 12 in the second embodiment of the present invention.

In the second embodiment, in addition to projections 12b formed along the gravitational directions (directions 114p and 114y) in a photographic operation, projections 12f are formed at 45° with respect to the projections 12b, unlike in the first embodiment in FIG. 14A. In the first embodiment, the backlash in the gravitational direction is 0.2 mm, and the backlash in the inclination direction increases by $\sqrt{2}$ times. The structure in FIG. 14B is used to prevent such an increase in backlash. With the structure in FIG. 14B, substantial backlashes in all directions can be set to almost the same value (0.2 mm).

Figure 15A:
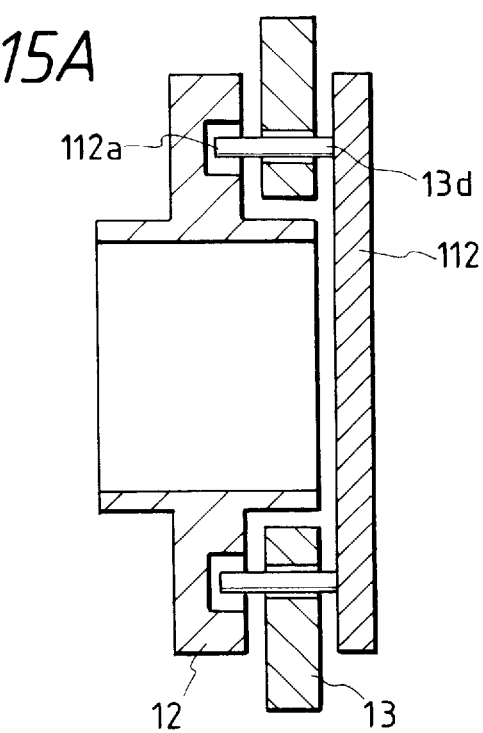
FIG. 15A is a schematic sectional view showing the positional relationship between the support frame and the rolling control ring in the first embodiment of the present invention.
Figure 15B:
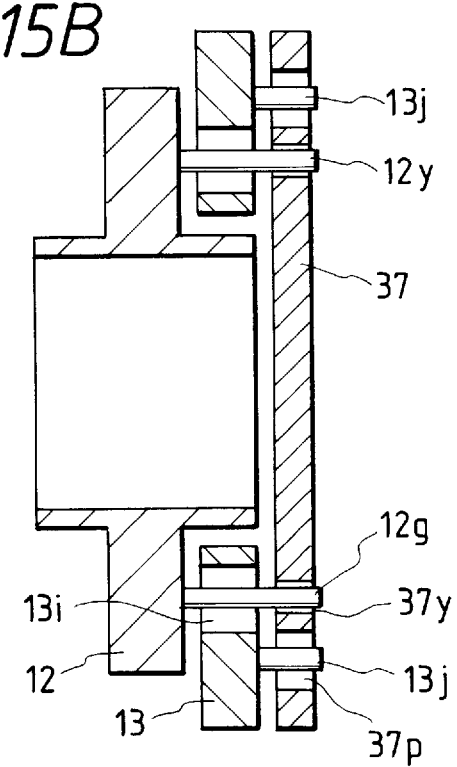
FIG. 15B is a schematic sectional view showing the positional relationship between a support frame and a rolling control ring in the second embodiment of the present invention.
Figure 15C:
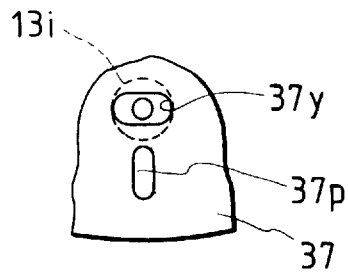
FIG. 15C is a front view showing the main portion associated with the positional relationship in FIG. 15B

FIG. 15A is a sectional view showing the positional relationship between the support frame 12, the base plate 13, and the rolling control ring 112 in the first embodiment. FIGS. 15B and 15C are sectional views showing the positional relationship between the support frame 12, the base plate 13, and a rolling control ring 37 in the second embodiment of the present invention.

In the first embodiment, as described in FIG. 15A, the shaft portion 112a extending from the rolling control ring 112 is inserted into the elongated hole 12c of the support frame 12 through the elongated hole 13d of the base plate 13. In this structure, since the rolling control ring 112 is a thin disk-like member, tilting of the shaft portions may pose a problem.

In the second embodiment shown in FIGS. 15B and 15C, a shaft portion 12g extending from the support frame 12 is fitted in an elongated hole 37y of the rolling control ring 37 on the disk through a hole 13i (having a size that ensures the correction stroke of the support frame 12, as indicated by the dotted line in FIG. 15C) formed in the base plate 13. A shaft portion 13j is fitted in an elongated hole 37p (perpendicular to the elongated hole 37y) of the rolling control ring 37.

The demerit of the above structure for rolling control of the support frame 12 is that the large hole 13i is formed in the base plate 13. However, a low-profile disk-like member having no shaft portions can be used as the rolling control ring 37. Therefore, there is no possibility of shaft tilting and the like, and the process precision can be improved.

Figure 16A:
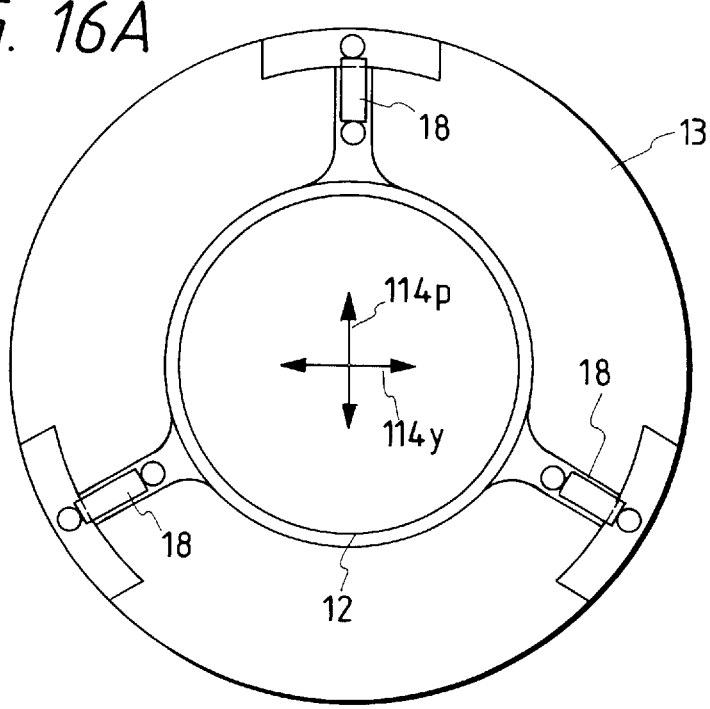
FIG. 16A is a front view showing the positional relationship between the support frame, the base plate, and springs in the first embodiment of the present invention.
Figure 16B:
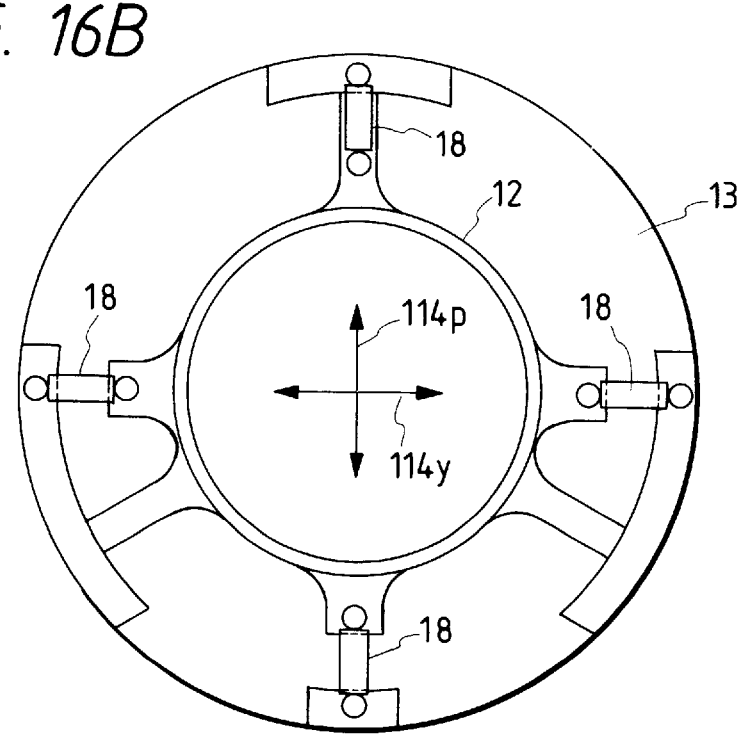
FIG. 16B is a front view showing the positional relationship between the support frame, the base plate, and springs in the second embodiment of the present invention.

FIG. 16A is a front view showing the positional relationship between the support frame 12, the base plate 13, and the springs 18 in the first embodiment. FIG. 16B is a front view showing the positional relationship between the support frame 12, the base plate 13, and the springs 18 in the second embodiment of the present invention.

The springs 18 may be fastened to the hooks in four directions to pull the support frame 12 in all directions, as shown in FIG. 16B, instead of being fastened to the hooks in three directions, as shown in FIG. 16A.

In the structure shown in FIG. 16A, the biasing forces of the springs 18 are not linear (because of the three directions) with respect to the drive amounts in the directions 114p and 114y. For this reason, control instability and an increase in load (the spring constant increases toward the end) occur. If, however, the springs are arranged in the four directions, as shown in FIG. 16B, the relationship between the drive amounts and the biasing forces become linear. Drive control therefore becomes stable.

Figure 17A:
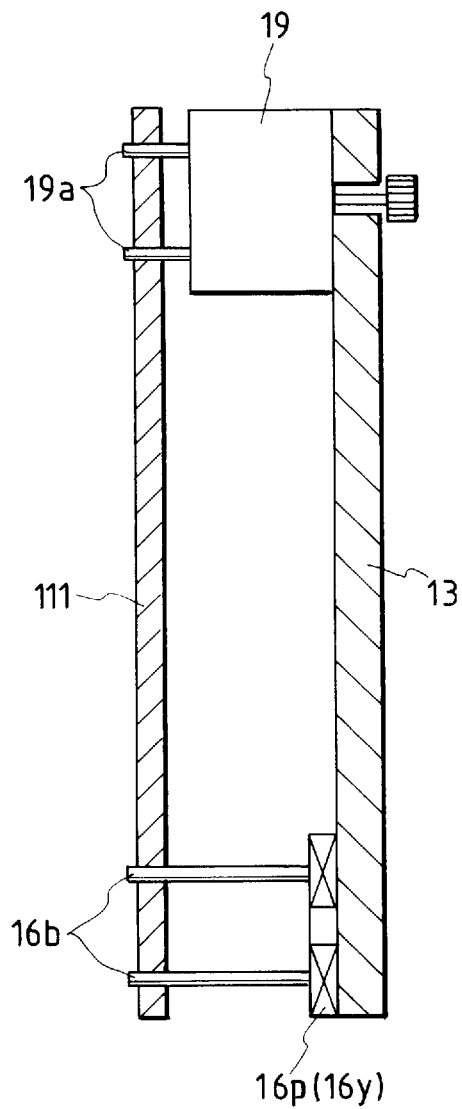
FIG. 17A is a schematic sectional view showing a method of mounting a stepping motor and the like on the hard substrate in the first embodiment of the present invention.
Figure 17B:
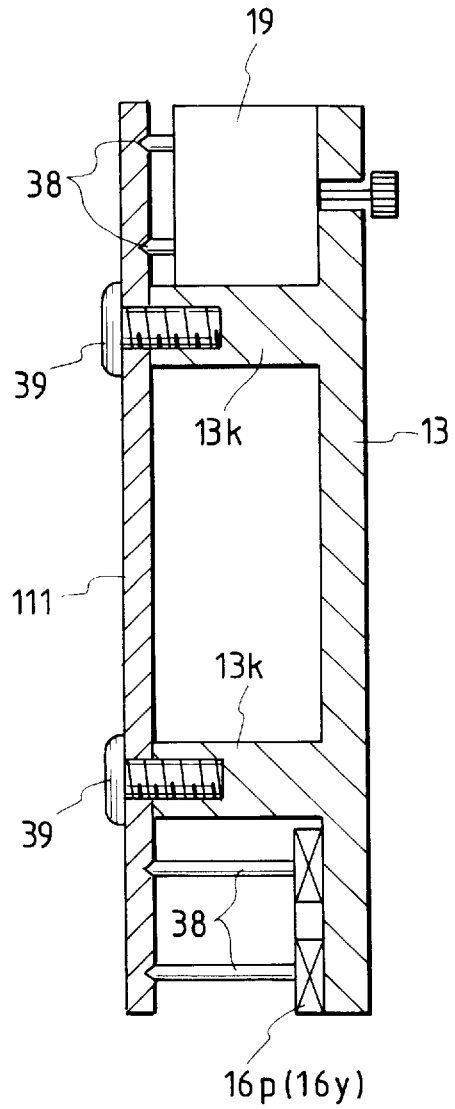
FIG. 17B is a schematic sectional view showing a method of mounting a stepping motor and the like on a hard substrate in the second embodiment of the present invention.

FIG. 17A is a sectional view for explaining a method of mounting (electrically connecting) the terminal pins 16b, to which the stepping motor 19 and the coil terminals are connected, on the hard substrate 111 in the first embodiment. FIG. 17B is a sectional view for explaining a method of mounting terminal pins 38, to which a stepping motor 19 and the coil terminals are connected, on the hard substrate 111 in the second embodiment of the present invention.

In the second embodiment, as shown in FIG. 17B, the distal ends of the terminal pins 38 of the coil 16p (16y) and the stepping motor 19 are tapered. When the hard substrate 111 is fastened to shafts 13k of the base plate 13 with screws, the terminal pins 38 sink into the hard substrate 111.

The hard substrate 111 has small holes (smaller in diameter than the body portions of the terminal pins 38) having electrode patterns at the contact positions. When the terminal pins 38 sink into the small holes, electrical connection is made, thereby omitting the soldering step required to solder the terminal pins 16b to the hard substrate 111 in the first embodiment.

Figure 18A:
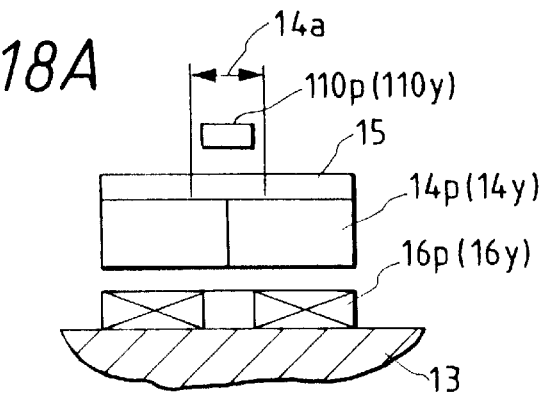
FIG. 18A is a schematic sectional view showing the structure of a means for detecting the position of the correction means in the first embodiment of the present invention.
Figure 18B:
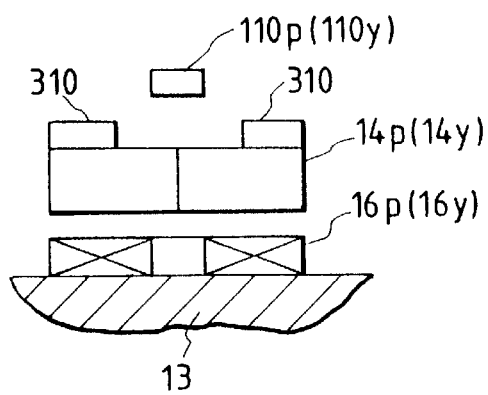
FIG. 18B is a schematic sectional view showing the structure of a means for detecting the position of the correction means in the second embodiment of the present invention.
Figure 18C:
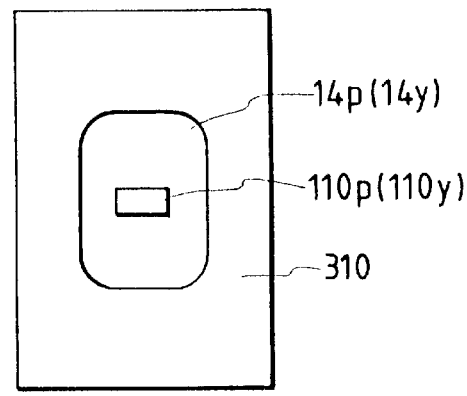
FIG. 18C is a plan view of the structure in FIG. 18B.

FIG. 18A is a sectional view showing the positional relationship between the Hall element 110p (110y), the yoke 15, the permanent magnet 14p (14y), and the coil 16p (16y) in the first embodiment. FIGS. 18B and 18C are front and sectional views showing the positional relationship between a Hall element 110p (110y), a yoke 310, a permanent magnet 14p (14y), and the coil 16p (16y) in the second embodiment of the present invention.

The Hall element 110p (110y) can perform position detection only in the range in which a linear magnetic field appears. In the first embodiment shown in FIG. 18A, linear changes in magnetic field can be obtained only in a range 14a of the permanent magnet 14p (14y) having adjacent opposite poles.

In contrast to this, in the second embodiment shown in FIGS. 18B and 18C, the yoke 310 has a hollow in the center. By mounting this modified yoke 310 on the permanent magnet 14p (14y), the magnetic field distribution can be changed, and the detection stroke can be controlled.

Figure 18D:
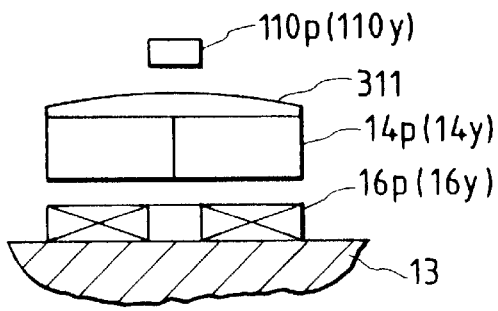
FIG. 18D is a sectional view showing a modification of the structure in FIG. 18B.
Figure 18E:
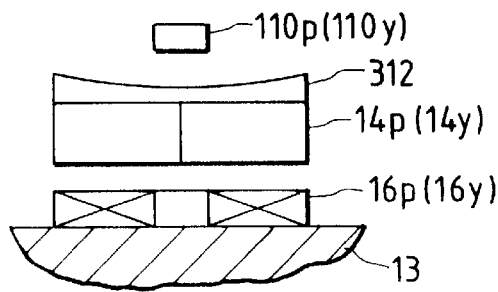
FIG. 18E is a sectional view showing another modification of the structure in FIG. 18B.

Note that the yoke 310 may be formed into a convex or concave shape, as shown in FIG. 18D or 18E, so as to control the magnetic field distribution.

(Third Embodiment)

FIGS. 19 to 26 are views showing a blur correction device according to the third embodiment of the present invention, and more specifically, schematic views showing only the modified elements in the first and second embodiments.

A blur correction device including the following modified elements will be described as a device according to the third embodiment for the sake of descriptive convenience. However, a device including at least one modified element is considered as a blur correction device according to the third embodiment.

Figure 19:
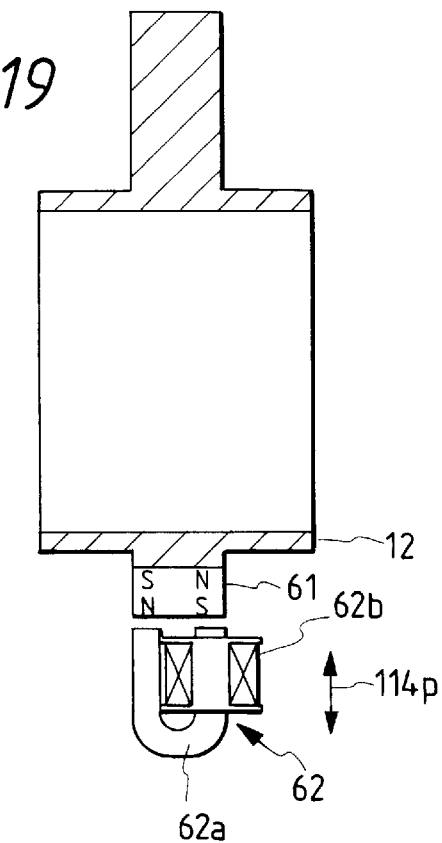
FIG. 19 is a sectional view showing the structure of a blur correction drive means in the third embodiment of the present invention.

FIG. 19 is a sectional view showing a portion associated with a drive means for a support frame 12 (correction means) according to the third embodiment of the present invention. This portion is a modification of the portions shown in FIGS. 11A and 11B.

As in the first embodiment (see FIG. 11A), a permanent magnet 61 magnetized in the direction indicated by an optical axis direction 13c is mounted on the support frame 12. An electromagnet 62 constituted by U-shaped cores 62a and 62b is placed to oppose the permanent magnet 61. By switching the directions of energization of the coil 62b, the attracting and repelling actions with respect to the permanent magnet 61 can be controlled. With this control, the support frame 12 can be driven.

This driving scheme has the following merit. While the coil is not energized (no blur correction is required), the permanent magnet 61 is attracted to the core 62a. As a result, the support frame 12 is locked. For this reason, no special means (the stepping motor 19 and the lock ring 113) is required to engage the support frame 12.

When a lock ring 113 is used to properly position the support frame 12, the lock backlash is absorbed by the attraction force between the permanent magnet 61 and the core 62a.

Figure 20A:
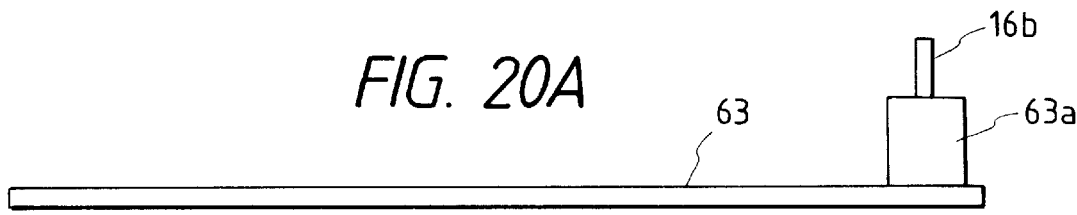
FIG. 20A is a schematic side view showing the structure of a coil unit in the third embodiment of the present invention.
Figure 20B:
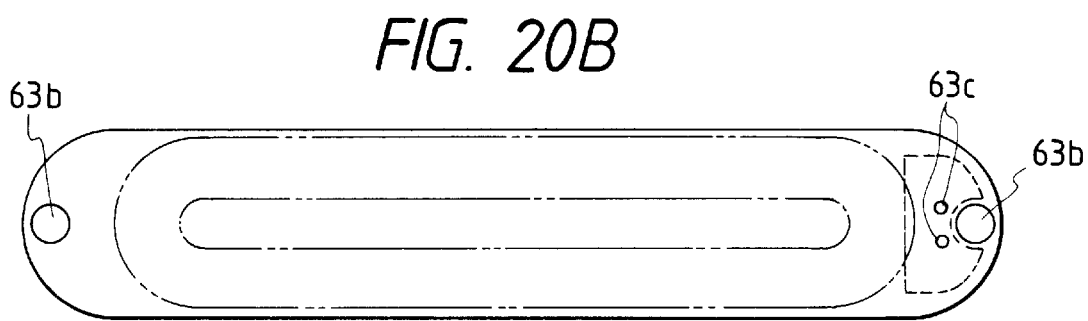
FIG. 20B is a schematic rear view of the structure in FIG. 20A.

FIGS. 20A and 20B are side and rear views of a coil unit according to the third embodiment of the present invention. This portion is a modification of the portions shown in FIGS. 12A and 12B.

A coil 63 is a printed or laminated coil. Terminal pins 16b are soldered to terminals 63c of a resin base 63a of the coil 63. The coil 63 is fastened to the base plate 13 with screws through holes 63b integrally formed in the coil 63.

When such a printed or laminated coil is used, strict dimensional control can be performed because the warpage and the like of the coil are small, as compared with the coil structure in the first embodiment. In addition, the gap between this coil and the permanent magnet can be reduced by the length of the flange (0.2 mm) of the bobbin in the second embodiment, and hence a large driving force can be obtained.

Figure 21:
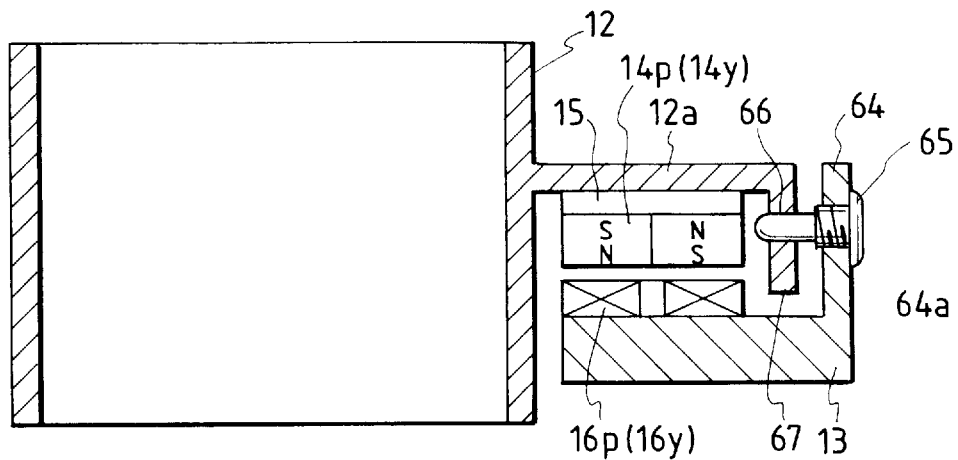
FIG. 21 is a sectional view showing the positional relationship between a support frame and a base plate in the third embodiment of the present invention.

FIG. 21 is a sectional view showing the positional relationship between the support frame 12 and a base plate 13 according to the third embodiment of the present invention. This portion is a modification of the portions shown in FIGS. 13A and 13B.

As shown in FIG. 21, a guide groove 66 may be formed in a flange 67 of the support frame 12, and a shaft 65 fitted in the guide groove 66 may be fastened to a flange 64 of the base plate 13 through a hole 64a.

In this case, no roller need be mounted on the support frame, and hence the weight of the structure can be reduced accordingly. In addition, a space can be saved by mounting a permanent magnet 14p (14y), a coil 16p (16y), and a yoke 15p (15y) on the rear side of a arm portion 12a. (In the first and second embodiments described above, the arm portion 12a becomes thicker by the roller 17 mounted on the support frame 12, and hence the permanent magnet and the like cannot be arranged in the same direction as that of the arm portion 12a.)

Apparently, in addition to the permanent magnet and the like, other members such as a spring may be arranged in the same direction as that of the arm portion 12a.

Figure 22:
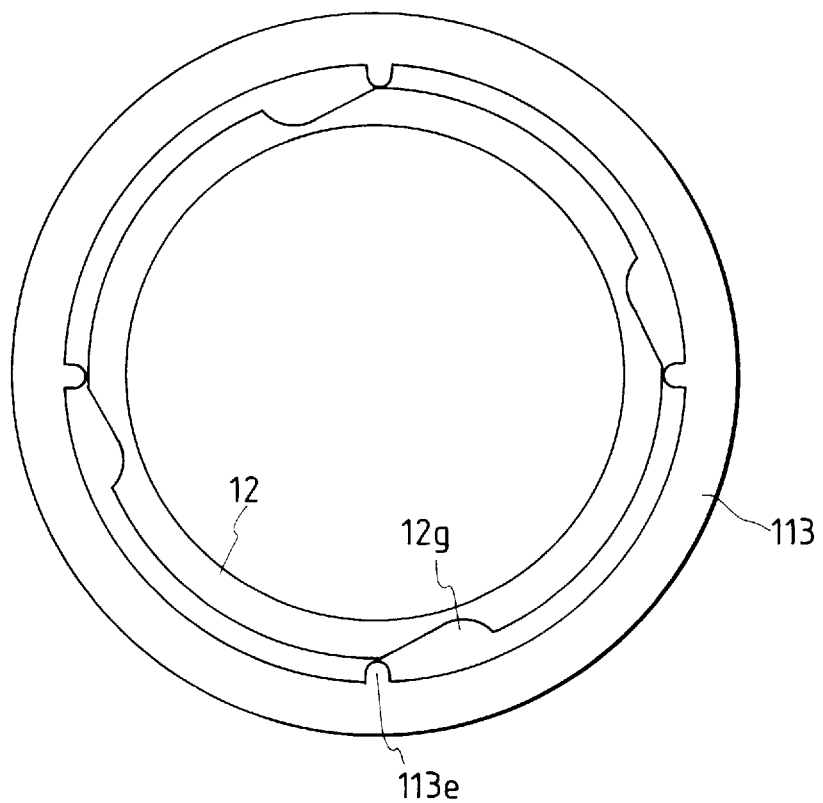
FIG. 22 is a front view showing the positional relationship between the support frame and a lock ring in the third embodiment of the present invention.

FIG. 22 is a front view showing the positional relationship between the support frame 12 and the lock ring 113 in the third embodiment of the present invention. This portion is a modification of the portions shown in FIGS. 14A and 14B.

The third embodiment differs from the first embodiment (FIG. 14A) in that projections 113d are formed on the lock ring 113, and cams 12g are formed on the support frame 12, as shown in FIG. 22.

The lock ring 113 is a thin ring. If, therefore, cams 113d in FIG. 14A are formed on the lock ring 113, the cam portions become thinner. The ring may therefore deform. Since the correction lens is fitted in the support frame 12, even if the frame is somewhat thin, it does not deform during operation. With the structure shown in FIG. 22, therefore, the rigidity of the components can be increased.

Figure 23:
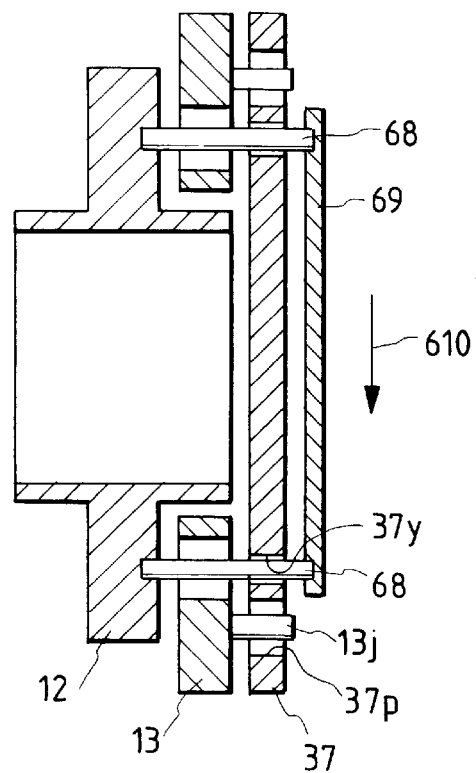
FIG. 23 is a sectional view showing the positional relationship between the support frame, the base plate, and a rolling control ring in the third embodiment of the present invention.

FIG. 23 is a sectional view showing the positional relationship between the support frame 12, the base plate 13, and a rolling control ring 37 according to the third embodiment of the present invention. This portion is a modification of the portions shown in FIGS. 15A and 15B.

The rolling control ring 37 is sandwiched between the support frame 12 and a stationary frame 69. Smooth metal shafts 68 are fixed to the rolling control ring 37. Since the shafts 68 are supported by being clamped between the shafts 68 and the support frame 12, shaft tilting (tilting of the shafts 68 with respect to the support frame 12) can be suppressed. In addition, since the shafts 68 are smooth metal pins, the frictions between the shafts 68 and holes 37y are very small.

Consider the frictions between the shafts 68 and the holes 37y.

If a direction 610 is the gravitational direction when the photographer generally holds the camera to take a picture, the support frame 12 is controlled against the gravity by the coils and the magnets. At this time, since the rolling control ring 37 is also pulled in the gravitational direction 610, the weight of the rolling control ring 37 is applied to the shafts 68. The vertical resistance between the shaft 68 and the elongated hole 36y therefore becomes larger than that between the elongated hole 37p and the shaft 13j. As a result, the friction increases in only this direction, resulting in a deterioration in driving precision.

For this reason, the metal pins are used as the shafts 68 to smoothly slide on the elongated holes 37y. In addition, since the shafts 68 are clamped between the support frame 12 and the stationary frame 69, the deflection in the rolling direction reduces. The restraint precision in this direction can therefore be improved.

Figure 24:
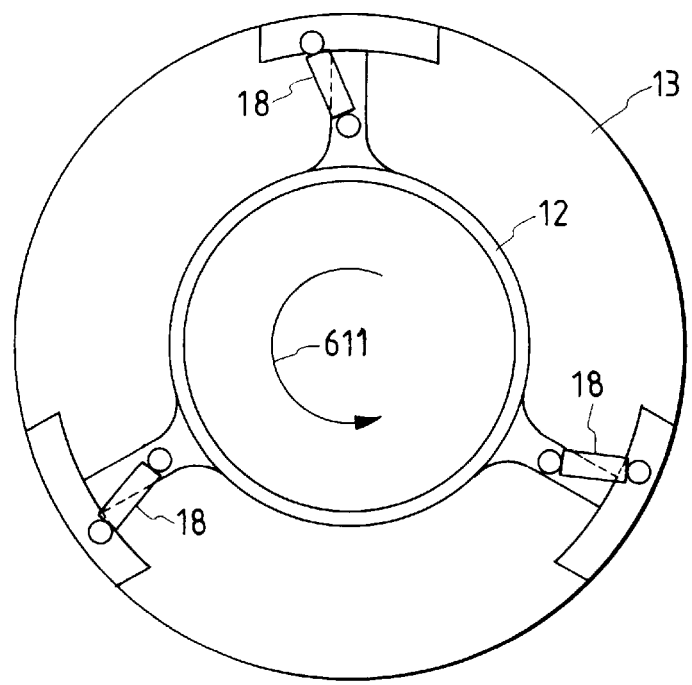
FIG. 24 is a front view showing the positional relationship between the support frame, the base plate, and springs in the third embodiment of the present invention.

FIG. 24 is a front view showing the positional relationship between the support frame 12, the base plate 13, and the springs 18 in the third embodiment of the present invention. This portion is a modification of the portions shown in FIGS. 16A and 16B.

The third embodiment differs from the first embodiment (see FIG. 16A) in that the springs 18 are arranged in a helical form. With this structure, a rotating force acts on the support frame 12 in the direction indicated by an arrow 611. However, since the support frame 12 is restrained in the rolling direction by a rolling control ring 112 (not shown), the support frame 12 does not rotate in the direction indicated by the arrow 611.

With this structure, since the support frame 12 is precharged by the rotating force in the direction indicated by the arrow 611 which is generated by the springs 18, the slight fitting backlashes between the rolling control ring 112 and the base plate 13 and between the rolling control ring 112 and the support frame 12 are absorbed. Therefore, a blur correction device without any rolling backlash can be realized.

Apparently, the number of springs 18 is not limited to three, and four springs may be used, as shown in FIG. 16B.

Figure 25:
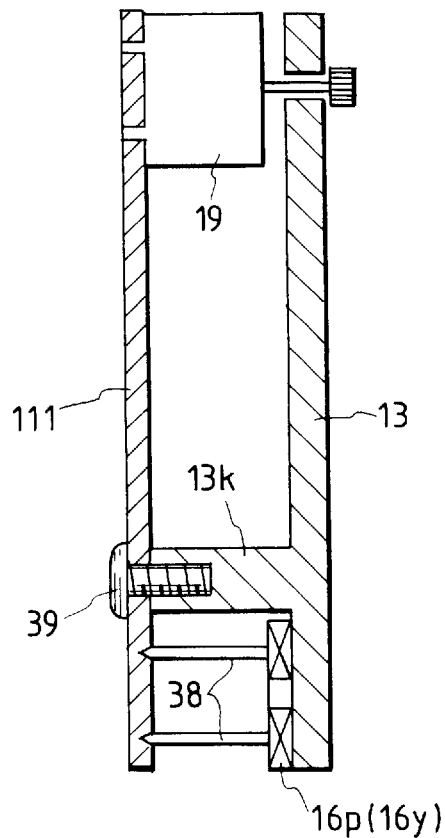
FIG. 25 is a sectional view for explaining a method of mounting a stepping motor and the like on a hard substrate in the third embodiment of the present invention.

FIG. 25 is a sectional view for explaining a method of mounting (electrically connecting) the terminal pins connected to the stepping motor 19 and the coil terminals on the hard substrate 111 in the third embodiment of the present invention. This portion is a modification of the portions shown in FIGS. 17A and 17B.

The stepping motor 19 is mounted on the hard substrate 111 in advance. The soldering operation has been complete, and the stepping motor 19 is not coupled to the base plate 13 with screws. (The base plate 13 only serves to guide the stepping motor 19.)

If the stepping motor 19 is mounted on the hard substrate 111 to form a motor unit in advance, the operation of mounting the stepping motor 19 on the base plate 13 and the operation of soldering the hard substrate 111 and terminals 19a of the stepping motor 19 can be omitted from the main assembly process. Therefore, the assembly process can be further simplified, and the reliability can be improved.

The distal ends of the terminal pins 38 connected to the coil terminals of the coil 16p (16y) are tapered as in the second embodiment (see FIG. 17B). When, therefore, the hard substrate 111 is fastened to the base plate 13 with a screw 39 turned into a shaft 13k of the base plate 13, electrical connection of the terminal pins 38 can be made.

Figure 26:
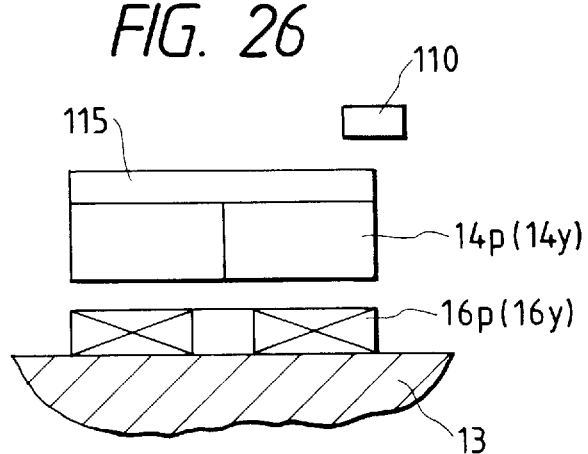
FIG. 26 is a sectional view for explaining the structure of a means for detecting the position of a correction means in the third embodiment of the present invention in comparison with the first embodiment.
Figure 27:
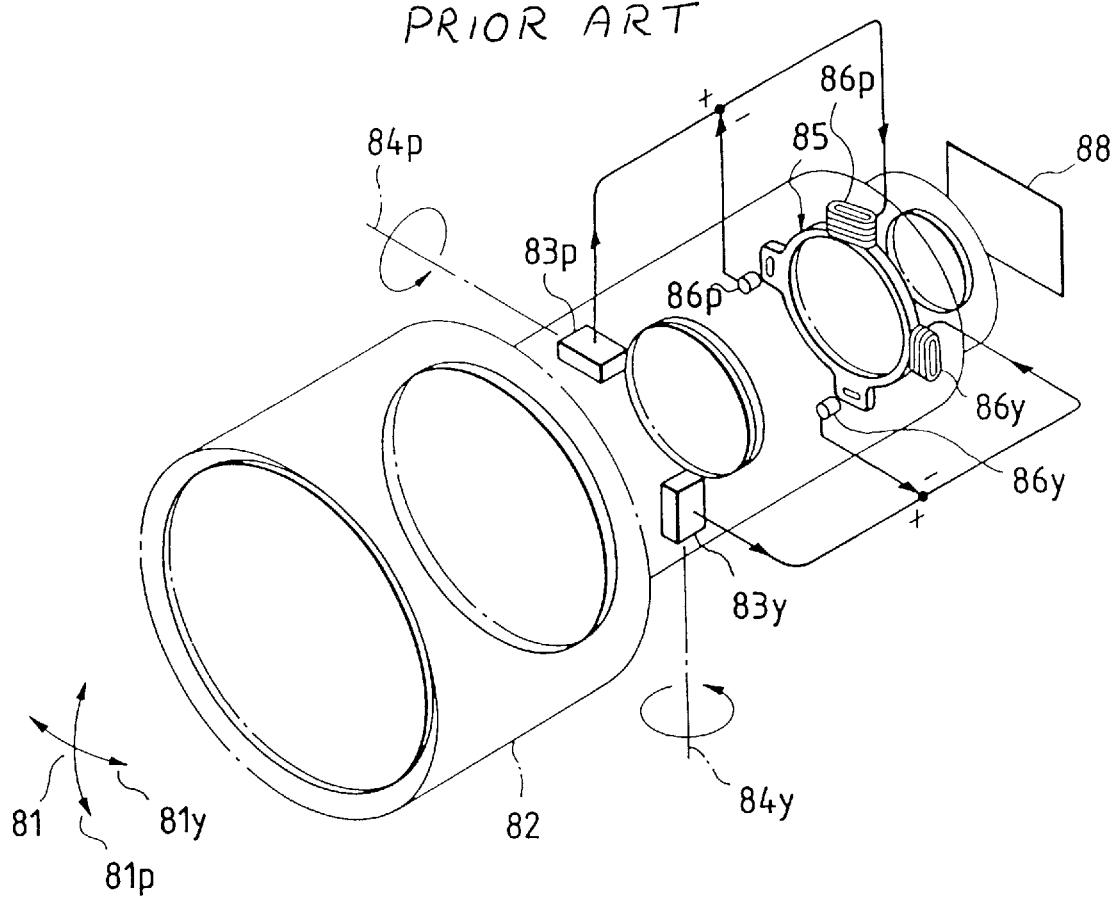
FIG. 27 is a perspective view showing the schematic structure of a conventional image blur prevention system.

FIG. 26 is a sectional view showing the positional relationship between a Hall element 110p (110y), the yoke 310, the permanent magnet 14p (14y), and the coil 16p (16y).

In the third embodiment, the Hall element 110p (110y) is placed at an end portion of the yoke 15p (15y), as shown in FIG. 26.

In the first embodiment (see FIG. 18A), the magnetic field greatly changes at the boundary between the two adjacent poles, and hence high sensitivity can be obtained. However, changes in magnetic field cannot be made linear throughout a long stroke; a linear output can be obtained in only a limited range in the detection stroke.

In contrast to this, with the structure shown in FIG. 26, since no polarity change occurs between the two adjacent poles, the magnetic field changes gradually. For this reason, linear changes in magnetic field appear in a wide range. Therefore, the range in which linear outputs can be obtained can be expanded.

According to the respective embodiments of the embodiment, the following effects can be obtained.

(1) Since the permanent magnets are mounted on the support frame (movable side), no wiring need be performed on the movable side, resulting in an improvement in assembly reliability.

(2) With the use of the permanent magnets for the open magnetic paths, fast-response characteristics can be ensured.

(3) Since the yoke is provided for each permanent magnet, a strong magnetic field can be generated by the thin permanent magnet. A reduction in the cost of the permanent magnet can be attained.

(4) The permanent magnets are attracted to the yokes, and the yokes are mounted on the support frame, the troublesome step of bonding the permanent magnets can be omitted.

(5) The winding centers of the coils are aligned with the driving direction to attract and repel the permanent magnets, thereby performing drive control. With this structure, since the hollow core portions of the coils can be effectively used for other members (e.g., support rollers), a compact structure can be realized.

(6) Since the support frame is driven by causing the permanent magnets on the support frame and the electromagnets on the base plate to attract and repel each other, the support frame can be locked by using the attractive forces between the magnets. Therefore, no special engaging means need be used, and the lock backlash can be eliminated.

(7) Since the coils, the frames, and the terminal pins are integrated into the coil units by insert molding, the coils can be easily mounted on the base plate.

(8) By winding each coil around the bobbin, a reduction in cost and strict dimensional control can be realized.

(9) By using the printed or laminated coils, the gaps between the coils and the permanent magnets can be reduced (because of no warpage and undulation of the coils), and hence the driving force can be increased.

The respective embodiments also have the following effects.

(10) Since the base plate and the support frame are supported by using the rollers and the guide grooves, assembly is facilitated, and the mounting precision can be improved.

(11) With the use of the eccentric rollers, the inclination of the correction lens can be adjusted without using any special inclination adjustment means. The overall device can therefore be made compact.

(12) Since the guide grooves have the notched portions, the support frame can be easily mounted on the base plate. In addition, since the rollers can be integrally formed on the support frame, strict dimensional precision control can be performed.

(13) By forming the guide grooves in the support frame, the weight of the support frame can be reduced (by the weight of the rollers). In addition, the portions around the guide grooves can be effectively used for other members (e.g., permanent magnets), thus realizing a compact structure.

(14) Since the lock ring and the support frame are fixed to each other at the four fitting portions arranged along the gravitational direction in a photographing operation, the fitting backlash can be reduced.

(15) By arranging the fitting portions between the lock ring and the support frame along the gravitational direction and the direction inclined at 45° with respect thereto, the fitting backlashes in all directions can be reduced.

(16) Since the fitting projections are formed on the lock ring, the rigidity of the components can be increased.

(17) Since the sensitivity axes of the position sensors are made to coincide with the thrust center axes of the coils, position detection errors due to rolling can be reduced.

(18) Since the rolling control ring is placed on the rear surface of the base plate, other members (stepping motor) can be mounted on the support frame side of the base plate. As a result, the overall device becomes compact.

(19) The low-profile disk-like member is used as the rolling control ring, and the pins extending from the support frame and the base plate are fitted in the ring, thus realizing a compact structure with high rigidity.

(20) The metal pins are used as the pins extending from the support frame and fitted in the rolling control ring, and the distal end portions of the respective pins are coupled to each other, thereby preventing the pins from tilting and increasing the deflection rigidity and the restraining force in the rolling direction. In addition, with the use of the metal pins, the frictional forces between the pins and the elongated holes can be reduced.

In addition, the respective embodiments of the embodiment have the following effects.

(21) The tension springs are radially arranged and fastened to the hooks spaced apart from the center so as to pull the support frame. With this structure, a rolling backlash can be elastically absorbed.

(22) By arranging the tension springs in a crisscross form, changes in biasing force can be made linear.

(23) The tension springs are arranged to exert biasing forces in the rolling direction so as to pre-charge a restraining force for the rolling control ring. With this structure, the rolling backlash can be reduced.

(24) The coils and the stepping motor are flush with each other, and the respective terminals pins are aligned in the same direction. This structure facilitates the soldering operation to be performed to mount these components on the hard substrate.

(25) The distal ends of the terminal pins of the coils and the stepping motor are tapered to sink into the hard substrate, thereby omitting the soldering operation.

(26) Since the stepping motor is soldered to the hard substrate in advance, the corresponding troublesome operation can be omitted from the main assembly process. As a result, the productivity increases.

(27) By using the Hall elements as the position sensors, the complicated steps of mounting IREDs, wiring, and the like can be omitted.

(28) Since the Hall elements are placed to oppose the permanent magnets through the yokes, large detection strokes can be ensured even with small gaps between the Hall elements and the magnets.

(29) By modifying the shape of each yoke, the magnetic field distribution can be controlled, and the detection linearity range of each Hall element can be expanded.

(30) By placing each Hall element at a position where a magnetic field at an end portion of the permanent magnet is detected, the linearity range can be expanded.

(31) By using the magnetic shunt alloy for each yoke, changes in the sensitivity of the Hall element with temperature can be made moderate.

(32) Since each permanent magnet is placed on the opposite surface to the Hall element and the coil, the Hall element is free from the influence of variations in magnetic field due to energization of the coil. The position detection precision can therefore be improved.

(Modification)

The present invention can be suitably applied to photographing devices such as single-lens reflex cameras and video cameras, but is not limited to these. The present invention can be applied to optical devices which exhibit effective functions by having image blur prevention systems. As is apparent, when the present invention is applied to such a photographing device, blur correction can be performed in the same manner as described above by using an image pickup element such as a CCD in place of the correction lens in each embodiment.

As described above, according to each embodiment described above, since the correction means is driven within a plane perpendicular to the optical axis of the lens or the image pickup element, there is no need to arrange permanent magnets on the correction means side and supply power to the correction means side so as to drive the correction means. Therefore, the power feed connection step can be omitted.

In addition, since the correction means is driven in two different directions within a plane perpendicular to the optical axis of the lens or the image pickup element, there is no need to arrange permanent magnets on the correction means side and supply power to the correction side so as to drive the correction means in the two different directions. Therefore, the power feed connection step can be omitted.

The reliability and assembly efficiency of the blur correction device can be improved.

Since the permanent magnets constitute the open magnetic paths, opposing yokes for the permanent magnets, which are required for open magnetic paths, are not required. Therefore, reductions in the size and weight of the blur correction device can be attained.

The yoke made of a magnetic material is placed on the opposite surface of each permanent magnet to the surface opposing the coil. With this structure, even the thin permanent magnet can generate a strong magnetic field, in cooperation with the yoke, after assembly. Since the single permanent magnet generates a weak magnetic field, the operability in assembly is high. This improves the assembly efficiency.

The yokes made of a magnetic material are fixed to the support frame, and the permanent magnets are simply attracted/fixed to the yokes, thereby easily and reliably fixing the permanent magnets, which are difficult to be processed into complicated shapes, on the support frame. The assembly efficiency can therefore be improved.

The support frame is driven by the attracting/repelling effect obtained by the permanent magnets, each having two opposite poles, and the electromagnets opposing the permanent magnets and capable of electromagnetically changing the polarity. With this structure, the mechanism for driving the correction means is simplified. The assembly efficiency can therefore be improved.

The drive means for driving the correction means is constituted by the permanent magnets which move relative to the means to which the permanent magnets oppose, and the flat coils arranged to oppose the first plane of each permanent magnet, with the direction of magnetization of each permanent magnet being set as a winding axis. In addition, the position detection means for detecting the position of the correction means is constituted by magnetic detection means, e.g., Hall elements or MR elements which facilitates assembly, placed to oppose the second plane on the opposite side to the first plane of each permanent magnet. Therefore, the assembly efficiency can be improved, and the reliability of the blur correction device can be improved.

The magnetic member which is the yoke is placed in the second plane on the opposite side of the permanent magnet to the flat coil, i.e., the magnetic detection means side on which position detection is performed in accordance with a change in magnetic field. With this structure, even if the gap between the permanent magnet and the magnetic detection means is small, a large position detection stroke can be ensured.

The position detection means for detecting the position of the correction means is constituted by the magnetic detection means such as Hall elements for performing position detection in accordance with a change in magnetic field. In addition, the magnetic member which is the yoke is placed on the magnetic detection means side of the permanent magnet as one constituent element of the drive means for driving the correction means. With this structure, the opposing surface on the magnetic detection means (Hall element) side of the magnetic member is changed in accordance with the position detecting direction to ensure the linearity of the position detection stroke.

The position detection means for detecting the position of the correction means is constituted by the magnetic detection means for performing position detection in accordance with a change in magnetic field. In addition, the adjustment means for adjusting the magnetic force of the permanent magnet, which is one of the constituent elements of the drive means for driving the correction means, in accordance with the temperature is placed on the magnetic detection means side of the permanent magnet. This adjustment means is made of a magnetic shunt alloy or soft ferrite, and the two poles of the permanent magnet are short-circuited by the adjustment means, thereby correcting a change in magnetic force with temperatures.

The assembly efficiency and the reliability of the blur correction device can therefore be improved without degrading the position detection precision of the correction means.

The coils for driving the correction means are fixed to the support frame, which is one of the constituent elements of the correction means, or the base plate, on which the correction means is movably supported, with the positioning pins and the pawls or screws (i.e., a method other than bonding) through the frame members or the bobbins. In addition, with the use of the firm terminal pins which are electrically connected to the coil terminals and can be easily soldered, these members are formed into units.

The device includes the correction means for performing blur correction and the drive means which is constituted by the permanent magnets and the coils printed on the printed board to oppose the permanent magnets, and serve to drive the correction means. Printed coils are used as these coils. With this structure, any special step of mounting the coils need not be performed.

The terminal pins are arranged to be almost parallel to the winding center axes of the coils, or supported to be perpendicular to the printed board. With this structure, the mounting directions of the coils are aligned with the soldering directions of the terminal pins to facilitate the assembly process.

The terminals of each coil as one of the constituent elements of the drive means for driving the correction means in, e.g., the pitch and yaw directions, are connected to the first terminal pins extending toward the substrate, thereby aligning the soldering directions of the respective coils for driving the correction means in different directions.

The terminals of each coil as one of the constituent elements of the engaging drive means (e.g., a stepping motor) for driving the engaging means are connected to the second terminal pins extending toward the substrate, similar to the first terminal pins, to align the soldering directions of the coil as one of the constituent elements of the drive means for driving the correction means and the coil as one of the constituent elements of the engaging drive means for driving the engaging means.

The first terminal pins and the coil as one of the constituent elements of the drive means for driving the correction means are formed into a unit.

The first terminal pins can be electrically connected to each other when the substrate is coupled to the support means. With this structure, soldering need not be performed.

The device includes the screwing portions for coupling the substrate and the support means near the contact portions of the substrate with which the first and second terminal pins come into contact. When the substrate and the support means are coupled to each other through the screwing portions, they can be electrically connected to each other. Therefore, soldering need not be performed.

The distal ends of the first and second terminal pins are tapered, and the hole portions smaller in diameter than the body portions of the first and second terminal pins are formed in the portions of the substrate with which the first and second terminal pins come into contact. With this structure, when the tapered distal ends of the first and second terminal pins sink into the hole portions formed in the substrate (when the substrate and the support means are coupled to each other), the terminal pins can be electrically connected to the substrate. Therefore, soldering need not be performed.

The device includes the substrate coupled to the support means through the correction means, and the engaging drive means for driving the engaging means mounted on the substrate. With this structure, the engaging drive means such as a stepping motor can be mounted on the substrate in advance to facilitate the main assembly process.

The assembly process for the blur correction means can be simplified, and the reliability of blur correction can be improved.

In addition, the coil as one of the constituent elements of the drive means for driving the correction means and the coil as one of the constituent elements of the engaging drive means for driving the engaging means are arranged in the same plane of the support means for supporting the correction means, thereby reducing the profile of the overall device.

What is claimed is:

1. An image blur prevention apparatus comprising:
   a movable member for preventing an image blur;
   a support portion for movably supporting said movable member; and
   a drive device for driving said movable member with respect to said support portion, said drive device including a coil mounted on said support portion, and a permanent magnet mounted on said movable member, said permanent magnet opposing one side of said coil and forming a magnetic path on an opposite side of said coil to the side where said coil opposes said permanent magnet without using any magnetic member.

2. An apparatus according to claim 1, wherein said coil comprises a flat coil, and said permanent magnet comprises means, located near one surface side of said flat coil, for forming a magnetic path on the other surface side without using any magnetic member.

3. An apparatus according to claim 2, wherein said drive device comprises means for displacing said movable member along a plane of said flat coil.

4. An apparatus according to claim 1, wherein said coil comprises means for allowing said coil to be substantially integrated with said support portion.

5. An apparatus according to claim 1, wherein said permanent magnet comprises means for allowing said permanent magnet to be substantially integrated with said movable member.

6. An apparatus according to claim 1, wherein said drive device comprises a first drive portion for displacing said movable member in a first direction, and a second drive portion for displacing said movable member in a second direction different from the first direction.

7. An apparatus according to claim 1, wherein said support portion comprises means for supporting said movable member such that said movable portion can be displaced along a predetermined plane.

8. An apparatus according to claim 7, wherein said drive device comprises means for displacing said movable member along the predetermined plane.

9. An apparatus according to claim 7, wherein said coil comprises a flat coil which is placed such that a plane of said coil is parallel to the predetermined plane, and said permanent magnet comprises means, located near one surface side of said flat coil, for forming a magnetic path on the other surface side without using any magnetic member.

10. An apparatus according to claim 7, wherein said drive device comprises a first drive portion for displacing said movable member in a first direction parallel to the predetermined plane, and a second drive portion for displacing said movable member in a second direction parallel to the predetermined plane and different from the first direction.

11. An apparatus according to claim 1, wherein said movable member comprises an optical member.

12. An apparatus according to claim 1, wherein said movable member comprises means which operates to correct an image blur.

13. An apparatus according to claim 1, wherein said drive device comprises means for driving said movable member in accordance with an output from an image blur detection device for detecting an image blur state.

14. An image blur prevention apparatus comprising:
    a movable member for preventing an image blur;
    a support portion for movably supporting said movable member; and
    a drive device which includes a conductive member conducting a current and a magnetic force generating member for always generating a magnetic force and drives said movable member with respect to said support portion, said conductive member being mounted on said support portion, said magnetic force generating member being mounted on said movable member, and said magnetic force generating member opposing one side of said conductive member and forming a magnetic path on an opposite side of said conductive member to the side where said conductive member opposes said magnetic force generating member without using any magnetic member.

15. An apparatus according to claim 14, wherein said conductive member comprises a coil.

16. An apparatus according to claim 14, wherein said magnetic force generating member comprises a permanent magnet.

17. An apparatus according to claim 14, wherein said drive device comprises means for generating an electromagnetic force generated by effects of the current and the magnetic force.

18. An image blur prevention apparatus comprising:
  a movable member which is displaced at least linearly to prevent an image blur;
  a support portion for supporting said movable member such that said movable member can be linearly displaced; and
  a drive device for driving said movable member with respect to said support portion, said drive device including a coil mounted on said support portion, and a permanent magnet mounted on said movable member.

19. An apparatus according to claim 18, wherein said permanent magnet opposes one side of said coil, and forms a magnetic path on an opposite side of said coil to the side where said coil opposes said permanent magnet without using any magnetic member.

20. An apparatus according to claim 18, wherein said coil comprises means for allowing said coil to be substantially integrated with said support portion.

21. An apparatus according to claim 18, wherein said permanent magnet comprises means for allowing said permanent magnet to be substantially integrated with said movable member.

22. An apparatus according to claim 18, wherein said drive device comprises a first drive portion for displacing said movable member in a first direction, and a second drive portion for displacing said movable member in a second direction different from the first direction.

23. An apparatus according to claim 18, wherein said support portion comprises means for supporting said movable member such that said movable portion can be displaced along a predetermined plane.

24. An apparatus according to claim 23, wherein said drive device comprises means for displacing said movable member along the predetermined plane.

25. An apparatus according to claim 23, wherein said coil comprises a flat coil, said flat coil including means for allowing said coil to be placed such that a plane of said coil is parallel to a linear direction in which said movable member can move.

26. An apparatus according to claim 18, wherein said movable member comprises an optical member.

27. An apparatus according to claim 18, wherein said movable member comprises means which operates to correct an image blur.

28. An apparatus according to claim 18, wherein said drive device comprises means for driving said movable member in accordance with an output from an image blur detection device for detecting an image blur state.

* * * * *

UNITED STATES PATENT AND TRADEMARK OFFICE
CERTIFICATE OF CORRECTION

PATENT NO. : 5,835,799

DATED : November 10, 1998

INVENTOR(S): KOICHI WASHISU

Page 1 of 3

It is certified that error appears in the above-identified patent and that said Letters Patent is hereby corrected as shown below:

Column 10

Line 8, "release" should read --releases--.

Column 13

Line 49, "Another" should read --In another--.

Column 15

Line 26, "15B" should read --15B;--.

Column 17

Line 3, "FIG. 2" should read --FIG. 2 is--.

Column 18

Line 37, "forms" should read --form--.

Column 20

Line 67, "deteriorates." should read --deteriorate.--.

UNITED STATES PATENT AND TRADEMARK OFFICE
CERTIFICATE OF CORRECTION

PATENT NO. : 5,835,799
DATED : November 10, 1998
INVENTOR(S) : KOICHI WASHISU

Page 2 of 3

It is certified that error appears in the above-identified patent and that said Letters Patent is hereby corrected as shown below:

Column 22

Line 21, "$112a_1$," should read --$112a_1$--.

Column 24

Line 7, "th e" should read --the--.

Column 26

Line 51, "terminals" should read --terminal--.

Column 29

Line 31, "become" should read --becomes--.

Column 31

Line 9, "a" should read --an--.

Column 32

Line 20, "not." should read --not--.

UNITED STATES PATENT AND TRADEMARK OFFICE
CERTIFICATE OF CORRECTION

PATENT NO. : 5,835,799

DATED : November 10, 1998

INVENTOR(S) : KOICHI WASHISU

It is certified that error appears in the above-identified patent and that said Letters Patent is hereby corrected as shown below:

<u>Column 34</u>

Line 36, "terminals" should read --terminal--.

<u>Column 35</u>

Line 55, "and" should read --are--.

Signed and Sealed this

Sixth Day of July, 1999

Attest:

Q. TODD DICKINSON

*Attesting Officer*      *Acting Commissioner of Patents and Trademarks*